(12) United States Patent
Badre-Alam et al.

(10) Patent No.: US 8,961,140 B2
(45) Date of Patent: Feb. 24, 2015

(54) AIRCRAFT PROPELLER BALANCING SYSTEM

(75) Inventors: Askari Badre-Alam, Apex, NC (US); David Boswell, Raleigh, NC (US); Donald Morris, Wendell, NC (US); Wayne Lee Winzenz, Raleigh, NC (US)

(73) Assignee: LORD Corporation, Cary, NC (US)

( * ) Notice: Subject to any disclaimer, the term of this patent is extended or adjusted under 35 U.S.C. 154(b) by 585 days.

(21) Appl. No.: 13/273,341

(22) Filed: Oct. 14, 2011

(65) Prior Publication Data
US 2012/0269626 A1 Oct. 25, 2012

Related U.S. Application Data

(63) Continuation-in-part of application No. 12/925,138, filed on Oct. 14, 2010.

(60) Provisional application No. 61/251,412, filed on Oct. 14, 2009, provisional application No. 61/433,070, filed on Jan. 14, 2011.

(51) Int. Cl.
  *B64C 11/08* (2006.01)
  *F01D 25/04* (2006.01)
  *B64C 11/00* (2006.01)

(52) U.S. Cl.
  CPC .............. *B64C 11/008* (2013.01); *F01D 25/04* (2013.01); *Y10S 416/50* (2013.01)
  USPC .............. 416/144; 416/80; 416/145; 416/500

(58) Field of Classification Search
  USPC ................................ 416/1, 80, 144, 145, 500
  See application file for complete search history.

(56) References Cited

U.S. PATENT DOCUMENTS

| 4,419,900 A | 12/1983 | Scott et al. |
| 4,591,112 A * | 5/1986 | Piasecki et al. ................. 244/26 |

(Continued)

FOREIGN PATENT DOCUMENTS

| DE | 10 2007 028728 | 12/2008 |
| WO | 96/17294 | 6/1996 |

(Continued)

OTHER PUBLICATIONS

Alaskan Airplane Maintenance, Dynamic Propeller Balancing, 3 pgs., Oct. 6, 2009.

(Continued)

*Primary Examiner* — Edward Look
*Assistant Examiner* — Christopher R Legendre

(57) ABSTRACT

An aircraft system and method with a first counterweight rotating balancing rotor mass concentration, and a second counterweight rotating balancing rotor mass concentration to balance a first aircraft propeller. The system includes an inboard electromagnetic coil driver with a first inboard electromagnetic coil, and a second inboard electromagnetic coil, the inboard electromagnetic coil driver and the first counterweight balancing rotor and the second counterweight balancing rotor centered around the aircraft propeller shaft rotating machine member. The system/method utilizes a first control system controller to control the coils and position the mass concentrations to balance the first aircraft propeller. The system/method includes a third counterweight rotating balancing rotor mass concentration, and a fourth counterweight rotating balancing rotor mass concentration to balance a second aircraft propeller which positioned and controlled by a second control system controller.

20 Claims, 37 Drawing Sheets

(56) References Cited

U.S. PATENT DOCUMENTS

| | | | |
|---|---|---|---|
| 5,136,841 A | 8/1992 | Zimmerman | |
| 5,172,325 A | 12/1992 | Heidari | |
| 5,537,861 A | 7/1996 | Seitelman et al. | |
| 5,676,025 A * | 10/1997 | Lulay | 74/570.2 |
| 5,757,662 A * | 5/1998 | Dyer et al. | 700/279 |
| 6,123,623 A | 9/2000 | Sugiyama | |
| 6,236,934 B1 * | 5/2001 | Dyer et al. | 701/124 |
| 6,302,356 B1 | 10/2001 | Hawkins | |
| 6,512,319 B1 | 1/2003 | Horng et al. | |
| 6,787,965 B1 | 9/2004 | Horng et al. | |
| 6,896,219 B2 * | 5/2005 | Borchers et al. | 244/1 N |
| 6,923,058 B2 | 8/2005 | Nieman et al. | |
| 7,448,854 B2 * | 11/2008 | Jolly et al. | 416/1 |
| 7,717,013 B2 * | 5/2010 | Hildebrand et al. | 74/574.2 |
| 7,882,765 B2 * | 2/2011 | Webster et al. | 74/572.1 |
| 8,070,089 B2 * | 12/2011 | Ferrier | 244/6 |
| 8,313,296 B2 * | 11/2012 | Jolly et al. | 416/55 |
| 8,360,728 B2 * | 1/2013 | Hildebrand et al. | 416/145 |
| 2005/0260091 A1 | 11/2005 | Staffend | |
| 2006/0005623 A1 | 1/2006 | Hildebrand et al. | |
| 2006/0083617 A1 | 4/2006 | Jolly et al. | |
| 2007/0156289 A1 | 7/2007 | Altieri et al. | |
| 2009/0035137 A1 | 2/2009 | Jolly et al. | |
| 2011/0197703 A1 * | 8/2011 | Badre-Alam et al. | 74/574.1 |
| 2012/0269626 A1 * | 10/2012 | Winzenz et al. | 416/1 |

FOREIGN PATENT DOCUMENTS

| | | |
|---|---|---|
| WO | 99/61314 | 12/1999 |
| WO | 2008/127362 | 10/2008 |
| WO | 2011/046620 | 4/2011 |

OTHER PUBLICATIONS

Dhi, The Idea Company, Metal Fiber Brushes (MFBs) for De-icing Applications, 1 pg., printed Oct. 12, 2009.

Hartzell Propeller Inc., Hartzell Propeller Inc. Service Letter, HC-SL-61-239, Propeller—Slip Ring Split Mounting Plate Inspection and Repair, 4 pgs., Jan. 2005.

MidAtlantic Aviation Inc., Dynamic Propeller Balance, 1 pg., Oct. 6, 2009.

* cited by examiner

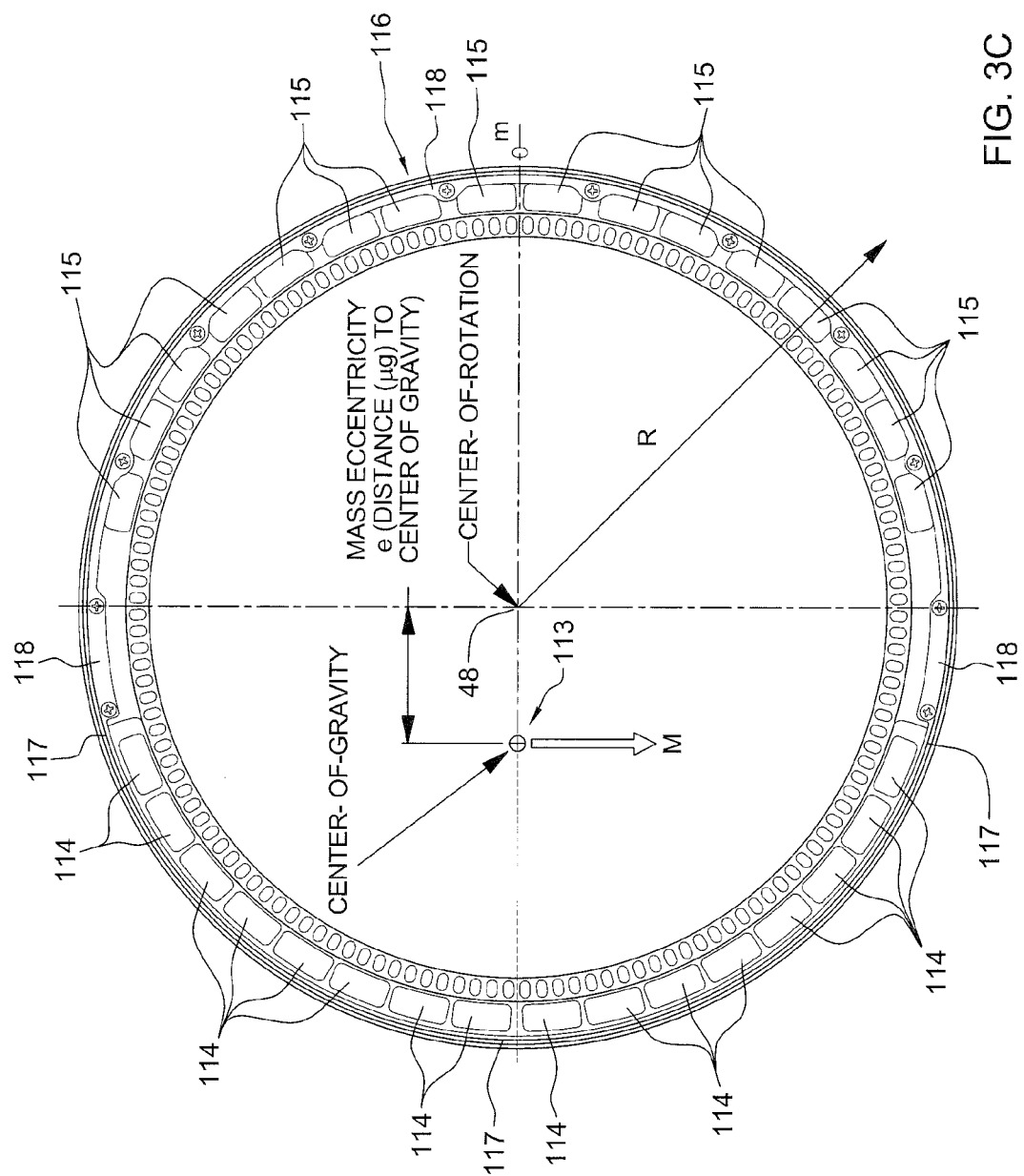

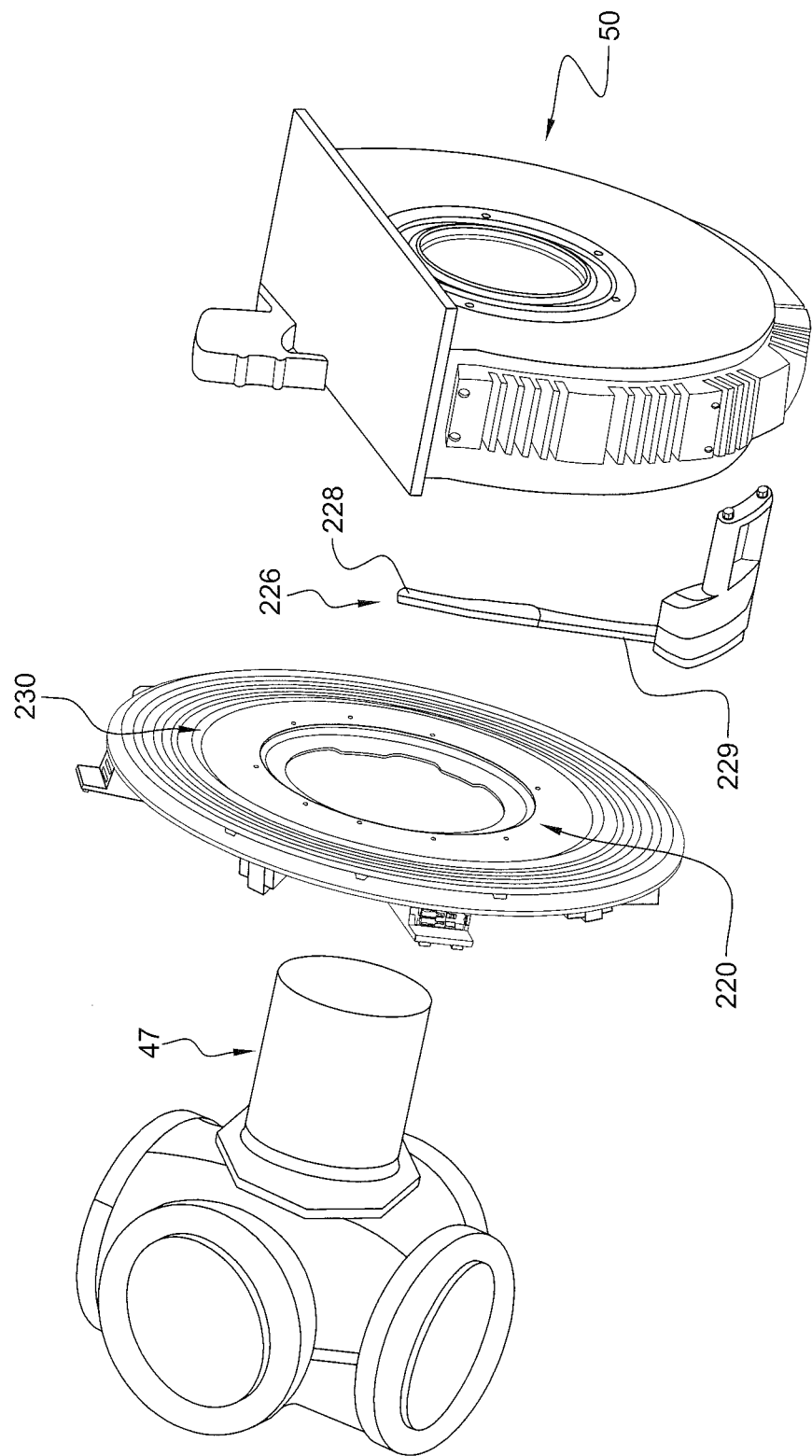

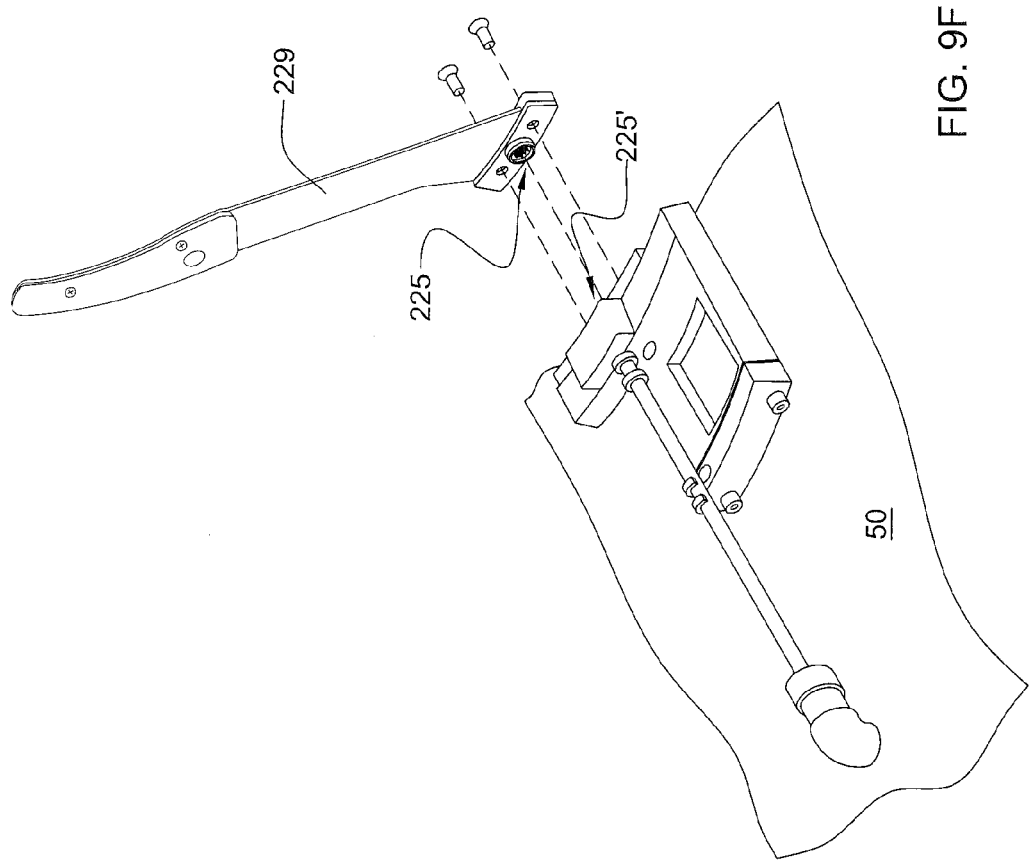

AIRCRAFT PROPELLER BALANCING SYSTEM

This application is a continuation in part (CIP) of U.S. patent application Ser. No. 12/925,138 filed Oct. 14, 2010, which claims the benefit of U.S. provisional patent application 61/251,412 filed Oct. 14, 2009, all of which are hereby incorporated by reference and the benefit is hereby claimed. This application claims the benefit of U.S. provisional patent application 61/433,070 filed Jan. 14, 2011, which is hereby incorporated by reference.

FIELD OF THE INVENTION

The invention relates to the field of rotating balancing devices. More particularly, the invention relates to the field of balancing aircraft rotating systems, particularly balancing aircraft propelling systems.

BACKGROUND INFORMATION

Aircraft propeller systems, turbo machinery, and aircraft rotating equipment machine members may experience a certain amount of vibration caused by an imbalance in the aircraft propeller, rotating machinery, rotating equipment. The vibration, if not corrected, can cause the device to run inefficiently and ultimately fail.

SUMMARY OF THE INVENTION

In an embodiment the invention includes a method of balancing an aircraft propeller system to minimize and inhibit aircraft vibrations. Preferably the method includes providing an aircraft propeller system with a rotating machine propeller system which rotates around a rotation axis. Preferably the method includes providing a first counterweight rotating balancing rotor, the first counterweight balancing rotor including a first plurality of holding stepping inboard magnets and a first outboard mass concentration. Preferably the method includes providing a second counterweight rotating balancing rotor, the second counterweight balancing rotor including a second plurality of holding stepping inboard magnets and a second outboard mass concentration. Preferably the method includes providing corresponding pole plates which correspond and are oriented with the holding stepping inboard magnets. Preferably the method includes providing an inboard electromagnetic coil driver, the inboard electromagnetic coil driver including a first inboard electromagnetic coil, and a second inboard electromagnetic coil. Preferably the method includes disposing the inboard electromagnetic coil driver and the first counterweight balancing rotor and the second counterweight balancing rotor around the rotating machine propeller system with the first inboard electromagnetic coil proximate the first inboard magnets of the first counterweight balancing rotor, the inboard electromagnetic coil driver proximate the rotation axis and the first counterweight balancing rotor outboard of the inboard electromagnetic coil driver, the first inboard electromagnetic coil generating a electromagnetic field to electromagnetically step the first inboard magnets of the at least first counterweight balancing rotor to electromagnetically actuate rotational movement of the first counterweight balancing rotor around the propeller system rotating machine member and relative to the inboard nonrotating electromagnetic coil driver and pole plates, and the second inboard electromagnetic coil proximate second counterweight balancing rotor, with the second inboard electromagnetic coil proximate the second inboard magnets of the second counterweight balancing rotor, wherein the second inboard electromagnetic coil generates an electromagnetic field to electromagnetically step the second inboard magnets of the second counterweight balancing rotor to electromagnetically actuate rotational movement of the second counterweight balancing rotor around the rotation axis and relative to the inboard electromagnetic coil driver and pole plates.

In an embodiment the invention includes an aircraft, the aircraft including a propeller system rotating machine member which rotates around a rotation axis. The aircraft preferably includes a first counterweight rotating balancing rotor, the first counterweight balancing rotor including a first plurality of holding stepping inboard magnets and a first outboard mass concentration. The aircraft preferably includes a second counterweight rotating balancing rotor, the second counterweight balancing rotor including a second plurality of holding stepping inboard magnets and a second outboard mass concentration. The aircraft preferably includes an inboard electromagnetic coil driver, the inboard electromagnetic coil driver including a first inboard electromagnetic coil, and a second inboard electromagnetic coil. Preferably the inboard nonrotating electromagnetic coil driver and the first counterweight balancing rotor and the second counterweight balancing rotor are centered around the propeller system rotating machine member with the first inboard electromagnetic coil proximate the first inboard magnets of the first counterweight balancing rotor, the inboard electromagnetic coil driver proximate the rotation axis and the first counterweight balancing rotor outboard of the inboard nonrotating electromagnetic coil driver with the first inboard electromagnetic coil generating a electromagnetic field to electromagnetically step the first inboard magnets of the at least first counterweight balancing rotor to electromagnetically actuate rotational movement of the first counterweight balancing rotor around the propeller system rotating machine member and relative to the inboard electromagnetic coil driver to a first rotor held balancing position, and the second inboard electromagnetic coil proximate the second counterweight balancing rotor, with the second inboard electromagnetic coil proximate the second inboard magnets of the second counterweight balancing rotor, wherein the second inboard electromagnetic coil generates an electromagnetic field to electromagnetically step the second inboard magnets of the second counterweight balancing rotor to electromagnetically actuate rotational movement of the second counterweight balancing rotor around the rotation axis and relative to the inboard electromagnetic coil driver to a second rotor held position.

In embodiments the invention includes aircrafts, aircraft systems and methods with electromagnetically actuated machine balancers mounted on propeller system rotating machine members to provide means for actively balancing the propeller system rotating machine members, preferably during aircraft flight. The electromagnetically actuated balancer preferably includes at least a first counterweight rotating balancing rotor, the first counterweight balancing rotor including a first plurality of inboard magnets and a first outboard mass concentration. The electromagnetically actuated balancer preferably comprising an inboard nonrotating electromagnetic coil driver, the inboard electromagnetic coil driver including at least a first inboard electromagnetic coil, the first inboard electromagnetic coil proximate the first inboard magnets of the counterweight balancing rotor, wherein the first inboard electromagnetic coil generates an electromagnetic field to electromagnetically step the first inboard magnets of the at least first counterweight balancing rotor to electromagnetically actuate rotational movement of the first counterweight balancing rotor around the rotation axis and relative to the inboard nonrotating electromagnetic coil driver.

In embodiments the invention includes aircrafts, aircraft systems and methods that include providing an electromagnetically actuated balancer, preferably to provide a means for actively balancing propeller systems during aircraft flight. Preferably such methods/systems include providing a first counterweight rotating balancing rotor, the first counterweight balancing rotor including a first plurality of inboard magnets and a first outboard mass concentration. Preferably such includes providing an inboard nonrotating electromagnetic coil driver, the inboard electromagnetic coil driver including at least a first inboard electromagnetic coil. Preferably such includes disposing the first inboard electromagnetic coil proximate the first inboard magnets of the counterweight balancing rotor, wherein the first inboard electromagnetic coil generates a magnetic field to electromagnetically step the first inboard magnets of the at least first counterweight balancing rotor to electromagnetically actuate rotational movement of the first counterweight balancing rotor relative to the inboard nonrotating electromagnetic coil driver.

In an embodiment the invention includes a method of electromagnetically actively dynamically balancing a rotating propeller system machine member which rotates about a rotation axis. The method preferably includes providing a first counterweight rotating balancing rotor, the first counterweight balancing rotor including a first plurality of inboard magnets and a first outboard mass concentration. The method preferably includes providing an inboard nonrotating electromagnetic coil driver, the inboard electromagnetic coil driver including at least a first inboard electromagnetic coil. The method preferably includes disposing the inboard nonrotating electromagnetic coil driver and the first counterweight balancing rotor around the rotating machine member with the first inboard electromagnetic coil proximate the first inboard magnets of the first counterweight balancing rotor, the inboard nonrotating electromagnetic coil driver proximate the rotation axis and the first counterweight balancing rotor outboard of the inboard nonrotating electromagnetic coil driver wherein the first inboard electromagnetic coil generates a electromagnetic field to electromagnetically step the first inboard magnets of the at least first counterweight balancing rotor to electromagnetically actuate rotational movement of the first counterweight balancing rotor around the rotating machine member and relative to the inboard nonrotating electromagnetic coil driver.

In an embodiment the invention includes a method of inhibiting aircraft vibrations in an aircraft with a plurality of aircraft vibrations. Preferably the aircraft has more than one propeller system. Preferably the propeller system is comprised of an engine and a propeller. Preferably the more than one propeller systems of the aircraft are dynamically uncoupled. The method includes providing a first aircraft propeller system with a first rotating machine propeller shaft member which rotates around a first rotation axis. The method includes providing a first counterweight rotating balancing rotor, the first counterweight balancing rotor including a first plurality of holding stepping inboard magnets and a first outboard mass concentration. The method includes providing a second counterweight rotating balancing rotor, the second counterweight balancing rotor including a second plurality of holding stepping inboard magnets and a second outboard mass concentration. The method includes providing an inboard electromagnetic coil driver, the inboard electromagnetic coil driver including a first inboard electromagnetic coil, and a second inboard electromagnetic coil. The method includes disposing the inboard electromagnetic coil driver and the first counterweight balancing rotor and the second counterweight balancing rotor around the rotating machine propeller shaft member with the first inboard electromagnetic coil proximate the first inboard magnets of the first counterweight balancing rotor, the inboard electromagnetic coil driver proximate the rotation axis and the first counterweight balancing rotor outboard of the inboard electromagnetic coil, and the second inboard electromagnetic coil proximate the second counterweight balancing rotor, with the second inboard electromagnetic coil proximate the second inboard magnets of the second counterweight balancing rotor. The method includes providing a first control system controller and disposing the first control system controller proximate the inboard electromagnetic coil driver wherein the first control system controller controls the inboard electromagnetic coil driver with the first inboard electromagnetic coil generating a electromagnetic field to electromagnetically step the first inboard magnets of the at least first counterweight balancing rotor to electromagnetically actuate rotational movement of the first counterweight balancing rotor around the rotating machine member and relative to the inboard electromagnetic coil driver, and the first control system controller controls the inboard electromagnetic coil driver with the second inboard electromagnetic coil generating an electromagnetic field to electromagnetically step the second inboard magnets of the second counterweight balancing rotor to electromagnetically actuate rotational movement of the second counterweight balancing rotor around the rotation axis and relative to the inboard electromagnetic coil driver.

In an embodiment the invention includes a method of balancing aircraft propeller systems of an aircraft. Preferably the aircraft propeller system is comprised of an engine and propeller, preferably with a shaft member connecting the engine and propeller. Preferably the aircraft has more than one propeller system, with the propeller systems dynamically uncoupled from each other. Preferably the method includes providing an aircraft with at least a first propeller system with a first rotation axis and at least a second propeller system with a second rotation axis, preferably with the first propeller system dynamically uncoupled from the second propeller system. Preferably the method includes providing a first counterweight rotating balancing rotor, the first counterweight balancing rotor including a first plurality of holding stepping inboard magnets and a first outboard mass concentration, and a second counterweight rotating balancing rotor, the second counterweight balancing rotor including a second plurality of holding stepping inboard magnets and a second outboard mass concentration. Preferably the method includes providing a first inboard electromagnetic coil driver, the inboard electromagnetic coil driver including a first inboard electromagnetic coil, and a second inboard electromagnetic coil. Preferably the method includes disposing the first inboard electromagnetic coil driver and the first counterweight balancing rotor and the second counterweight balancing rotor around the first propeller system with the first inboard electromagnetic coil proximate the first inboard magnets of the first counterweight balancing rotor, the inboard electromagnetic coil driver proximate the first rotation axis and the first counterweight balancing rotor outboard of the inboard electromagnetic coil, and the second inboard electromagnetic coil proximate the second counterweight balancing rotor, with the second inboard electromagnetic coil proximate the second inboard magnets of the second counterweight balancing rotor. Preferably the method includes providing a first control system controller and disposing the first control system controller proximate the first propeller system wherein the first control system controller controls the inboard electromagnetic coil driver with the first inboard electromagnetic coil generating a electromagnetic field to electromagnetically step the first inboard magnets of the at least first counterweight balancing rotor to electromagnetically actuate rotational movement of the first counterweight balancing rotor around the first propeller system and relative to the inboard electromagnetic coil driver, and the first control system controller controls the inboard electromagnetic coil driver with the second inboard electromagnetic coil generating an electromagnetic field to electromagnetically step the second inboard magnets of the second counterweight balancing rotor to electromagnetically actuate rotational movement of the second counterweight balancing rotor around the first rotation axis and relative to the inboard electromagnetic coil driver. Preferably the method includes providing a third counterweight rotating balancing rotor, the third counterweight balancing rotor including a third plurality of holding stepping inboard magnets and a third outboard mass concentration, and a fourth counterweight rotating balancing rotor, the fourth counterweight balancing rotor including a fourth plurality of holding stepping inboard magnets and a fourth outboard mass concentration. Preferably the method includes providing a second inboard electromagnetic coil driver, the second inboard electromagnetic coil driver including a third inboard electromagnetic coil, and a fourth inboard electromagnetic coil. Preferably the method includes disposing the second inboard electromagnetic coil driver and the third counterweight balancing rotor and the fourth counterweight balancing rotor around the second propeller system with the third inboard electromagnetic coil proximate the third inboard magnets of the third counterweight balancing rotor, the second inboard electromagnetic coil driver proximate the second rotation axis and the third counterweight balancing rotor outboard of the third inboard electromagnetic coil, and the fourth inboard electromagnetic coil proximate the fourth counterweight balancing rotor, with the fourth inboard electromagnetic coil proximate the fourth inboard magnets of the fourth counterweight balancing rotor. Preferably the method includes providing a second control system controller and disposing the second control system controller proximate the second propeller system wherein the second control system controller controls the second inboard electromagnetic coil driver with the third inboard electromagnetic coil generating an electromagnetic field to electromagnetically step the third inboard magnets of the third counterweight balancing rotor to electromagnetically actuate rotational movement of the third counterweight balancing rotor around the second propeller system and relative to the second inboard electromagnetic coil driver, and the second control system controller controls the second inboard electromagnetic coil driver with the fourth inboard electromagnetic coil generating an electromagnetic field to electromagnetically step the fourth inboard magnets of the fourth counterweight balancing rotor to electromagnetically actuate rotational movement of the fourth counterweight balancing rotor around the second rotation axis and relative to the second inboard electromagnetic coil driver. Preferably the method includes inhibiting the first control system controller from controlling the second inboard electromagnetic coil driver, third inboard electromagnetic coil, and the fourth inboard electromagnetic coil, with the balancing controls of the first and second propeller system controlled independently and separately.

In an embodiment the invention includes an aircraft with at least a first propeller system with a first rotation axis and at least a second propeller system with a second rotation axis, preferably the first propeller system is dynamically uncoupled from the second propeller system. The aircraft includes a first counterweight rotating balancing rotor, the first counterweight balancing rotor including a first plurality of holding stepping inboard magnets and a first outboard mass concentration, and a second counterweight rotating balancing rotor, the second counterweight balancing rotor including a second plurality of holding stepping inboard magnets and a second outboard mass concentration. The aircraft includes a first inboard electromagnetic coil driver, the inboard electromagnetic coil driver including a first inboard electromagnetic coil, and a second inboard electromagnetic coil. The first inboard electromagnetic coil driver and the first counterweight balancing rotor and the second counterweight balancing rotor disposed around the first propeller system with the first inboard electromagnetic coil proximate the first inboard magnets of the first counterweight balancing rotor, the inboard electromagnetic coil driver proximate the first rotation axis and the first counterweight balancing rotor outboard of the inboard electromagnetic coil, and the second inboard electromagnetic coil proximate the second counterweight balancing rotor, with the second inboard electromagnetic coil proximate the second inboard magnets of the second counterweight balancing rotor. The aircraft includes a first control system controller, the first control system controller disposed proximate the first propeller system wherein the first control system controller controls the inboard electromagnetic coil driver with the first inboard electromagnetic coil generating a electromagnetic field to electromagnetically step the first inboard magnets of the at least first counterweight balancing rotor to electromagnetically actuate rotational movement of the first counterweight balancing rotor around the first propeller system and relative to the inboard electromagnetic coil driver, and the first control system controller controls the inboard electromagnetic coil driver with the second inboard electromagnetic coil generating an electromagnetic field to electromagnetically step the second inboard magnets of the second counterweight balancing rotor to electromagnetically actuate rotational movement of the second counterweight balancing rotor around the first rotation axis and relative to the inboard electromagnetic coil driver. The aircraft includes a third counterweight rotating balancing rotor, the third counterweight balancing rotor including a third plurality of holding stepping inboard magnets and a third outboard mass concentration, and a fourth counterweight rotating balancing rotor, the fourth counterweight balancing rotor including a fourth plurality of holding stepping inboard magnets and a fourth outboard mass concentration. The aircraft includes a second inboard electromagnetic coil driver, the second inboard electromagnetic coil driver including a third inboard electromagnetic coil, and a fourth inboard electromagnetic coil, the second inboard electromagnetic coil driver and the third counterweight balancing rotor and the fourth counterweight balancing rotor disposed around the second propeller system with the third inboard electromagnetic coil proximate the third inboard magnets of the third counterweight balancing rotor, the second inboard electromagnetic coil driver proximate the second rotation axis and the third counterweight balancing rotor outboard of the third inboard electromagnetic coil, and the fourth inboard electromagnetic coil proximate the fourth counterweight balancing rotor, with the fourth inboard electromagnetic coil proximate the fourth inboard magnets of the fourth counterweight balancing rotor. The aircraft includes a second control system controller, the second control system controller disposed proximate the second propeller system wherein the second control system controller controls the second inboard electromagnetic coil driver with the third inboard electromagnetic coil generating an electromagnetic field to electromagnetically step the third inboard magnets of the third counterweight balancing rotor to electromagnetically actuate rotational movement of the third counterweight balancing rotor around the second propeller system and relative to the second inboard electromagnetic coil driver, and the second control system controller controls the second inboard electromagnetic coil driver with the fourth inboard electromagnetic coil generating an electromagnetic field to electromagnetically step the fourth inboard magnets of the fourth counterweight balancing rotor to electromagnetically actuate rotational movement of the fourth counterweight balancing rotor around the second rotation axis and relative to the second inboard electromagnetic coil driver. Preferred embodiments include inhibiting the first control system controller from controlling the second inboard electromagnetic coil driver, third inboard electromagnetic coil, and the fourth inboard electromagnetic coil, with the balancing controls of the first and second propeller system controlled independently and separately, preferably with the first control system controller proximate the two balancing rotors it controls and the second control system controller proximate the two balancing rotors it controls independently and separately from the first propeller system.

In an embodiment the invention includes a method of balancing aircraft propeller systems. Preferably the aircraft has more than one propeller system, with the propeller systems of the aircraft dynamically uncoupled. The method includes providing an aircraft with at least a first propeller system with a first rotation axis and at least a second propeller system with a second rotation axis, preferably with the first propeller system dynamically uncoupled from the second propeller system. The method includes providing a first means for actively balancing the first propeller system during aircraft flight. The method includes providing a first control system controller and disposing the first control system controller proximate the first propeller system wherein the first control system controller controls the first means for actively balancing the first propeller system during aircraft flight. The method includes providing a second means for actively balancing the second propeller system during aircraft flight. The method includes providing a second control system controller and disposing the second control system controller proximate the second propeller system wherein the second control system controller controls the second means for actively balancing the second propeller system during aircraft flight. Preferred embodiments include inhibiting the first control system controller from controlling the second means with the balancing controls of the first and second propeller system controlled independently and separately, preferably with the first control system controller proximate the first means and the second control system controller proximate the second means it controls independently and separately from the first propeller system.

In an embodiment the invention includes an aircraft with at least a first propeller system with a first rotation axis and at least a second propeller system with a second rotation axis, preferably with the first propeller system dynamically uncoupled from the second propeller system. The aircraft includes a first means for actively balancing the first propeller system during aircraft flight with a first control system controller, the first control system controller disposed proximate the first propeller system wherein the first control system controller controls the first means for actively balancing the first propeller system. The aircraft includes a second means for actively balancing the second propeller system during aircraft flight with a second control system controller, the second control system controller disposed proximate the second propeller system wherein the second control system controller controls the second means for actively balancing the second propeller system. Preferred embodiments include inhibiting the first control system controller from controlling the second means with the balancing controls of the first and second propeller system controlled independently and separately, preferably with the first control system controller proximate the first means and the second control system controller proximate the second means it controls independently and separately from the first propeller system.

Preferably the first control system controller is not wired or connected with the second control system controller. Preferably the more than one propeller systems are dynamically uncoupled and the more than one control system controllers are not wired or electronically connected together with each controller providing a local control of its local proximate propeller system, preferably with the not wired or electronically connected controllers inhibiting electromagnetic communications between them.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIG. 3A-D illustrates counterweight rotating balancing rotors with holding stepping inboard magnets and outboard mass concentrations.

FIG. 7A-B show exploded views of an electromagnetically actuated balancer mounted between a nonrotating machine member and a rotating machine member.

FIG. 9A-G illustrates rotation restraints.

DETAILED DESCRIPTION OF THE PREFERRED EMBODIMENT

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

In embodiments the invention includes aircraft propeller balancing systems for balancing rotating machine propeller systems on aircraft. Preferably the aircraft propeller balancing systems actively balance the aircraft propeller systems during flight of the aircraft.

Figure 1:
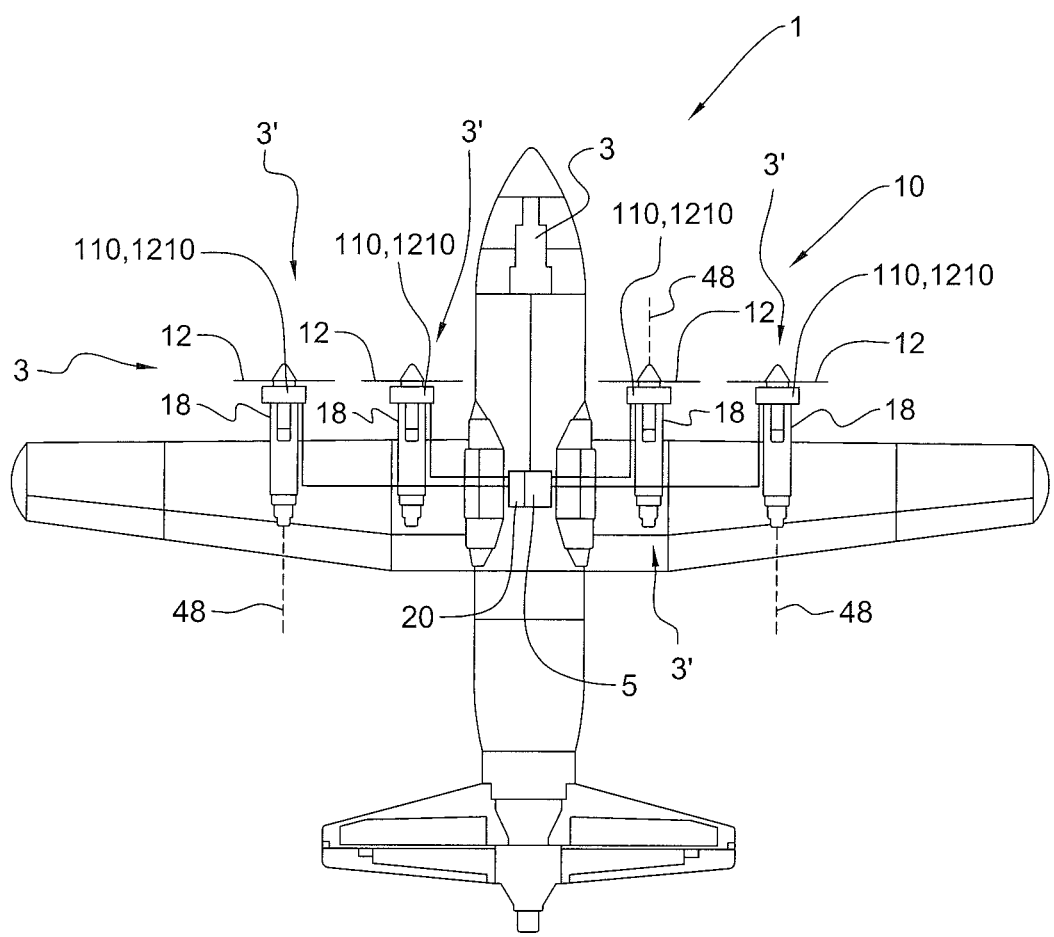
FIG. 1 illustrates a fixed wing aircraft with a propeller balancing system.

FIG. 1 shows an aircraft 1 equipped with an automatic balancing system 10. The aircraft 1 has an aircraft propelling system 3 including at least a first propeller 12, and preferably with propelling system 3 comprised of multiple propeller systems 3' with propellers 12 and engines/gearboxes 18. The aircraft propelling system 3 includes a plurality of propeller systems 3'. The aircraft balancing system 10 includes a balancer assembly 110 coupled to propellers 12. The balancer assemblies 110 are controlled by a centralized global controlling first balancer control system 5 with centralized controller 20 controlling the plurality of balancer assemblies for each propeller.

Figure 2:
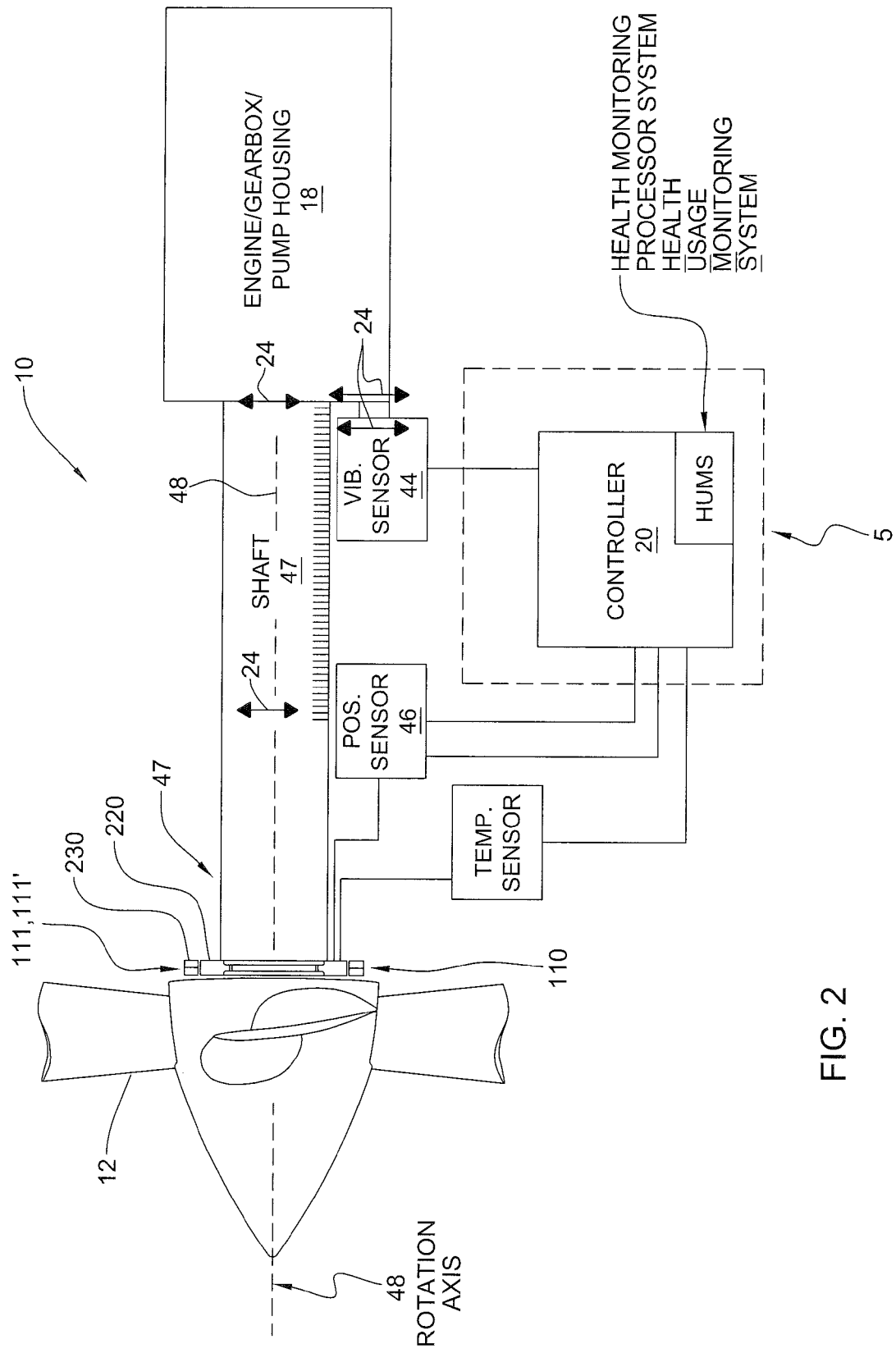
FIG. 2 illustrates a propeller balancing system.
Figure 3A:
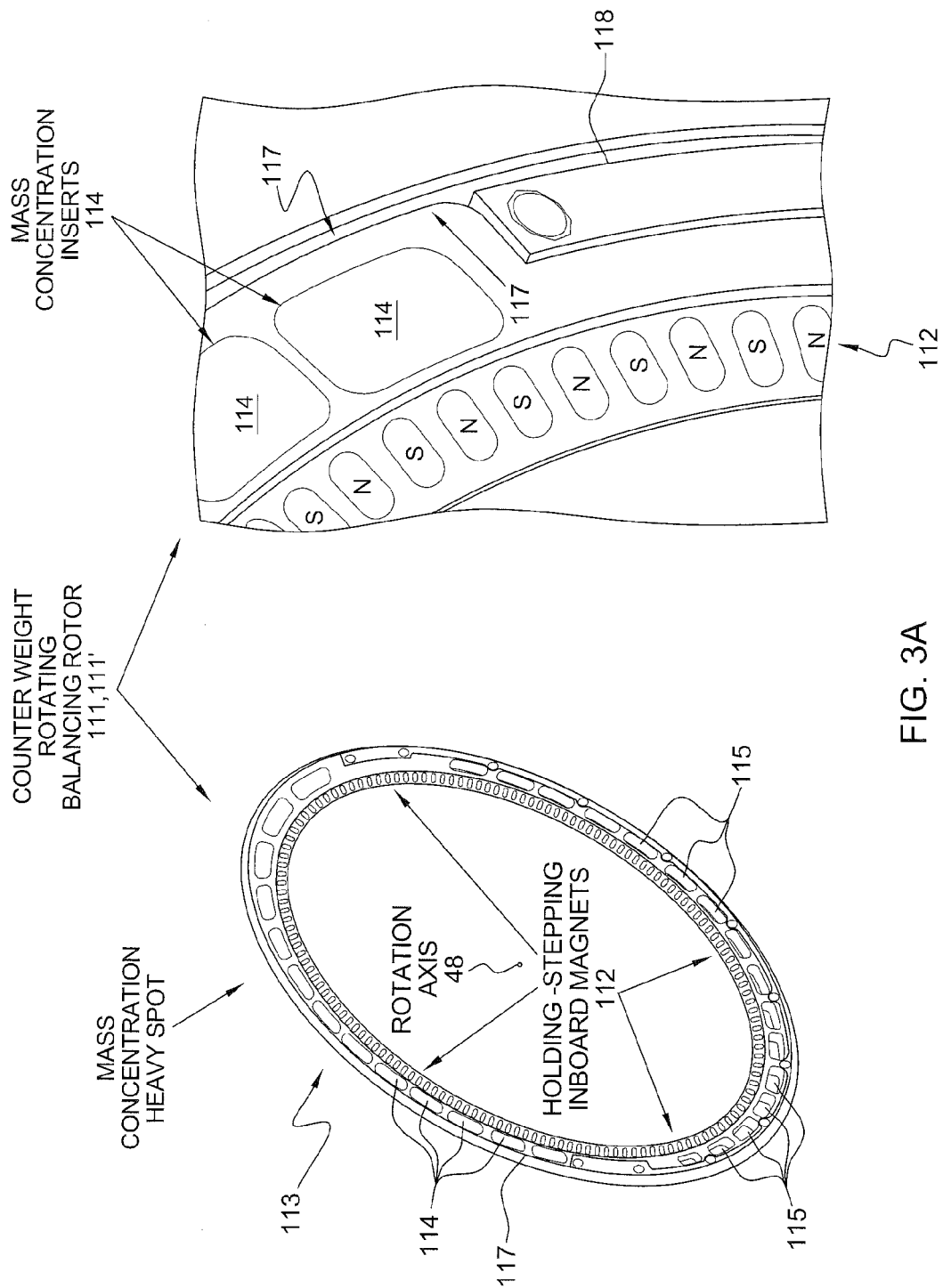
Figure 3B:
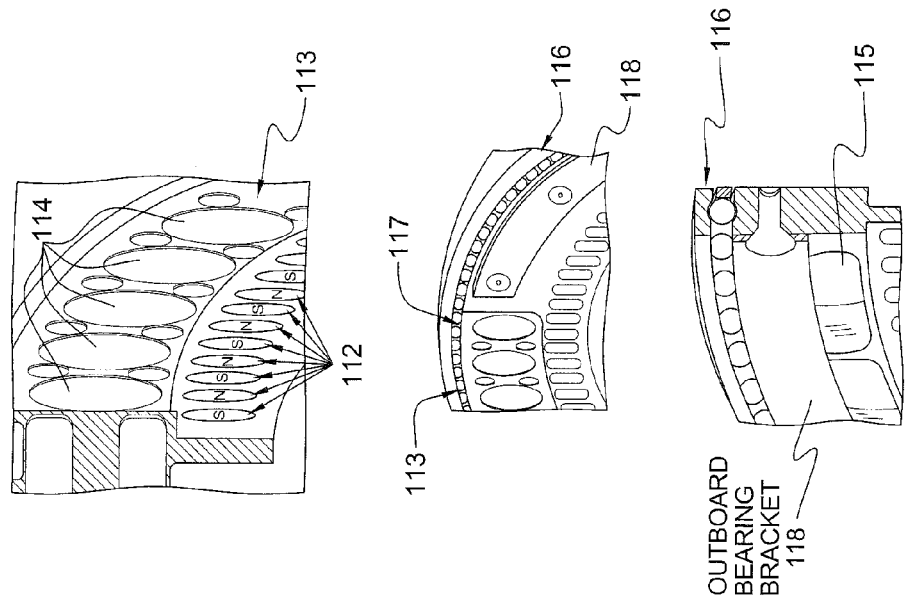
Figure 3B:
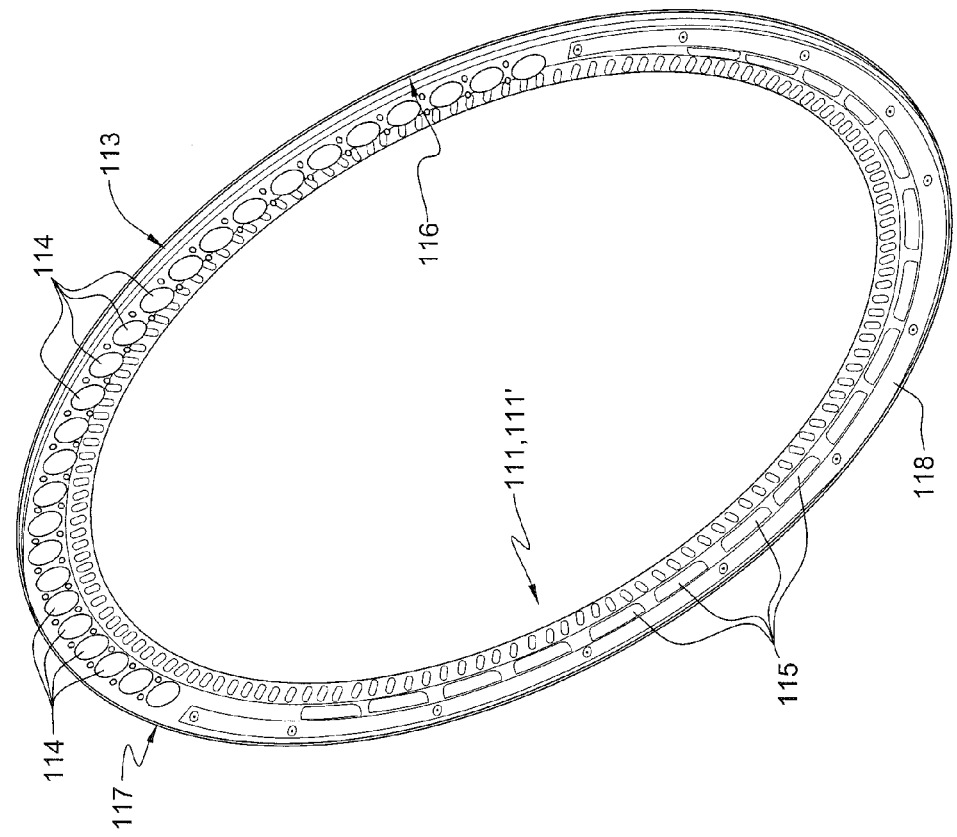
Figure 3D:
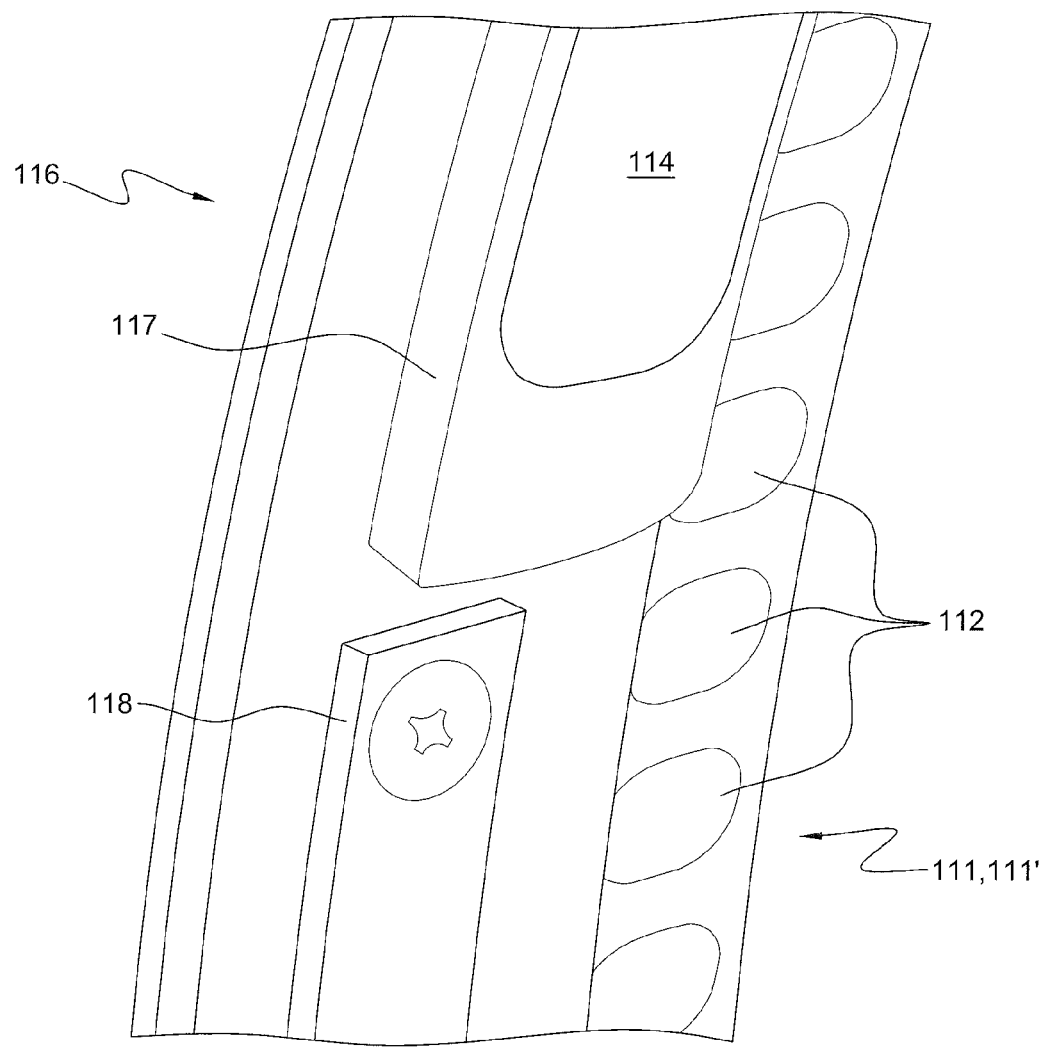

FIG. 2 shows an aircraft balancing system 10. Aircraft balancing system 10 is coupled to a propeller 12 that is rotated by a rotating machine member shaft 47 coupled to a propeller engine/gearbox 18. Propeller 12, shaft 47 and engine/gearbox 18 (propeller system 3') provide an aircraft propelling system 3 that produces motive power for propelling the aircraft. As discussed above, in some instances, propeller 12 can become imbalanced.

As shown in FIG. 2, the balancing system 10 includes a first control system 5 that includes one or more vibration sensors 44 for detecting an imbalance condition in a propeller 12 and propeller shaft 47 of the propeller system. The vibration sensors 44 are located on or proximate to the engine/gearbox 18, preferably with the vibration sensor comprised of an accelerometer radially oriented on the engine/gearbox 18 to measure a vibration 24 lateral to the shaft 47, preferably radially oriented vibration sensor 44 measuring lateral shaft vibration 24. The control system 5 includes one or more position sensors 46 for detecting the positions of adjustable balancing counterweight rotating balancing rotors of the balancer assembly 110. The position sensors 46 are located proximate to the balancer assembly 110 and proximate the adjustable balancing counterweight rotating balancing rotors whose counter weight rotational position is being measured, preferably with the position sensors 46 in the balancer assembly 110, preferably in the inboard electromagnetic coil driver 220, preferably Hall effect magnetic position sensors which are stationary with respect to the rotating machine member and mounted in close non-contacting proximity to the rotors, the output position sensor signals of the Hall effect device position sensors representative of shaft position and the positions of balancing ring rotors, with the magnetic position sensors producing a pulse that is proportional to the length of time that the particular position sensor is in proximity to the magnet targets located on the rotating members, with the rotating machine member shaft speed preferably computed by counting the rate of Hall effect sensor pulses caused by the passing rotating target, and angular position of each rotor relative to the rotating assembly measured by the phase shift between sensor pulses caused by magnetic targets on each rotor and pulses caused by the rotating magnetic target grounded to the rotating machine member shaft.

The propeller balancer assembly preferably includes a plurality of balance correction rotating balancing rotors 111, 111' that are electromagnetically positional around the rotating machine member shaft 47 and the rotation axis 48. The positional rotating balancing rotors 111, 111' are weighted, and are selectively stepped and held with a pattern of inboard positioning magnets 112 to cooperatively correct an imbalanced condition of rotating propeller 12 and shaft 47.

Figure 4A:
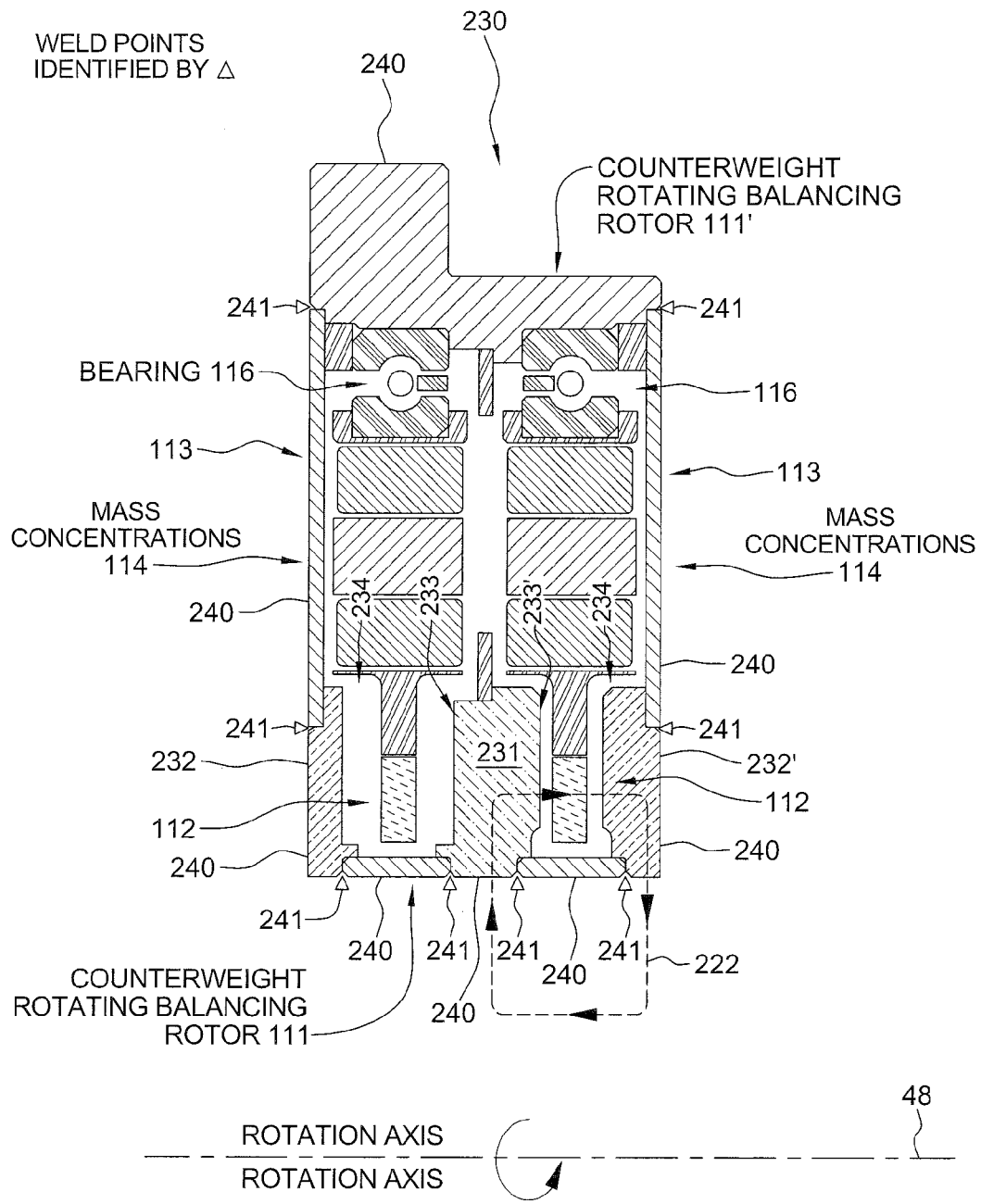
FIG. 4A-D show cross sections and internal details inside the electromagnetically actuated balancer assembly of a balancing system.
Figure 4B:
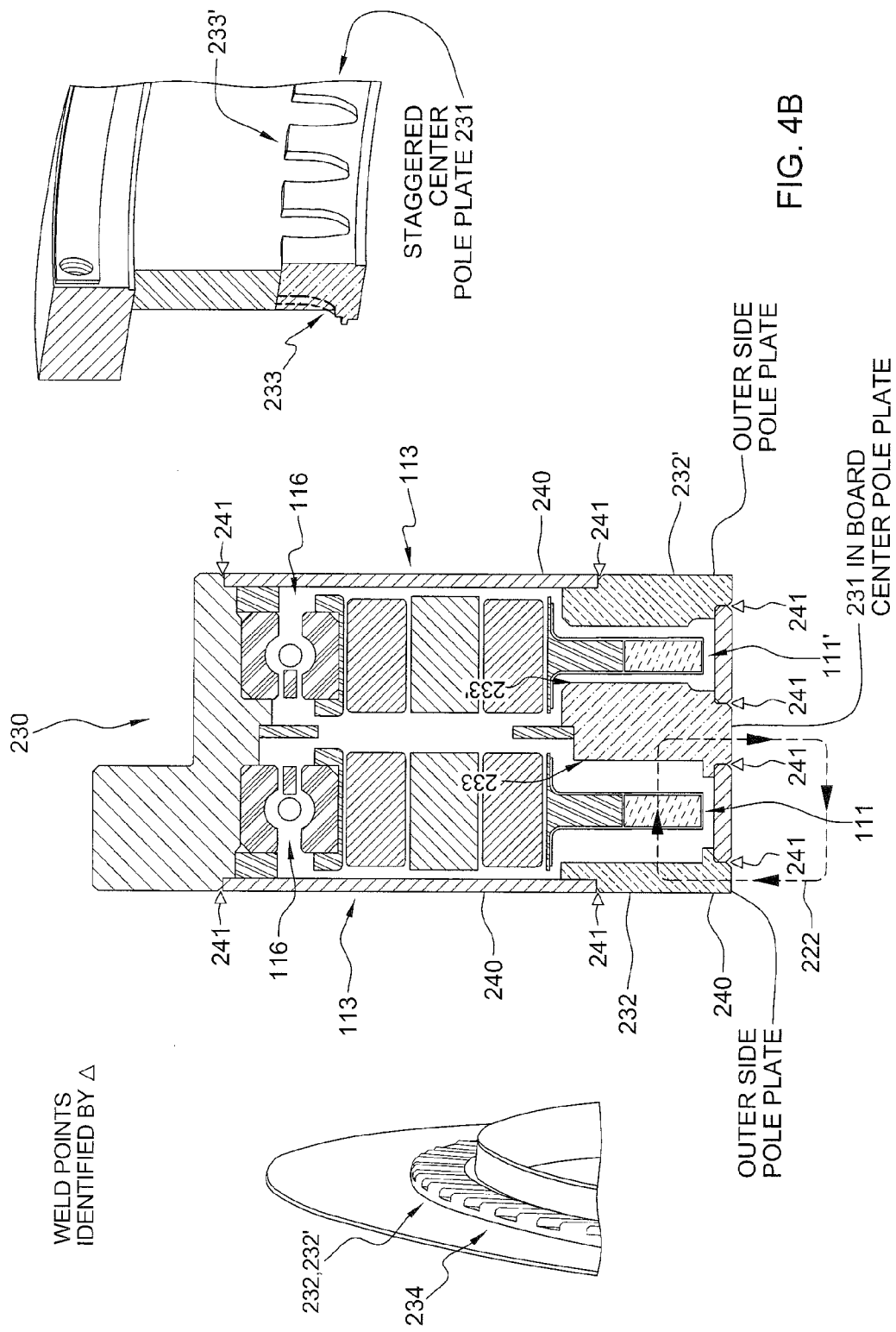
Figure 4C:
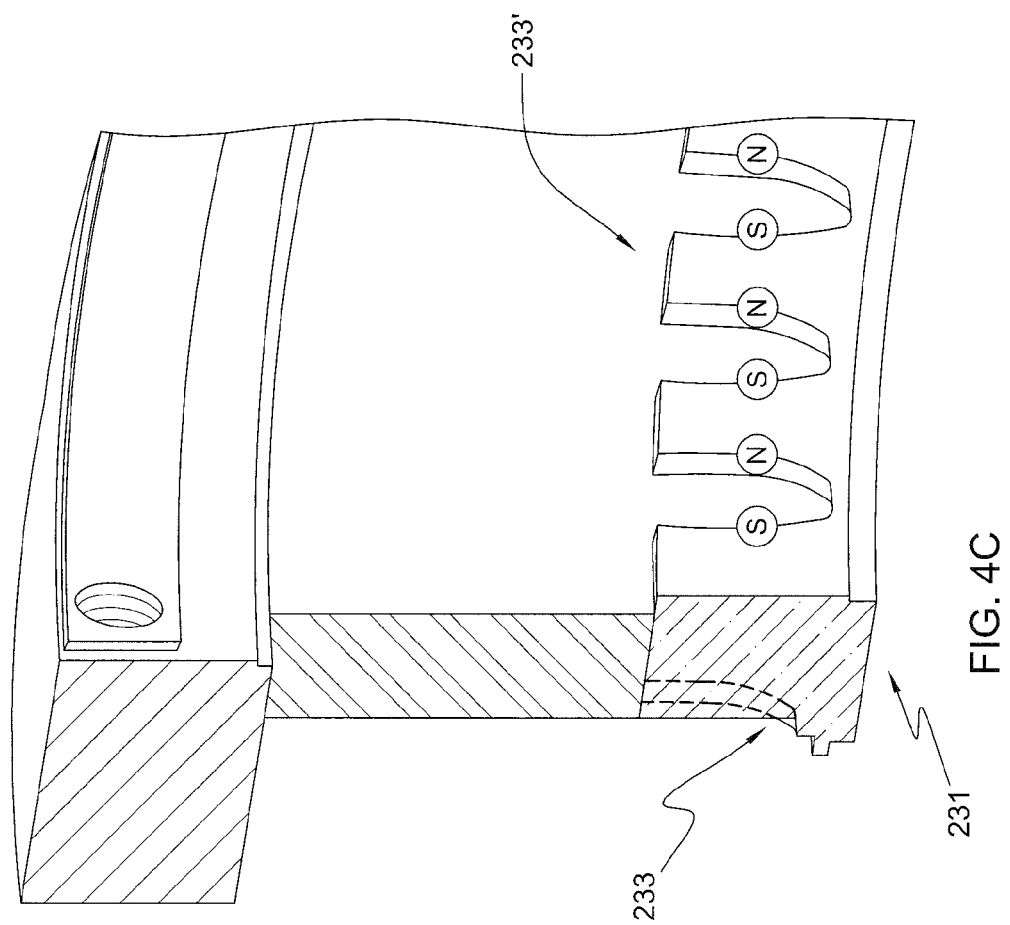
Figure 4D:
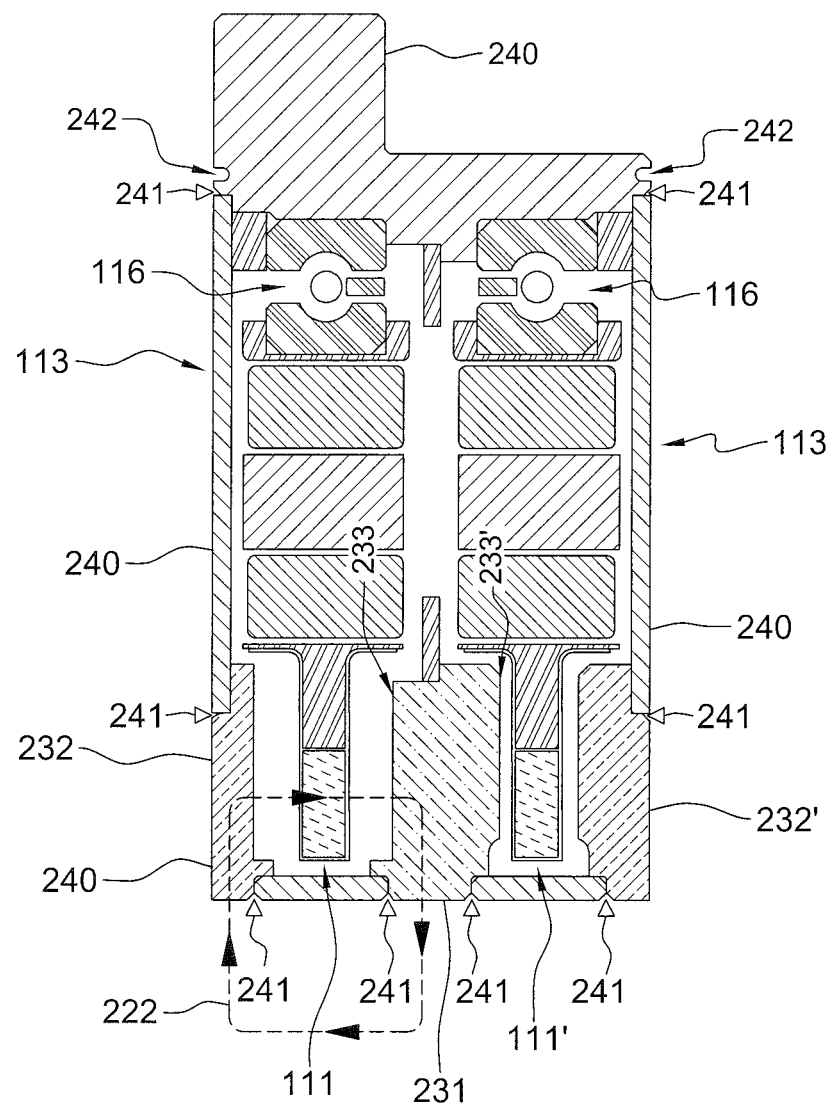
Figure 5:
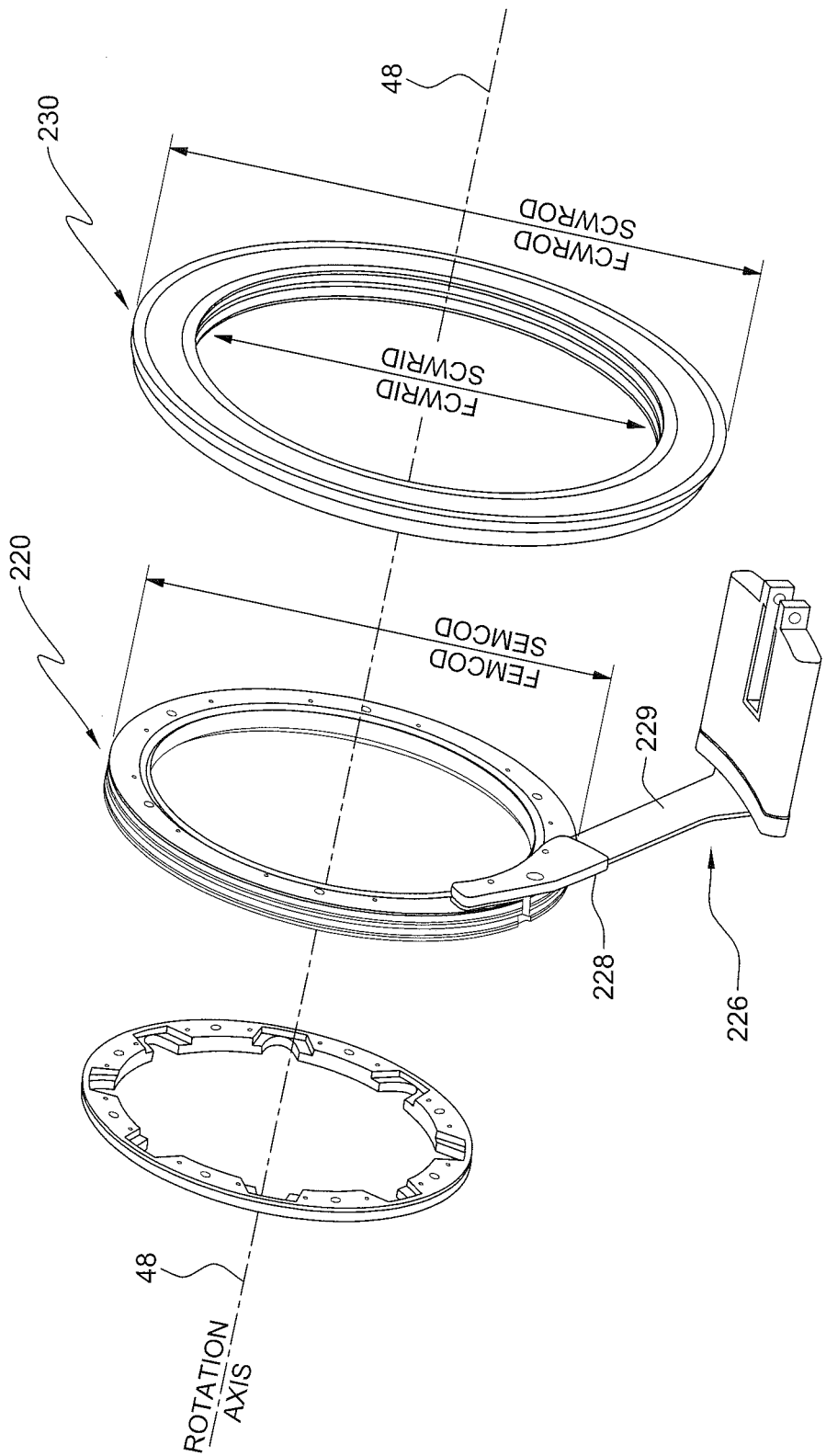
FIG. 5 illustrates the relationship in an electromagnetically actuated balancer of the inboard electromagnetic coil driver and the balancer casing containing counterweight rotating balancing rotors.
Figure 6A:
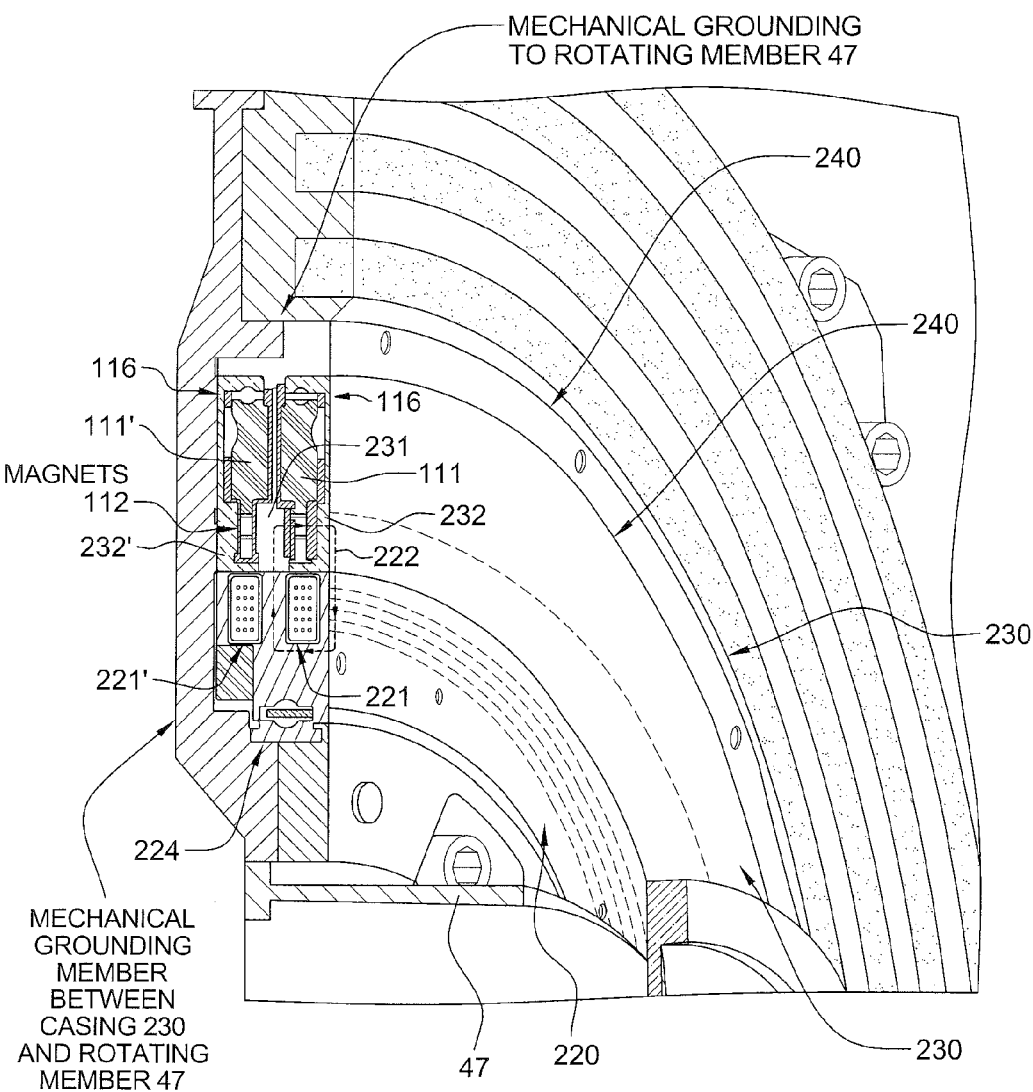
FIG. 6A-B show cross sections of a mounted electromagnetically actuated balancer assembly.
Figure 6B:
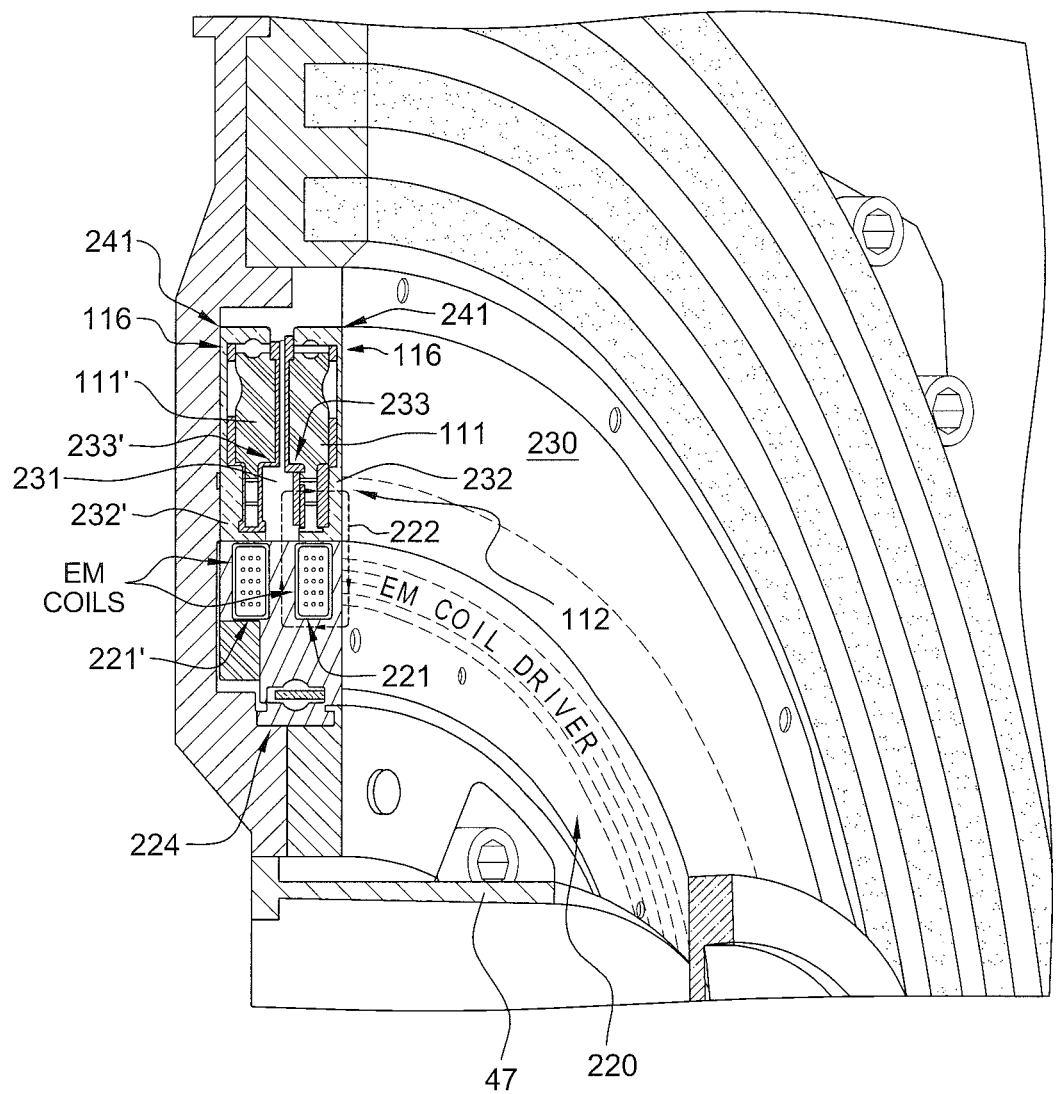
Figure 7B:
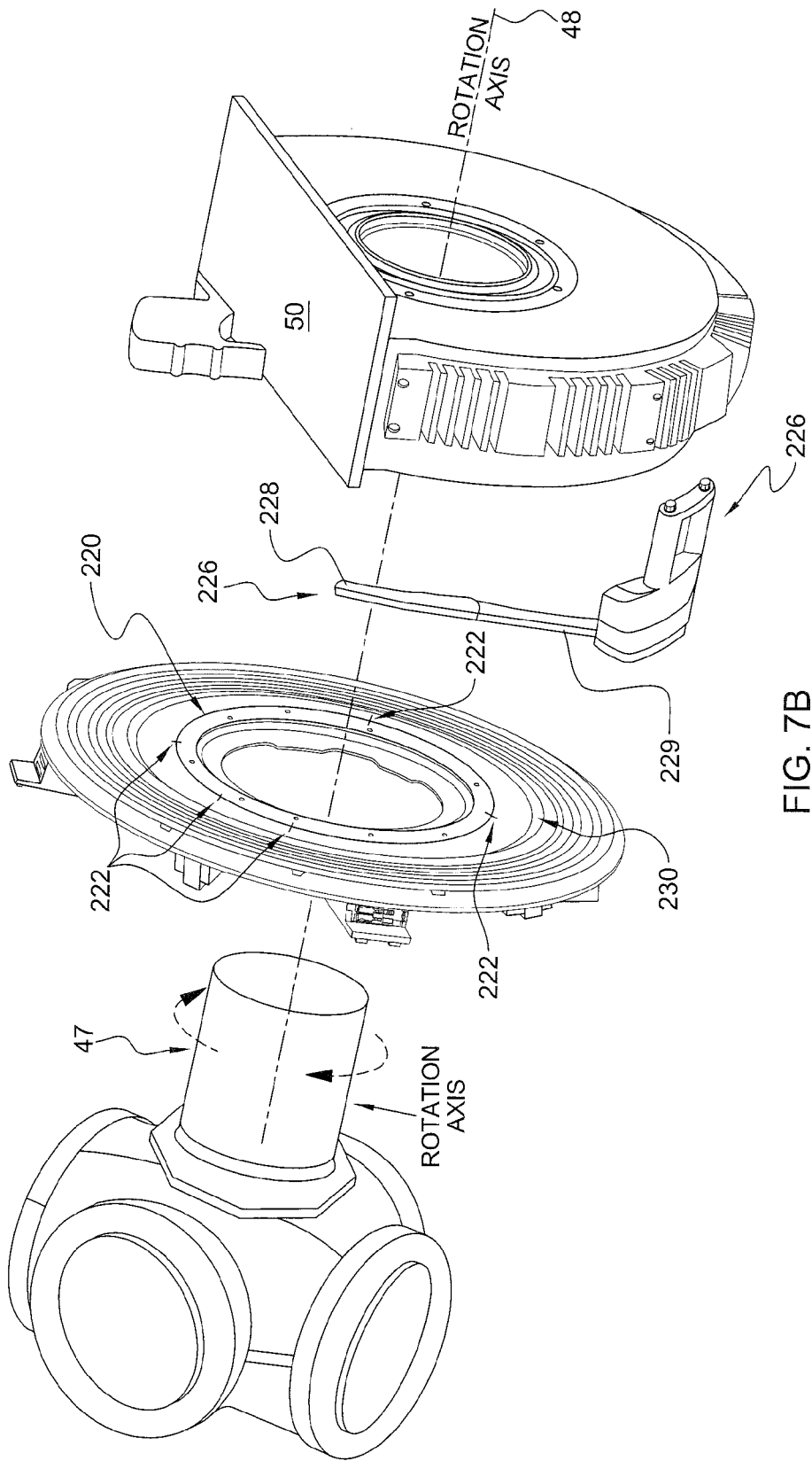
Figure 8A:
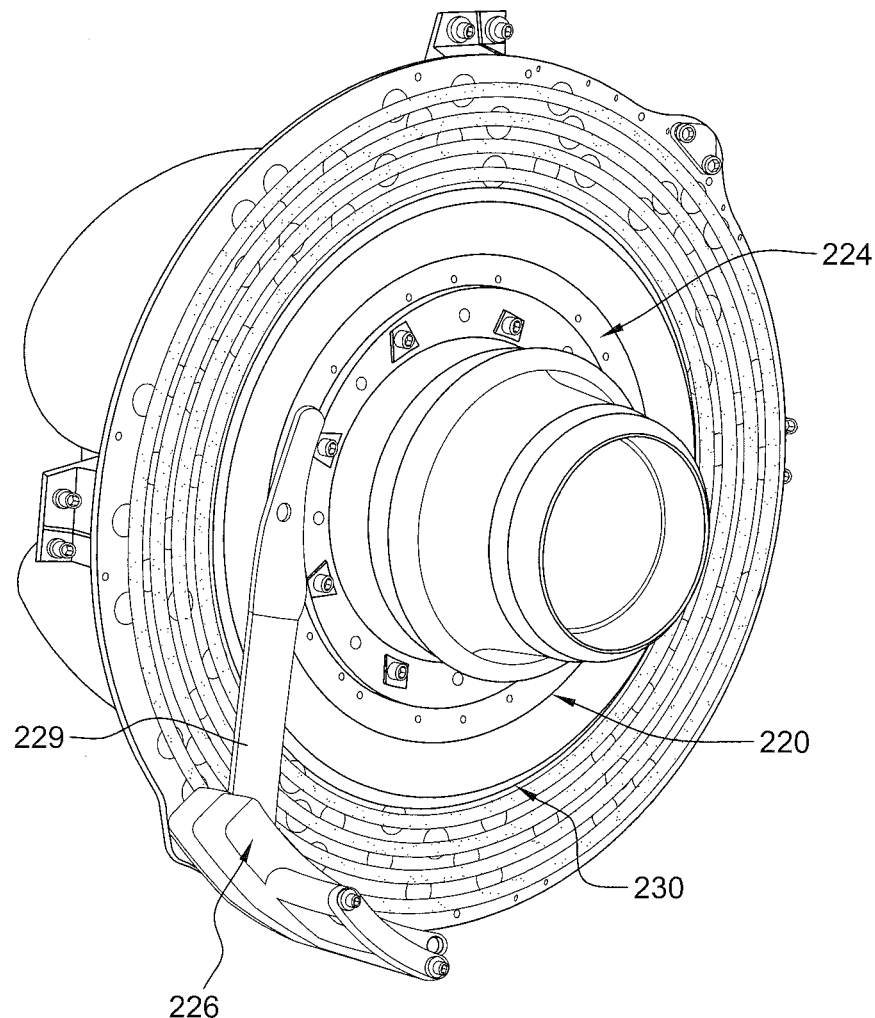
FIG. 8A-B illustrates an electromagnetically actuated balancer assembly on a rotating machine member.
Figure 8B:
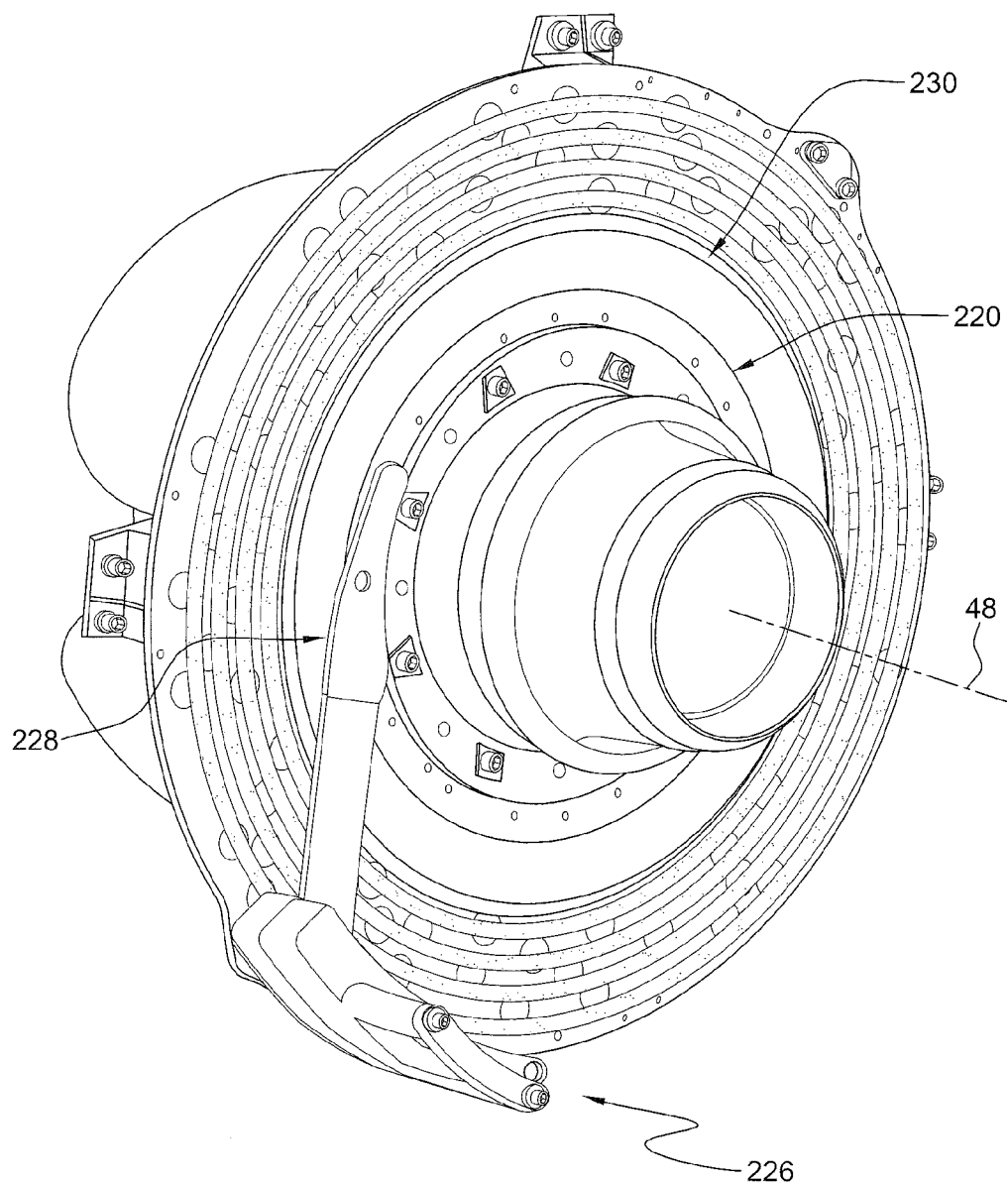
Figure 9A:
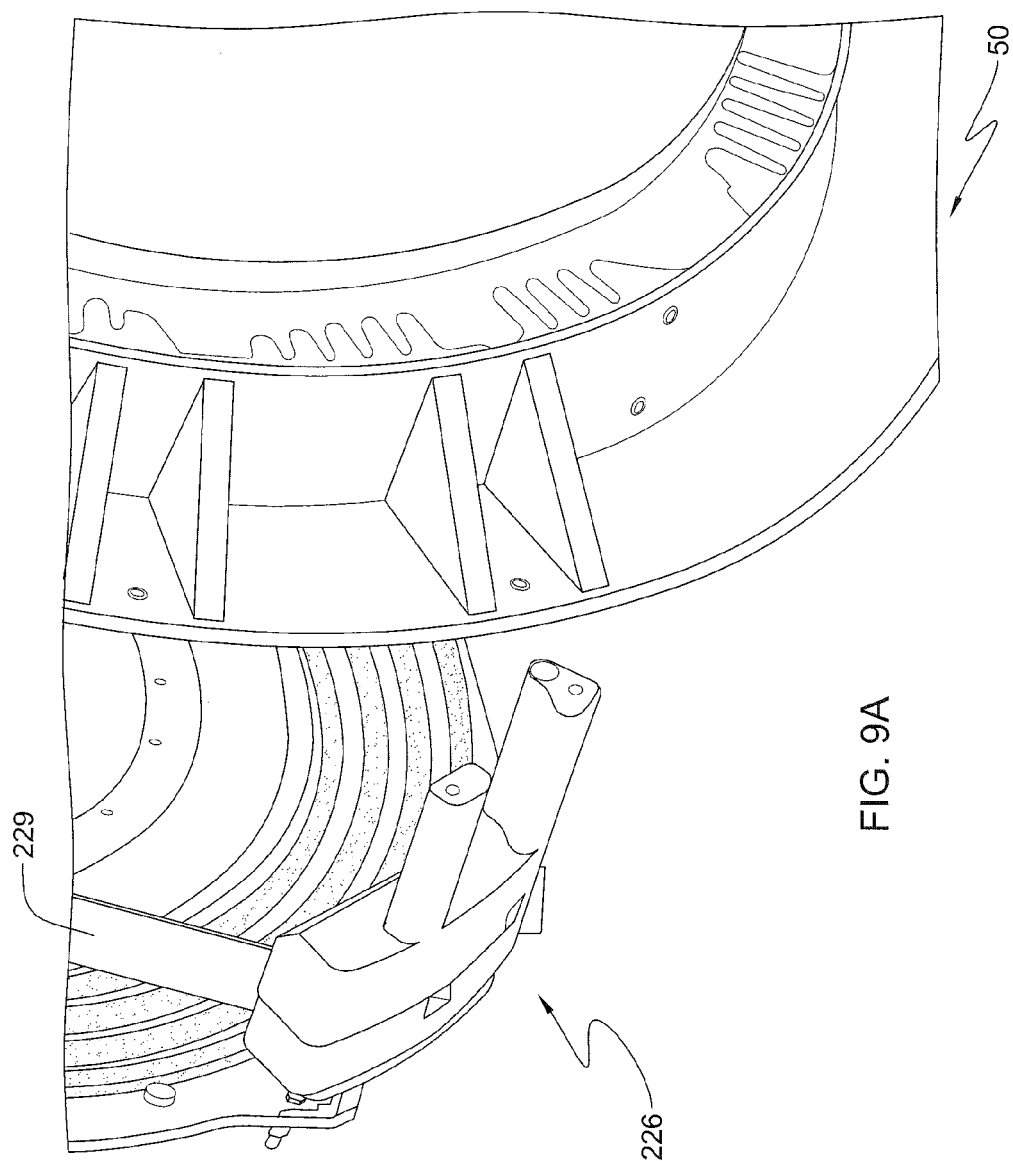
Figure 9B:
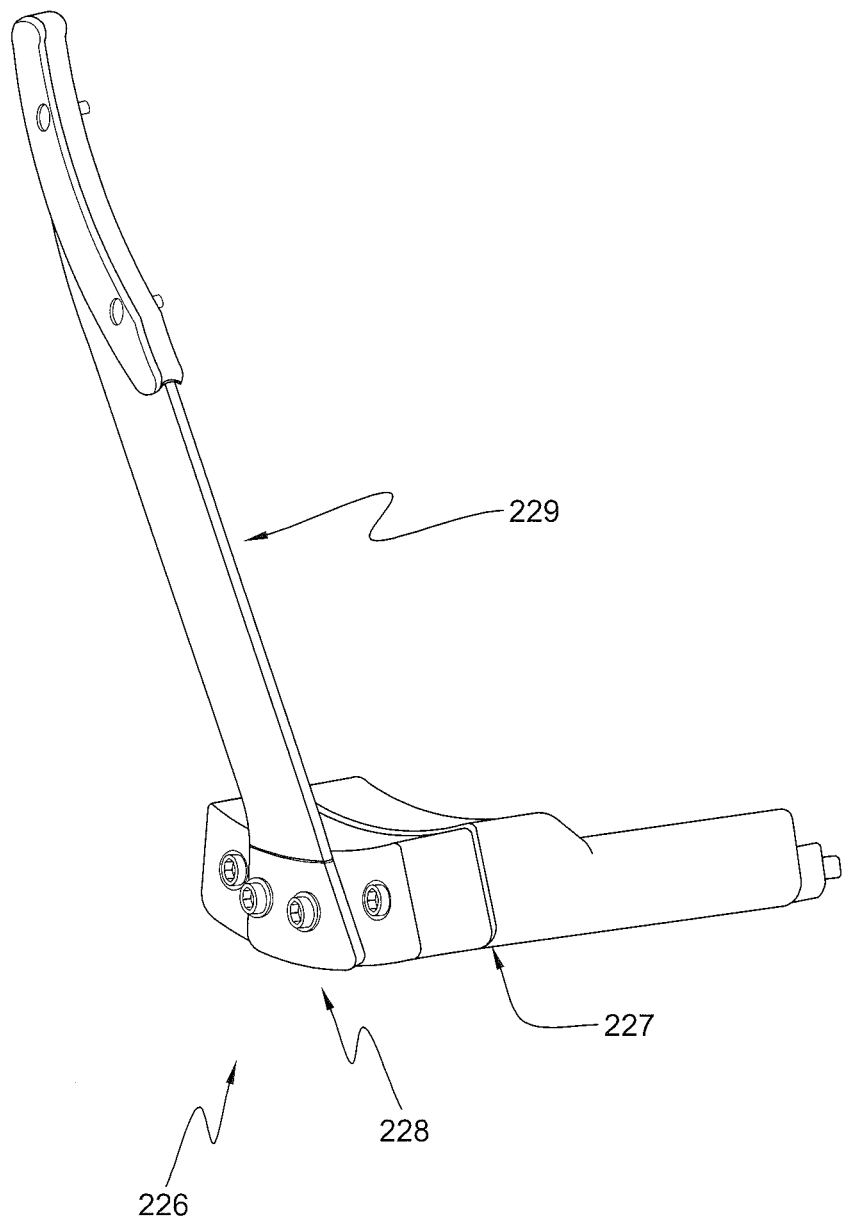
Figure 9C:
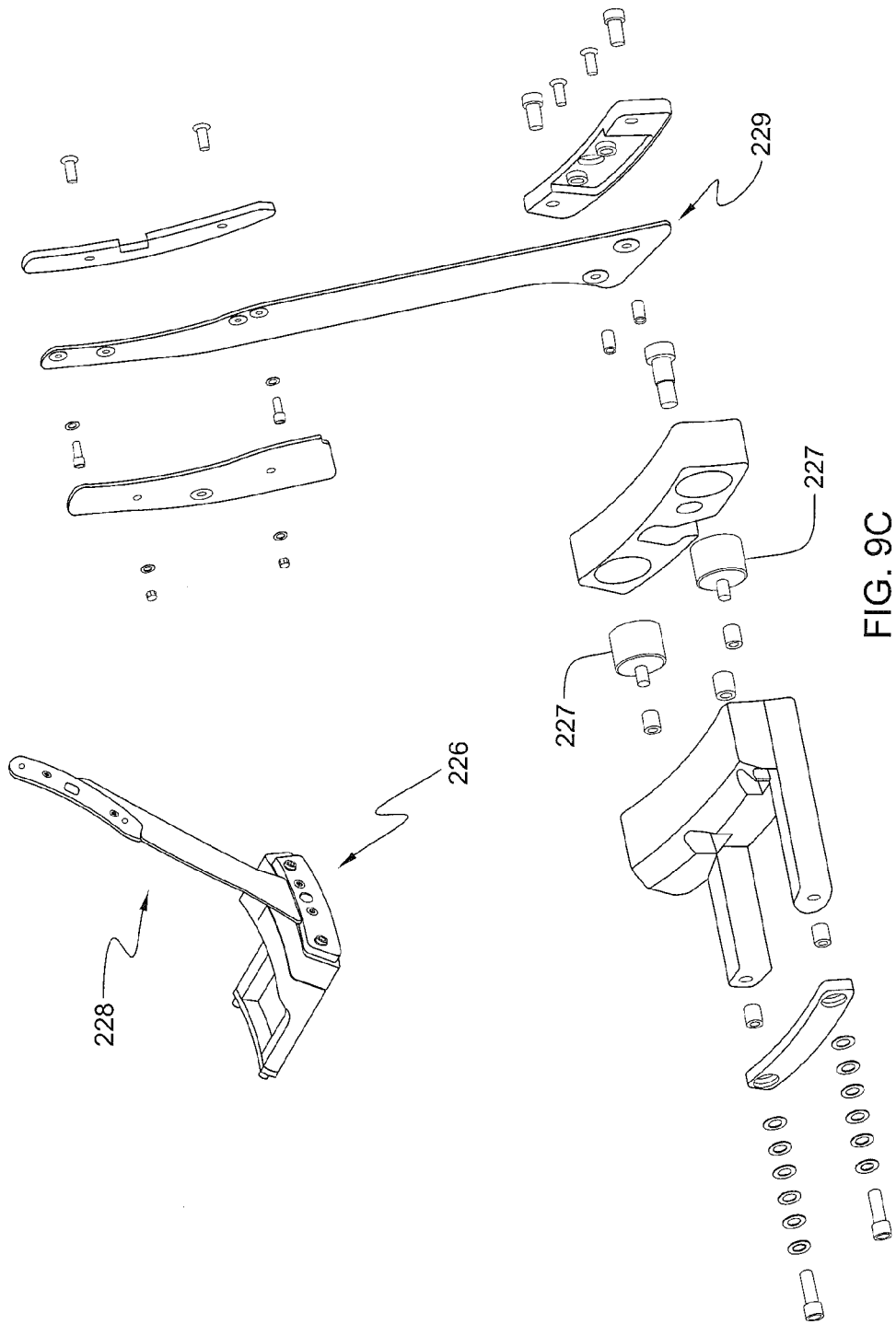
Figure 9D:
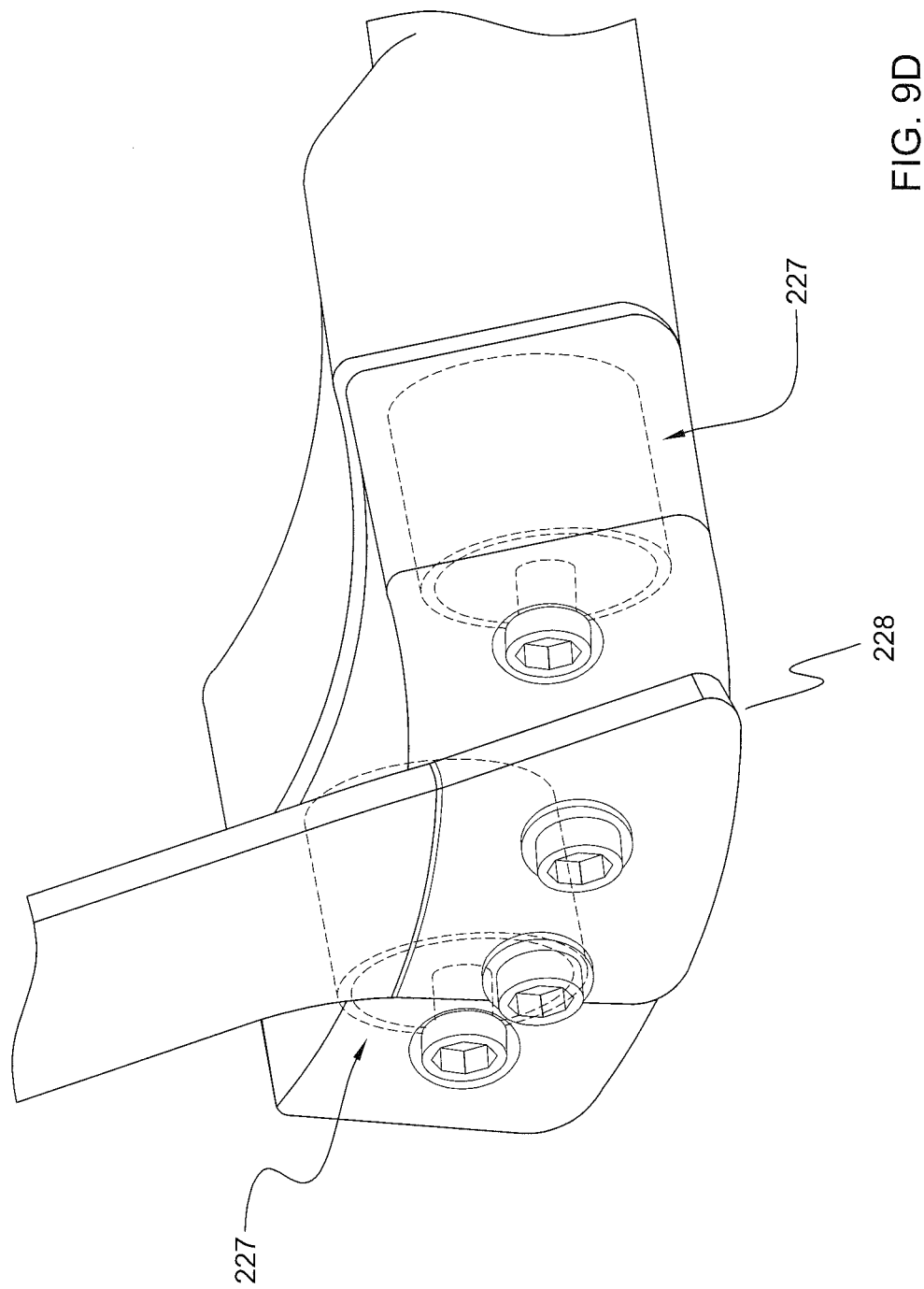
Figure 9E:
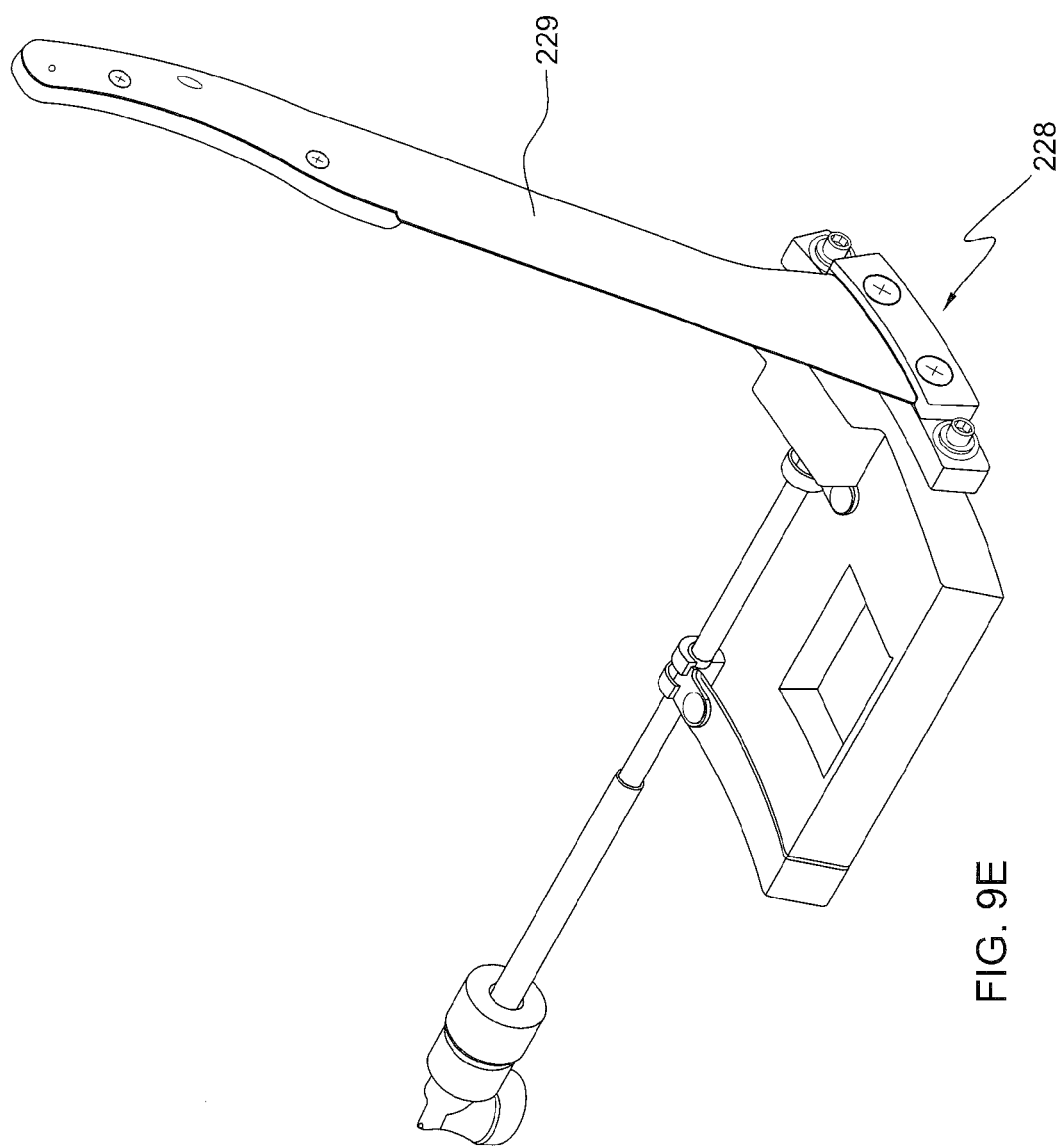
Figure 9G:
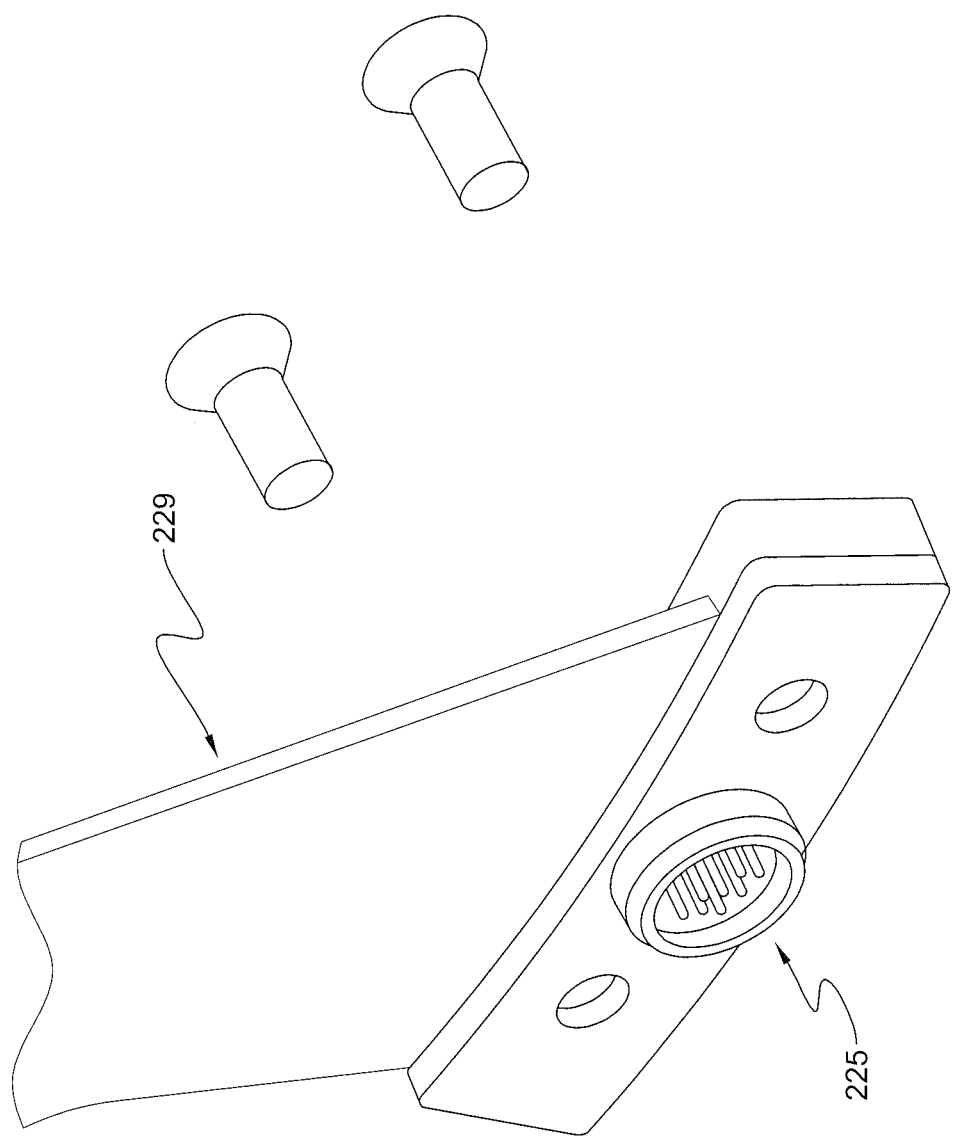
Figure 10A:
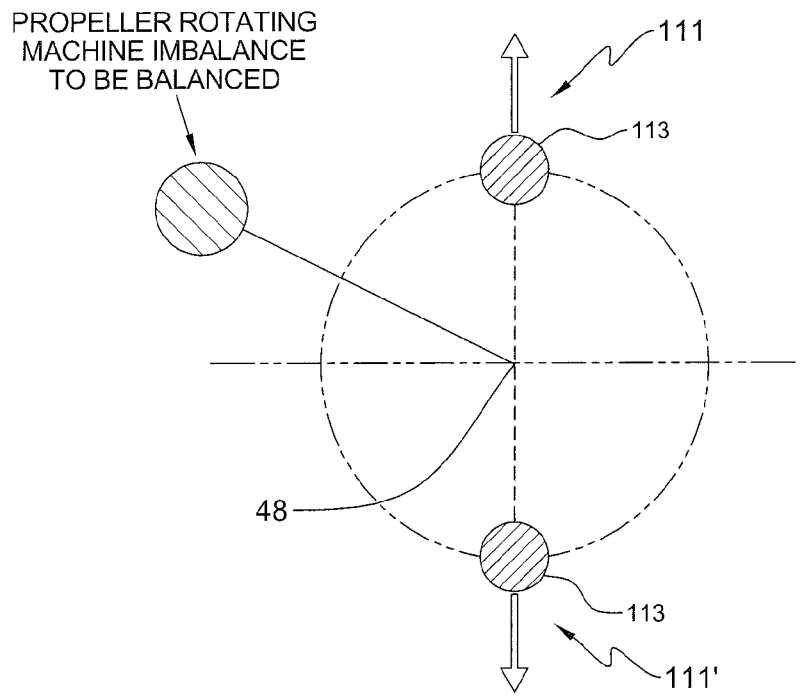
FIG. 10A-C illustrates methods of balancing propeller rotating machine imbalances.
Figure 10B:
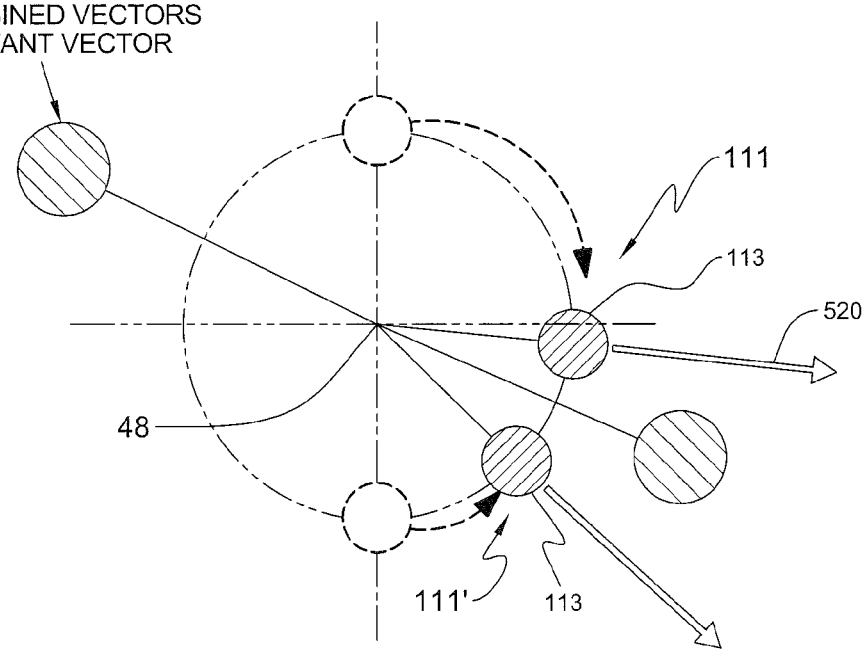
Figure 10C:
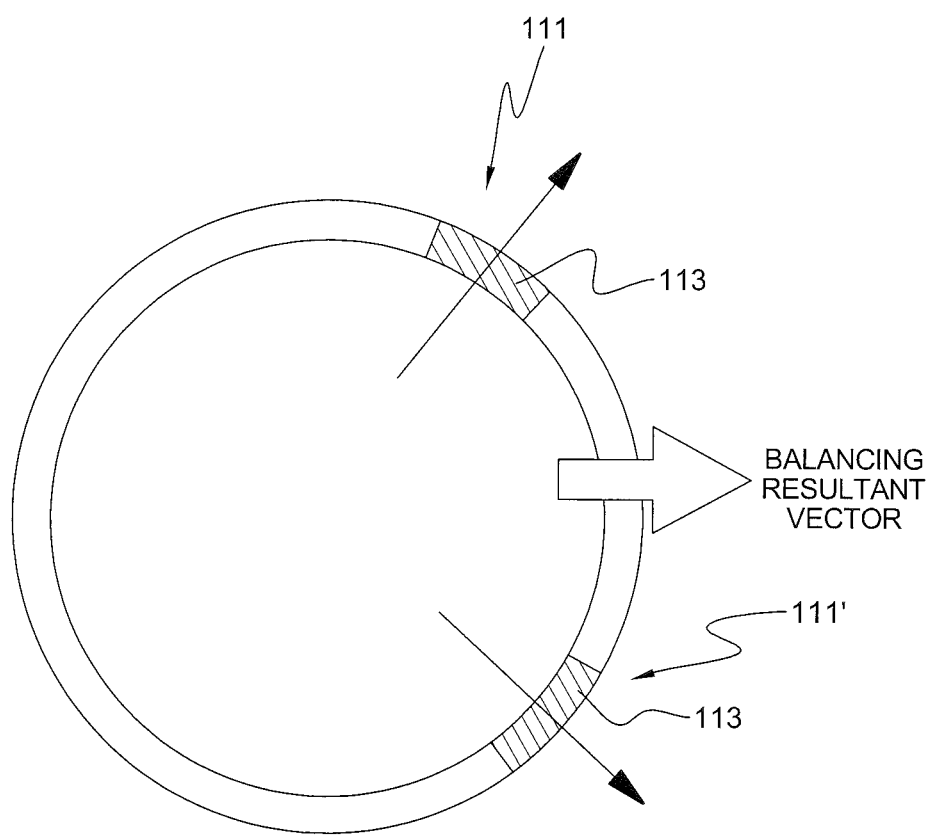
Figure 11A:
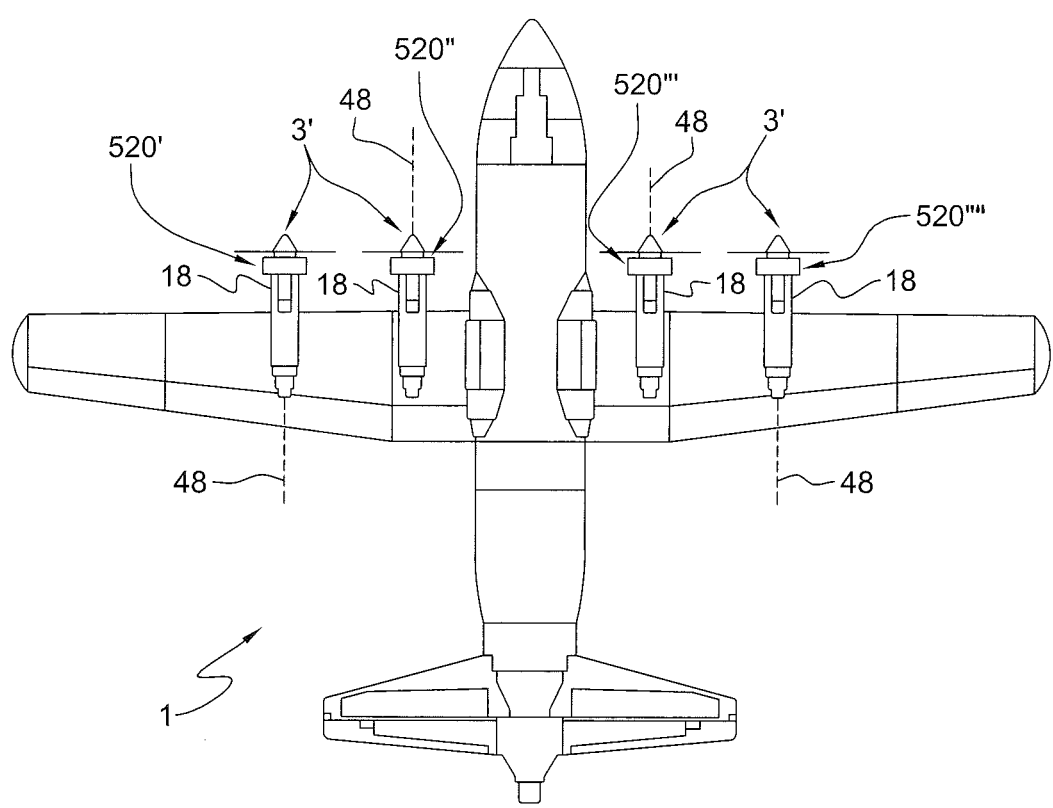
FIG. 11A-G illustrate an aircraft with a decentralized propeller balancing system with independent propeller balancing systems on each propeller with the independent propeller balancing systems each having its own local controller proximate the propeller and engine.
Figure 11B:
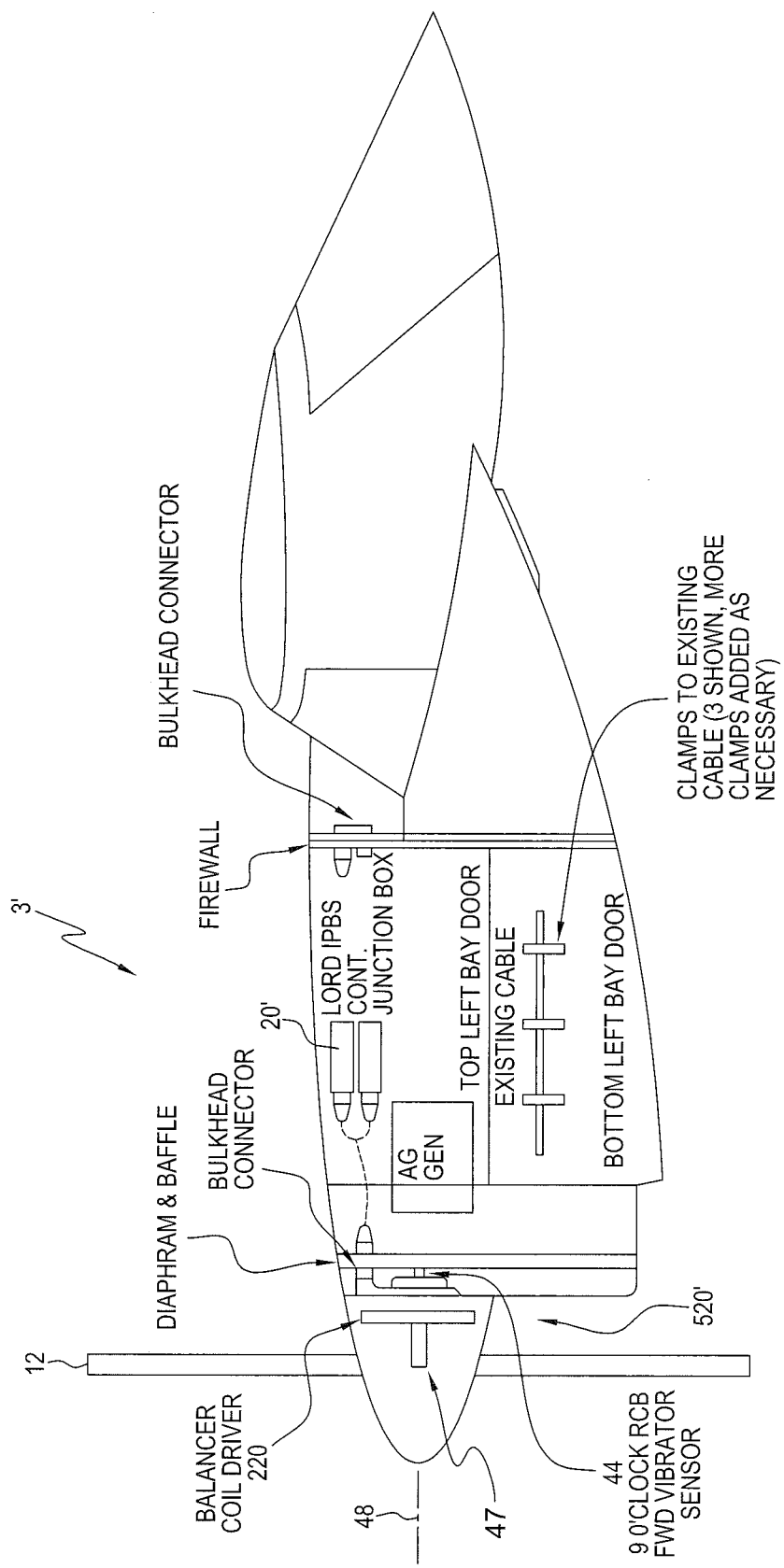
Figure 11C:
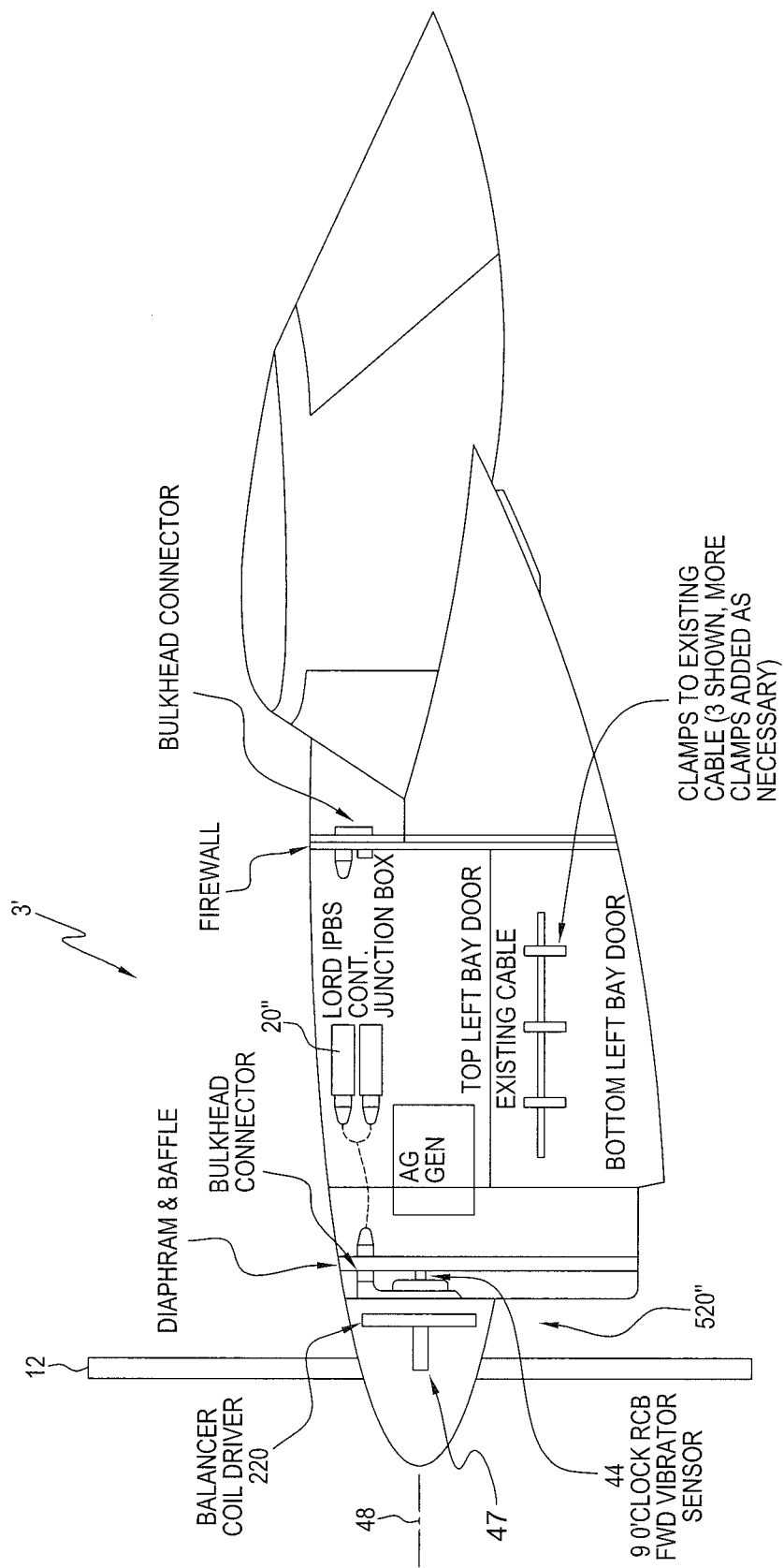
Figure 11D:
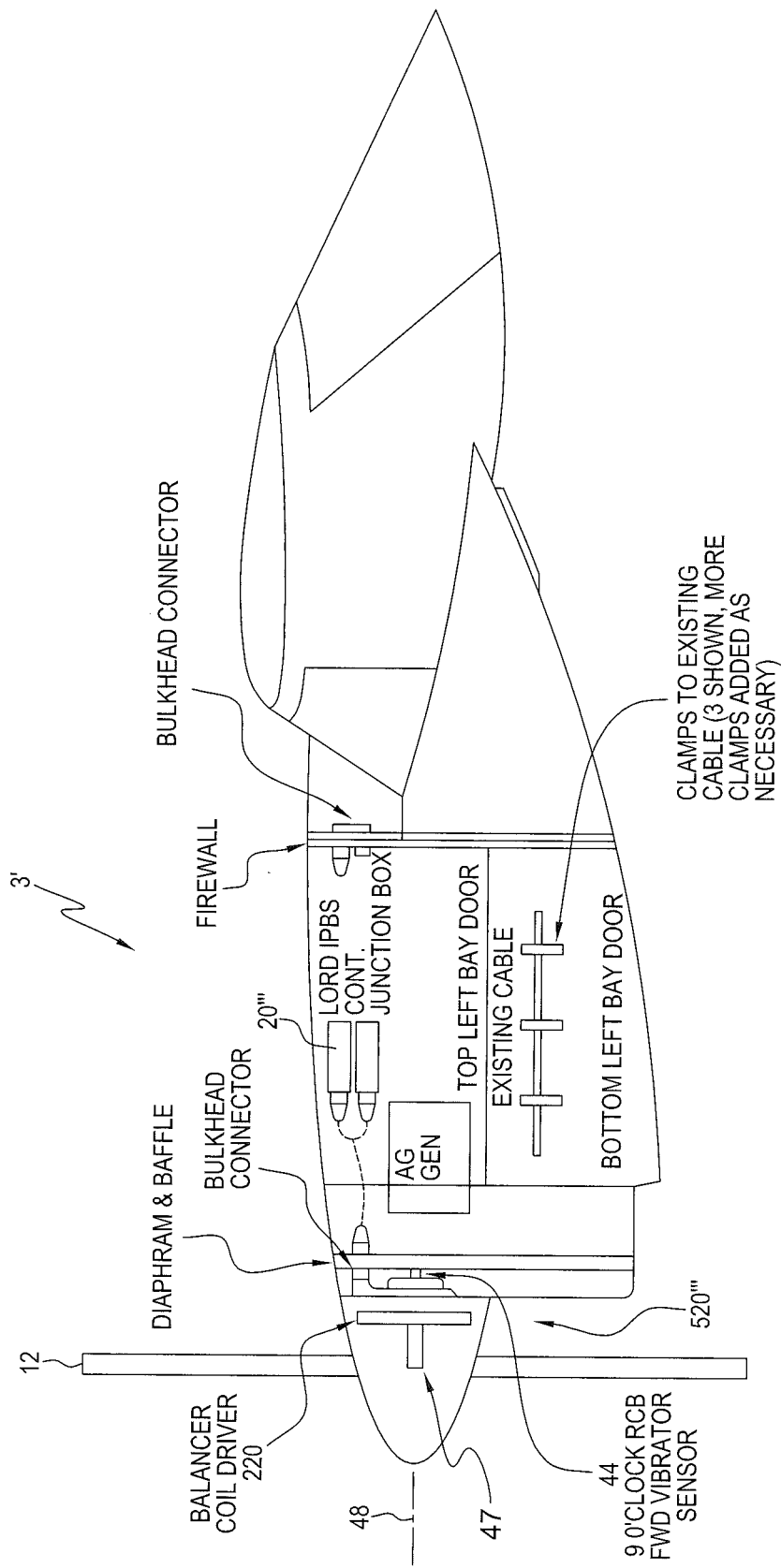
Figure 11E:
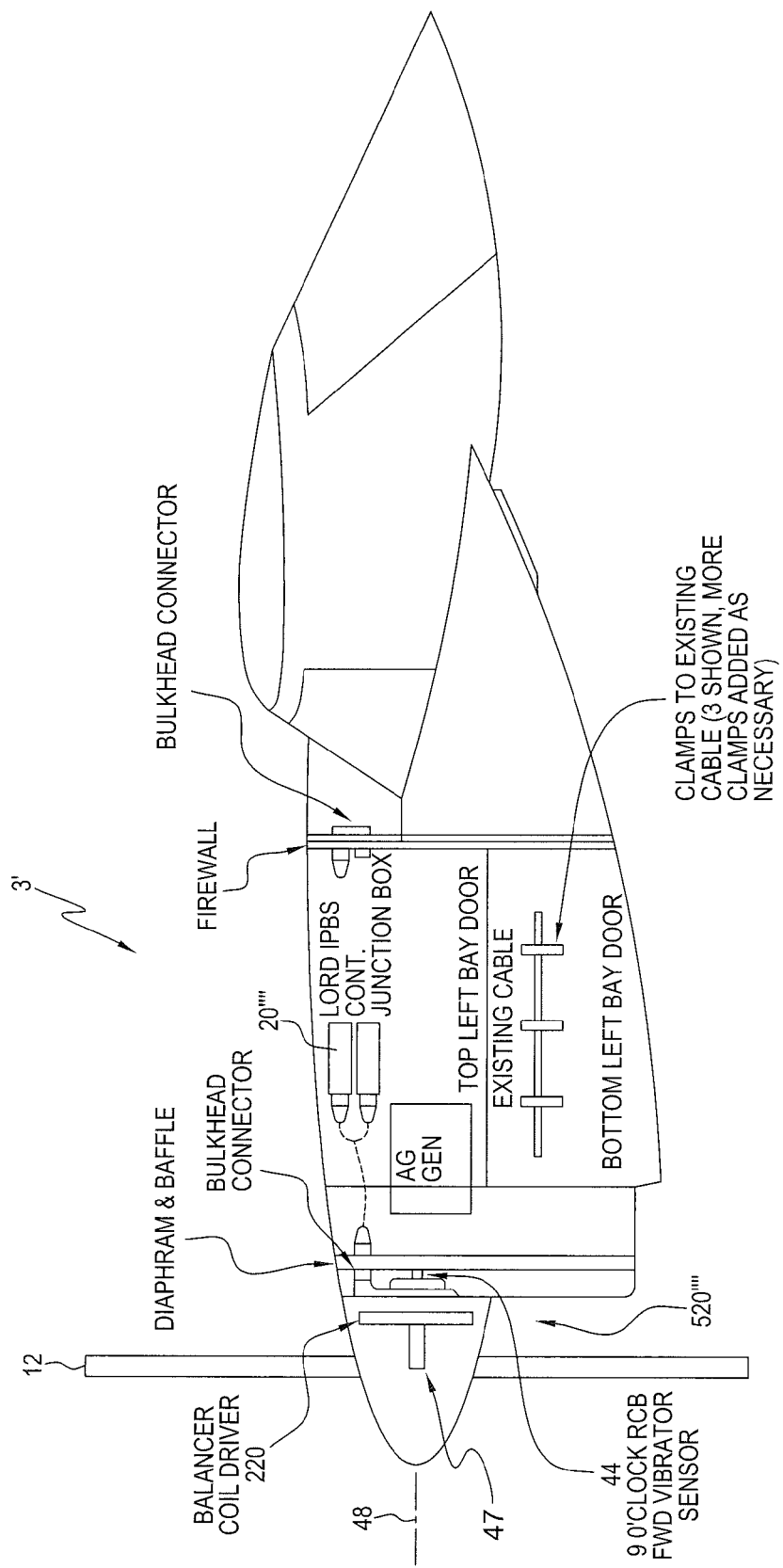
Figure 11F:
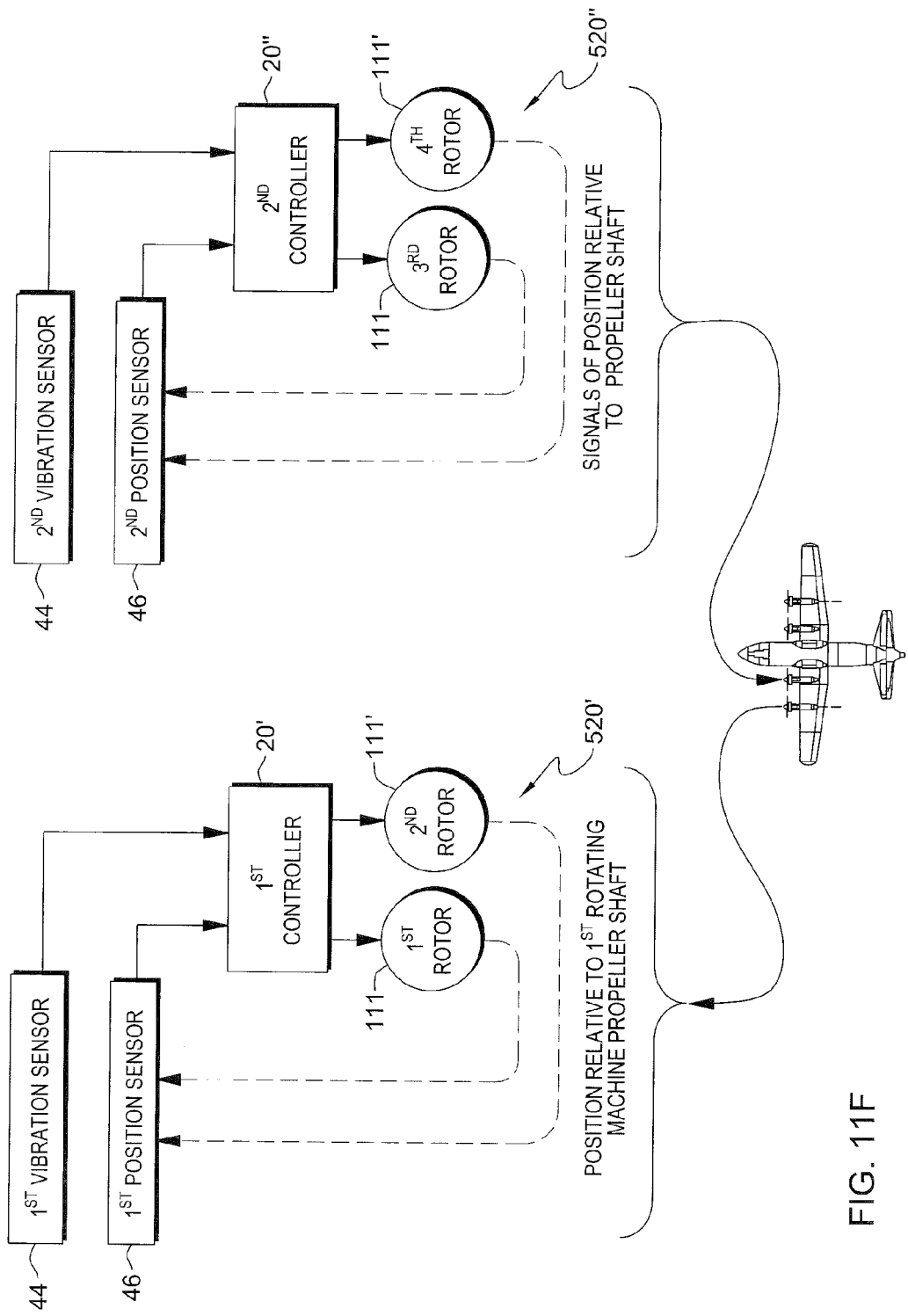
Figure 11G:
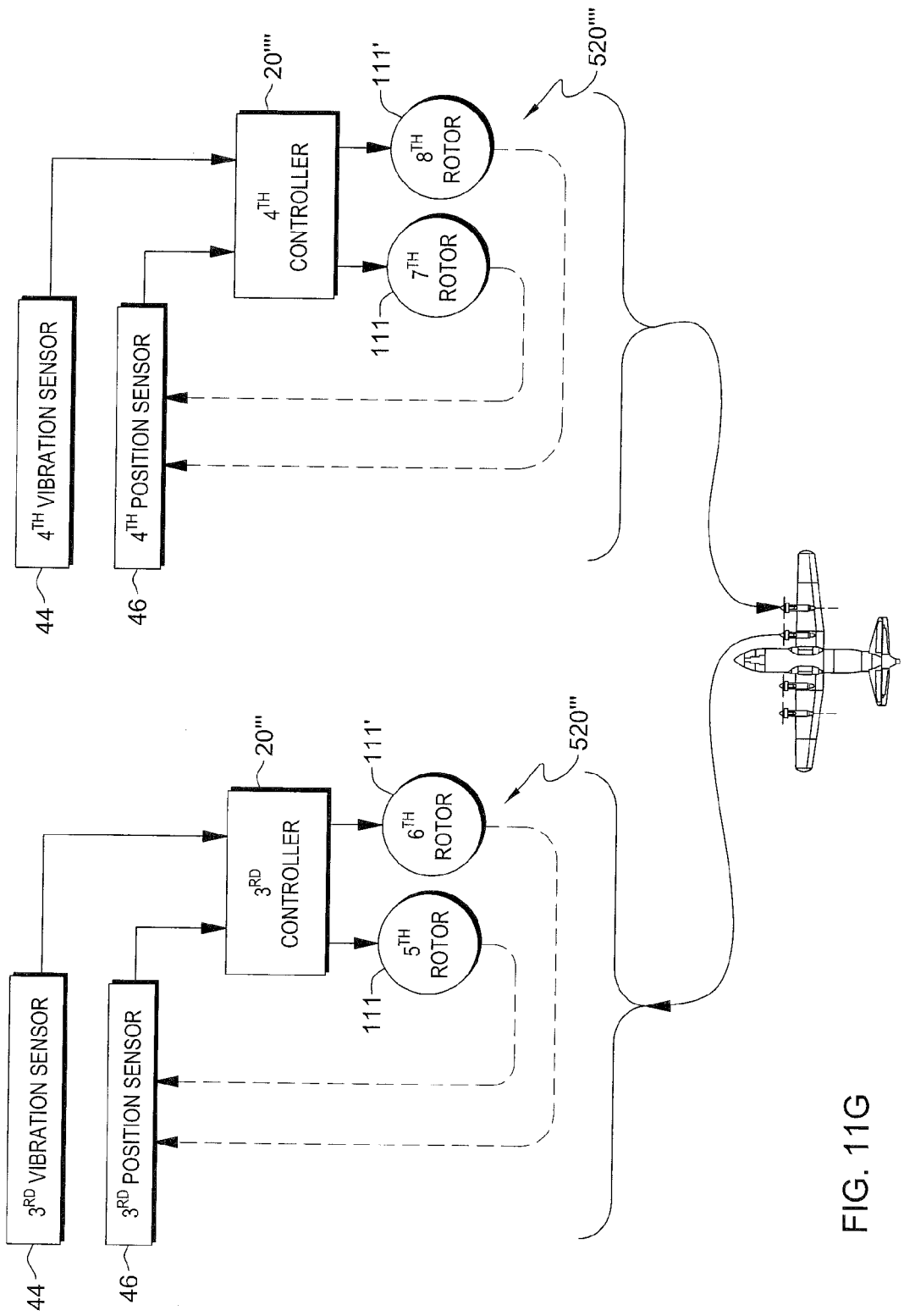
Figure 12A:
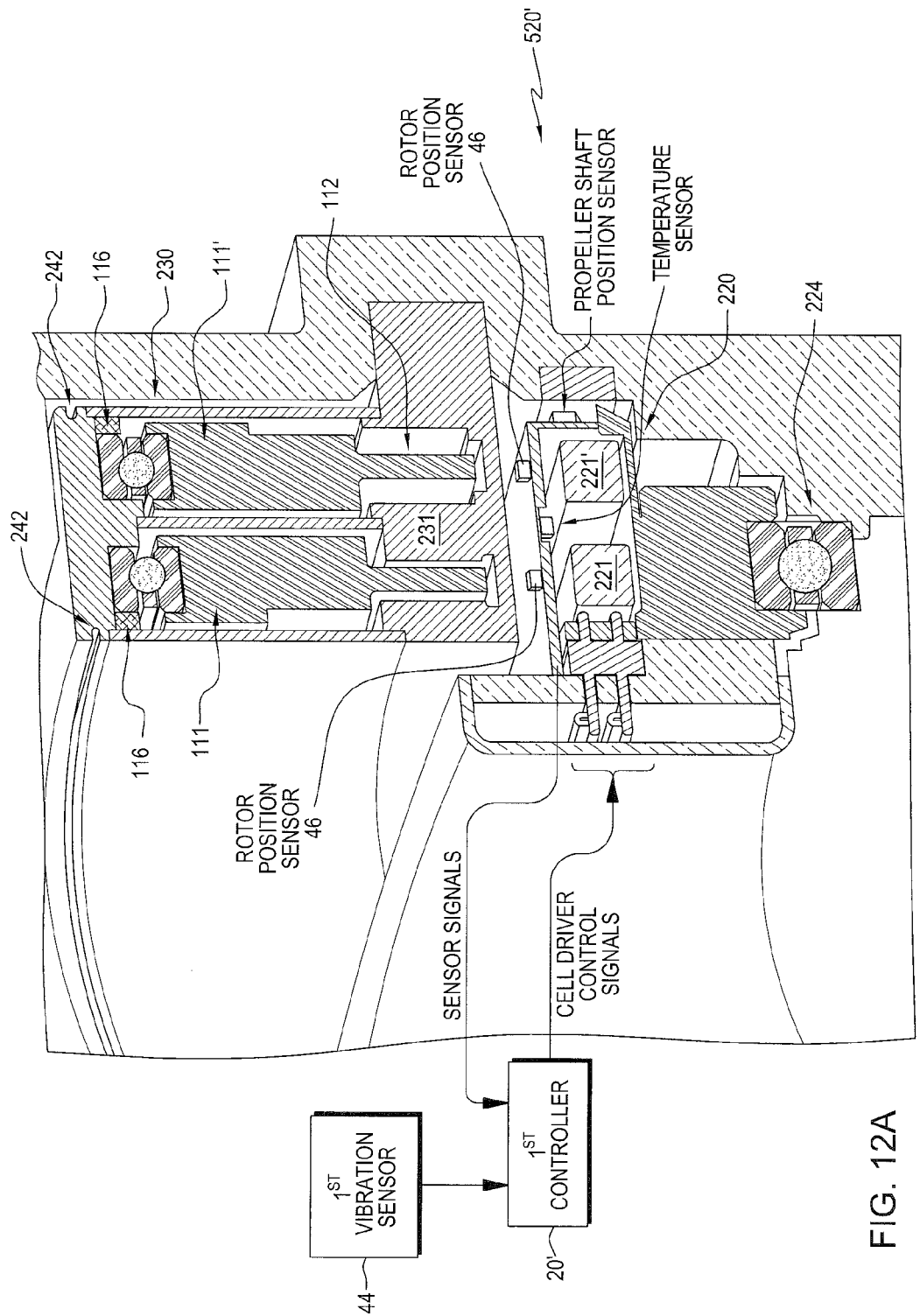
FIG. 12A-D illustrate decentralized propeller balancing systems for multiple aircraft propelling systems on an aircraft with local controllers and shows cross sections of the propeller mounted electromagnetically actuated balancer assemblies.
Figure 12B:
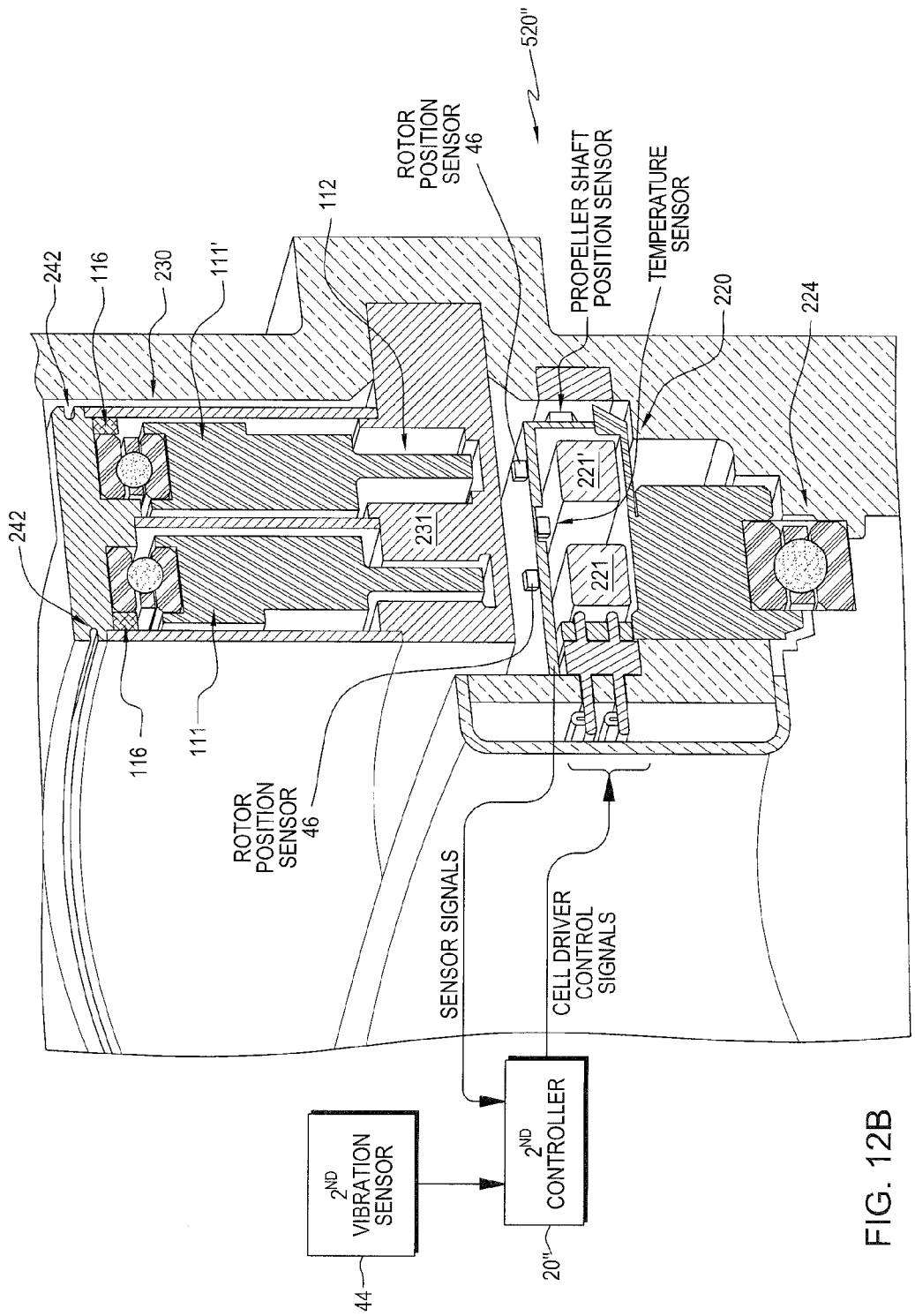
Figure 12C:
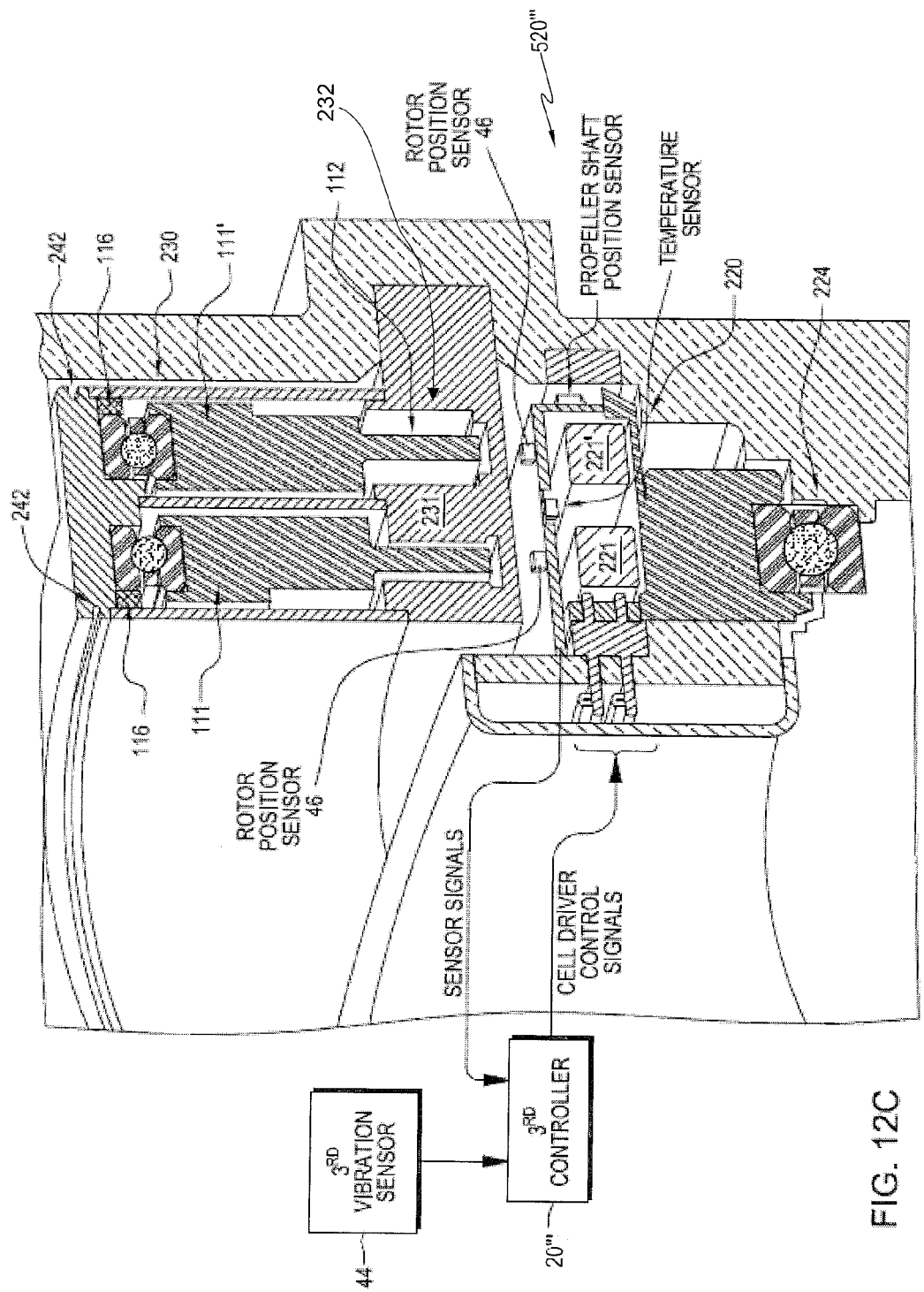
Figure 12D:
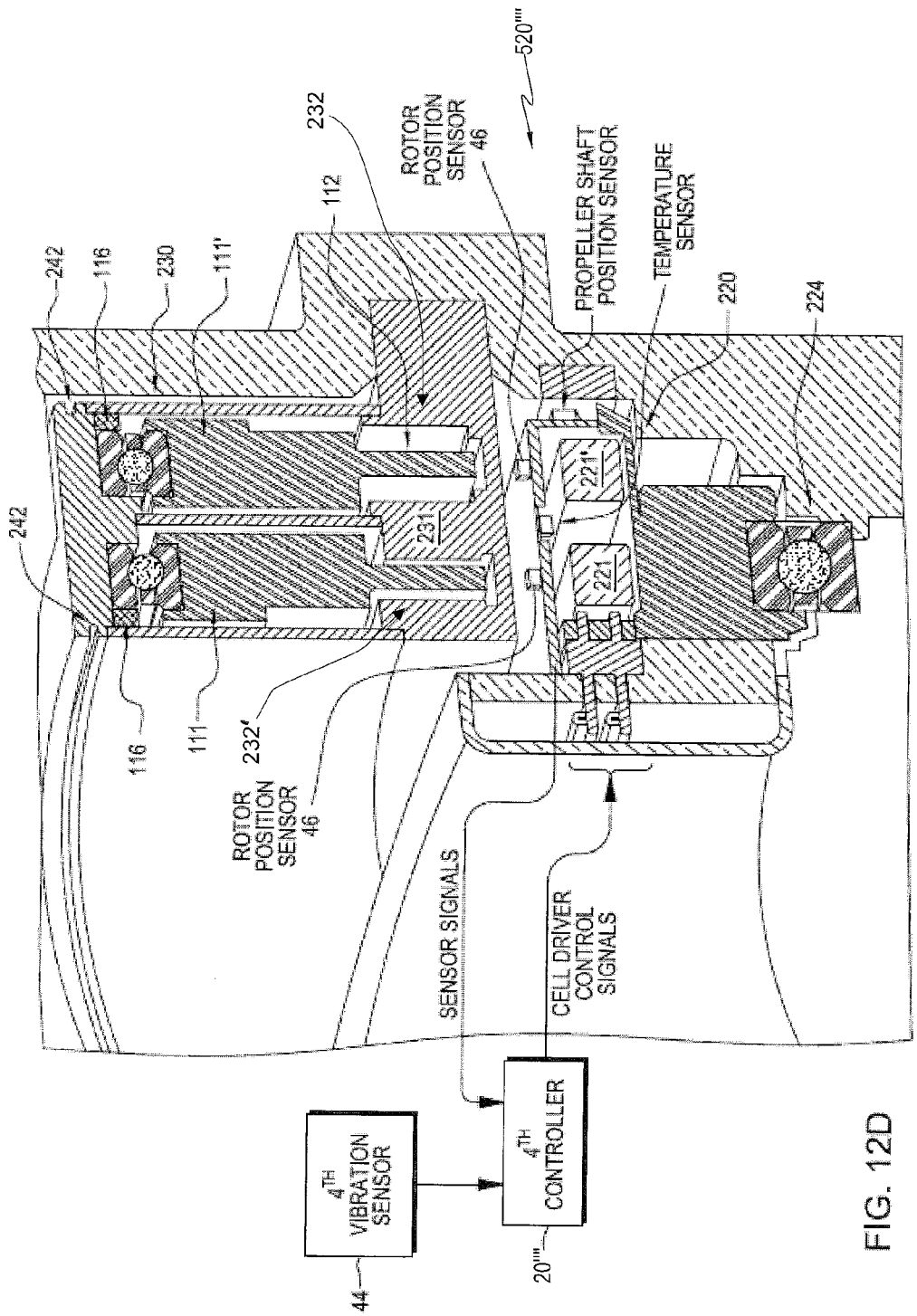

In embodiments the invention includes methods of balancing aircraft propeller systems 3'. The methods preferably include providing an aircraft propeller system 3' with a rotating machine propeller shaft member 47 which rotates around a rotation axis 48. The method preferably includes providing a first counterweight rotating balancing rotor 111, the first counterweight heavy spot mass concentration balancing rotor including a first plurality of holding stepping inboard magnets 112. FIG. 3 illustrates counterweight rotating balancing rotors 111, 111', the counterweight heavy spot mass concentration balancing rotor 111 preferably including a first plurality of holding stepping inboard magnets 112. Preferably the inboard magnets 112 are noncircular magnets, preferably longitudinally extending magnets. Preferably longitudinally extending magnets 112 extend normal to the rotation axis 48. Preferably the longitudinally extending magnets 112 extend and are elongated and aligned with radii extending out from the rotation axis 48. Preferably the first counterweight heavy spot mass concentration balancing rotor 111 includes a first outboard heavy spot mass concentration 113. FIG. 3 illustrates counterweight rotating balancing rotor 111, 111' with a heavy spot mass concentration 113, preferably provided from relatively high density mass concentration inserts 114 and opposing mass voids 115. FIG. 4 illustrates a crossection of first and second counterweight rotating balancing rotors 111, 111' in a welded casing, with the rotors movably positionable around the rotation axis 48 of a rotating machine member with the rotors including a plurality of patterned oriented inboard magnets 112 for electromagnetically actuated rotational movement around the rotation axis 48 of the rotating machine member for which the balancer is mounted. Preferably the outboard heavy spot mass concentrations 113 and the mass concentration inserts 114 and mass voids 115 are distal from the rotation axis 48 and the holding stepping inboard magnets 112 are proximate the rotation axis 48. The method preferably includes providing a second counterweight rotating balancing rotor 111', the second counterweight heavy spot mass concentration balancing rotor 111' including a second plurality of holding stepping inboard magnets 112 and a second outboard heavy spot mass concentration 113. The rotors 111, 111' are movably disposed upon the rotating machine member with the plurality of magnets 112 disposed inboard of the mass concentrations 113 and proximate the rotation axis 48 with the magnet pattern providing for electromagnetically actuated stepped rotational movement around the rotation axis 48 of the rotating machine member 47 for which the balancer is mounted. Preferably the outboard heavy spot mass concentrations 113 are distal from the rotation axis 48 as compared to the holding stepping inboard magnets 112 proximate the rotation axis 48. The method preferably includes providing an inboard nonrotating electromagnetic coil driver 220, the inboard electromagnetic coil driver 220 including a first inboard electromagnetic coil 221 proximate the rotation axis 48, and a second inboard electromagnetic coil 221' proximate the rotation axis 48, preferably with the inboard electromagnetic coils 221, 221' comprised of wound electrical conductors, preferably electrical conductor wires wound around a center oriented with the axis 48. FIG. 4C illustrates relationship of the relation of the pole patterns 233,233' of the center pole plate 231 to the north (N) and south (S) poles of the magnets 112 with the strong magnetic holding field of the magnets set up through and corresponding to the thick parts of the pole plate pattern compared to the thinned out parts of the pattern, and then when a timed quick short duration controlled magnetic field is generated by the proximate coil 221' with magnetic polarity generated in the thick parts of the pole pattern such that the S south pole of a magnet 112 is repelled by the proximate south pole generated in the thick part of the pole plate pattern by the EM coil controlled magnetic field and attracted by the north pole generated by the EM coil controlled magnetic field on the opposite side of the thinned part valley in the pattern with the rotor 111' magnetically stepped across this pole pattern thinned part valley. When the timed quick short duration controlled magnetic field is terminated with the controlled ending of current supply to the EM coil the rotor is again held by the magnetic holding field of the magnets set up through and corresponding to the thick parts of the pole plate pattern. With the controlled generation of such magnetic fields by the EM coil the rotor 111' and rotor 111 are stepped and rotated relative to the pole plate along the pole patterns 232, 233', 234. FIG. 5 illustrates an inboard nonrotating EM coil driver 220 with a relatively smaller diameter for noncontactingly fitting concentrically inside a balancer casing 230 containing the counterweight rotating balancing rotors 111,111'. FIG. 6 illustrate the inboard electromagnetic coil driver 220 with the first and second inboard electromagnetic coils 221, 221' proximate the rotation axis 48. The method preferably includes disposing the inboard nonrotating electromagnetic coil driver 220 and the first counterweight balancing rotor 111 and the second counterweight balancing rotor 111' around the rotating machine propeller shaft member 47 with the first inboard electromagnetic coil 220 proximate the first inboard magnets 112 of the first counterweight balancing rotor 111, the inboard nonrotating electromagnetic coil driver 220 proximate the rotation axis 48 and the first counterweight balancing rotor 111 outboard of the inboard nonrotating electromagnetic coil driver 220 and distal from the rotation axis 48, with the first inboard electromagnetic coil 221 generating a electromagnetic field 222 when energized with an electrical current to electromagnetically step the first inboard magnets 112 of the at least first counterweight balancing rotor 111 to electromagnetically actuate rotational movement of the first counterweight heavy spot mass concentration balancing rotor 111 around the rotation axis 48 of the rotating machine member 47 and relative to the inboard nonrotating electromagnetic coil driver 220. FIGS. 6 and 7 illustrate the position and orientation of the inboard nonrotating electromagnetic coil driver 220 and the outboard counterweight heavy spot mass concentration balancing rotors 111, 111'. The second inboard electromagnetic coil 221' is preferably proximate the second counterweight balancing rotor 111', with the second inboard electromagnetic coil 221' proximate the second inboard magnets 112 of the second counterweight balancing rotor 111', wherein the second inboard electromagnetic coil 221' generates an electromagnetic field 222 to electromagnetically step the second inboard magnets 112 of the second counterweight balancing rotor 111' to electromagnetically actuate rotational movement of the second counterweight heavy spot mass concentration balancing rotor 111' around the rotation axis 48 and relative to the inboard nonrotating electromagnetic coil driver 220.

Preferably the inboard electromagnetic coil driver 220 includes a plurality of inboard bearing members 224, and the method includes rotationally supporting the inboard nonrotating electromagnetic coil driver 220 upon the rotating machine propeller shaft member 47 with the inboard bearing members 224. Preferably the EM coil driver 220 support bearing members 224 support the nonrotating coil driver 220 around the rotating machine member. Preferably the method includes restraining the inboard electromagnetic coil driver 220 from rotating around the rotation axis 48. Preferably restraining the inboard electromagnetic coil driver 220 from rotating around the rotation axis 48 includes providing a rotation restraint, and disposing the rotation restraint 226 proximate the inboard nonrotating electromagnetic coil driver 220 wherein the rotation restraint 226 physically grounds the inboard nonrotating electromagnetic coil driver 220 to a nonrotating machine member 50. Preferably the rotation restraint 226 includes at least one electrical conductor, and the method includes transmitting electricity through the rotation restraint 226 to the inboard nonrotating electromagnetic coil driver 220. Preferably the rotation restraint 226 is comprised of a torque arm 228 with the torque arm 228 including a printed circuit board 229 with the electrical conductors providing an electrical circuit to the nonrotating EM coil driver 220 for transmitting electricity. Preferably the aircraft propeller system comprises a propeller and an engine/gearbox with the rotating machine propeller shaft member coupling the propeller and the engine/gearbox.

Preferably the first counterweight rotating balancing rotor 111 is rotationally supported by a first rotor outboard rotating bearing support assembly 116 distal from the rotation axis 48, and the second counterweight rotating balancing rotor 111' is rotationally supported by a second rotor outboard rotating bearing support assembly 116 distal from the rotation axis 48 with the first and second counterweight rotating balancing rotors 111, 111' contained in a rotating outer casing 230, the rotating outer casing 230 housing the rotating balancing rotors 111, 111', with the outer casing 230 mechanically grounded to the rotating machine propeller shaft member 47 with the first rotor outboard rotating bearing support assembly 116 between the first counterweight rotating balancing rotor 111 and an outboard circumference of the outer casing 230, and with the second rotor outboard rotating bearing support assembly 116 between the second counterweight rotating balancing rotor 111' and the outboard circumference of the outer casing 230. FIG. 6 illustrates the outboard rotating bearing support assemblies 116 and the grounded rotating casing 230. Preferably the rotating outer casing 230 including a rotating inboard center pole plate 231, and a first rotating outer pole plate 232, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate and the rotating center pole plate. Preferably the rotating outer casing 230 further includes a second rotating outer pole plate, the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231. Preferably the methods include maintaining a liquid lubricant sealed inside the rotating outer casing 230. Preferably the liquid lubricant fills the rotating outer casing 230. Preferably the liquid lubricant fills air void spaces inside the casing 230 and bathes the rotors and the outboard rotating bearing support assemblies. Preferably the sealed in liquid lubricant comprises a liquid oil, preferably a liquid oil having a viscosity in the range from 5 to 20 cst, preferably a non-grease liquid lubricant oil. Preferably the rotating outer casing 230 is comprised of a plurality of sealed welded outer casing members 240. FIG. 4 illustrates a casing weldment assembly with weld points 241 identified by triangles with the welds 241 welding together the outer casing members 240 to provide the sealed casing 230. Preferably the welded outer casing members 240 of the balancer casing 230 are united together with a plurality of welds 241, preferably from directed energy welding, preferably from energized beam welding, preferably electron beam welding, preferably vacuum electron beam welding. Preferably the plurality of outer casing members 240 have machine groove mating interface weld points, with the welding sealing the casing 230 with welds 241 proximate the mating interfaces, with the welded mating interface weld points sealing the casing 230 and containing the liquid lubricant. FIG. 4D illustrates a preferred welded rotating outer casing 230 and method of making a balancer and the rotating outer casing 230 with the outer casing members 240 including at least one decoupling void 242 in the outer casing member 240 proximate the welds 241. Preferably a decoupling void 242 is provided in outer perimeter ring outer casing member 240 proximate the welds 241 and the outer perimeter of the casing 230, with the decoupling void 242 preferably comprised of a groove running proximate the perimeter, with the decoupling void 242 inhibiting stress and strain distortion of the welded rotating outer casing 230 Preferably with the outer casing 230 members including the magnetic metal pole plates, including the center pole plate 231 and the two side pole plates 232,232' with the pole plate patterns for a rotor matching up, with the center pole plate 231 magnetic material metal relief cut thinned metal depression patterns 233, 233' staggered.

The method preferably includes monitoring a plurality of rotating balancing rotor positions relative to the inboard nonrotating electromagnetic coil driver 220 to provide a monitored health performance failure detection characteristic of the aircraft system 3. Preferably the methods include performing an aircraft maintenance repair procedure in relationship to the monitored health performance failure detection characteristic of the aircraft propeller system 3'. Preferably the methods include monitoring a plurality of balancer sensor outputs to provide a monitored aircraft performance health failure detection characteristic, with the balancer sensor outputs preferably including sensor outputs selected from the sensor group including position, temperature, and vibration sensors.

In an embodiment the invention includes an aircraft propelling system 3. The aircraft system including a rotating machine member 47 which rotates around a rotation axis 48, a first counterweight rotating balancing rotor 111, the first counterweight heavy spot mass concentration balancing rotor 111 including a first plurality of holding stepping inboard magnets 112, preferably the inboard magnets 112 are noncircular magnets, preferably longitudinally extending magnets, preferably longitudinally extending normal to the rotation axis 48, preferably the longitudinally extending magnets extend and are elongated and aligned with radii extending out from the rotation axis 48, and a first outboard heavy spot mass concentration. Preferably the rotor is movably disposed upon the machine and contains at least one magnet for electromagnetically actuated rotational movement around the rotation axis 48 of the rotating machine member for which the balancer is mounted. Preferably the outboard heavy spot mass concentration is distal from the rotation axis 48 and the holding stepping inboard magnets 112 are proximate the rotation axis 48. The system preferably includes a second counterweight rotating balancing rotor 111', the second counterweight heavy spot mass concentration balancing rotor 111' including a second plurality of holding stepping inboard magnets 112 and a second outboard heavy spot mass concentration. Preferably the second rotor 111' is movably disposed upon the machine and contains at least one magnet 112 for electromagnetically actuated rotational movement around the rotation axis 48 of the rotating machine member 47 for which the balancer 110 is mounted, preferably the outboard heavy spot mass concentration are distal from the rotation axis 48 and the holding stepping inboard magnets 112 are proximate the rotation axis 48. The system preferably includes an inboard nonrotating electromagnetic coil driver 220, the inboard electromagnetic coil driver 220 including a first inboard electromagnetic coil proximate the rotation axis 48, and a second inboard electromagnetic coil proximate the rotation axis 48, the inboard nonrotating electromagnetic coil driver 220 and the first counterweight balancing rotor 111 and the second counterweight balancing rotor 111' centered around the rotating machine member 47 with the first inboard electromagnetic coil 221 proximate the first inboard magnets 112 of the first counterweight balancing rotor 111, the inboard nonrotating electromagnetic coil driver 220 proximate the rotation axis 48 and the first counterweight balancing rotor 111 outboard of the inboard nonrotating electromagnetic coil driver 220 and distal from the rotation axis 48. The first inboard electromagnetic coil 221 generating a electromagnetic field to electromagnetically step the first inboard magnets 112 of the at least first counterweight balancing rotor 111 to electromagnetically actuate rotational movement of the first counterweight heavy spot mass concentration balancing rotor around the rotation axis 48 and around the rotating machine member 47 and relative to the inboard nonrotating electromagnetic coil driver 220 to a first rotor held balancing position. The second inboard electromagnetic coil 221' is proximate the second counterweight balancing rotor 111', with the second inboard electromagnetic coil 221' proximate the second inboard magnets 112 of the second counterweight balancing rotor 111', wherein the second inboard electromagnetic coil 221' generates an electromagnetic field to electromagnetically step the second inboard magnets 112 of the second counterweight balancing rotor 111' to electromagnetically actuate rotational movement of the second counterweight heavy spot mass concentration balancing rotor 111' around the rotation axis 48 and relative to the inboard nonrotating electromagnetic coil driver 220 to a second rotor held position. Preferably the inboard electromagnetic coil driver 220 includes a plurality of inboard bearing members 224 rotationally supporting the inboard nonrotating electromagnetic coil driver 220 upon the rotating machine member 47, preferably with the coil support bearing members supporting the nonrotating coil driver 220 around the rotating machine member. Preferably the system includes a rotation restraint 226, the rotation restraint 226 disposed proximate the inboard nonrotating electromagnetic coil driver 220 wherein the rotation restraint 226 physically grounds the inboard nonrotating electromagnetic coil driver 220 to a nonrotating machine member 50. Preferably the system rotation restraint 226 includes an electrical circuit, preferably a printed circuit board 229, transmitting electricity through the rotation restraint. Preferably the system includes the first counterweight rotating balancing rotor 111 rotationally supported by a first rotor outboard rotating bearing support assembly 116 distal from the rotation axis 48, and the second counterweight rotating balancing rotor 111' is rotationally supported by a second rotor outboard rotating bearing support assembly 116 distal from the rotation axis 48 with the first and second counterweight rotating balancing rotors contained in a rotating outer casing 230, the rotating outer casing 230 housing the rotating balancing rotors 111, 111', with the outer casing 230 mechanically grounded to the rotating machine member 47 with the first rotor outboard rotating bearing support assembly 116 between the first counterweight rotating balancing rotor 111 and an outboard circumference of the outer casing 230, and with the second rotor outboard rotating bearing support assembly 116 between the second counterweight rotating balancing rotor 111' and the outboard circumference of the outer casing 230. Preferably the balancer system counterweight rotating balancing rotors 111, 111' have rotor outboard rotating bearing support assemblies 116 with thin section bearings with rollers and proximate the outer perimeter of casing 230, preferably with oriented arc integral machined bearing support flange 117 oriented relative to the heavy spot mass concentration 113 and the mass concentrations 114. Preferably the oriented arc integral machined bearing support flange 117 has an arc less than 180 degrees, preferably less than 165 degrees, preferably in the range from about 150 to 120 degrees, and preferably about 146 degrees. Preferably the arc is centered about the heavy spot mass concentration, and preferably opposes the mass voids 115 side of the rotors 111, 111'. Preferably during making and assembly of the balancer and rotors 111, 111' the rotor oriented arc integral machined bearing support flange 117 is provided as an integral feature of the rotor structure, preferably during the forming process of the rotor structure, preferably during machining of the rotor structure, and then during bearing 116 insertion, the bearing ring assembly with the rollers and inner and outer races are snap fitted around and past the rotor oriented arc integral machined bearing support flange 117, which is then followed by placement and fastening of nonintegral fastener bearing flange 118 around the remaining majority of the perimeter of the rotor. The oriented arc integral machined bearing support flange 117 and fastener bearing flange 118 capture the bearing assembly 116 axially. Preferably the rotating outer casing 230 including a rotating inboard center pole plate 231, and a first rotating outer pole plate 232, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231. Preferably the rotating outer casing 230 further includes a second rotating outer pole plate 232', the second rotating outer pole plate 232' disposed relative to the rotating center pole plate 231 wherein the second counterweight rotating balancing rotor second plurality of holding stepping inboard magnets 112 noncontactingly received between the second rotating outer pole plate 232' and the rotating center pole plate 231. Preferably the system includes a liquid lubricant sealed inside the rotating outer casing 230. Preferably the liquid lubricant fills the rotating outer casing 230 and fills air void spaces inside the casing 230 and bathes the rotors and the outboard rotating bearing support assemblies. Preferably the sealed in liquid lubricant comprises a liquid oil, preferably having a viscosity in the range from 5 to 20 cst, preferably a non-grease liquid lubricant. Preferably the rotating outer casing 230 is comprised of a plurality of sealed welded outer casing members 240. Preferably welding outer casing members together with a plurality of welds 241 includes, preferably energized beam welding, preferably electron beam welding, preferably vacuum electron beam welding are utilized to bond the casing members 240 together, preferably with the plurality of outer casing members 240 having machine groove mating interface weld points, with the welding 241 sealing the casing 230 proximate the mating interfaces. Preferably the welded united outer casing members 240 include the magnetic metal pole plates.

In an embodiment the invention includes an electromagnetically actuated machine balancer 110 for mounting on a rotating machine member 47 and balancing the rotating machine member. The electromagnetically actuated balancer 110 preferably comprises at least a first counterweight heavy spot mass concentration rotating balancing rotor 111, the first counterweight heavy spot mass concentration balancing rotor 111 including a first plurality of holding stepping inboard magnets 112 and a first outboard heavy spot mass concentration. The rotor 111 is movably disposed upon the machine 47 and contains a pattern of magnets 112 for electromagnetically actuated rotational movement around the rotation axis 48 of the rotating machine member 47 for which the balancer 110 is mounted, preferably with outboard heavy spot mass concentration distal from the rotation axis 48 and the holding stepping inboard magnets 112 proximate the rotation axis 48. The electromagnetically actuated balancer 110 preferably comprises an inboard nonrotating electromagnetic coil driver 220, the inboard electromagnetic coil driver 220 including at least a first inboard electromagnetic coil 221 proximate the rotation axis 48, the first inboard electromagnetic coil 221 proximate the first inboard magnets 112 of the counterweight balancing rotor 111, wherein the first inboard electromagnetic coil 221 generates an electromagnetic field to electromagnetically step the first inboard magnets 112 of the at least first counterweight balancing rotor 111 to electromagnetically actuate rotational movement of the first counterweight heavy spot mass concentration balancing rotor 111 around the rotation axis 48 and relative to the inboard nonrotating electromagnetic coil driver 220. Preferably with the inboard electromagnetic coil driver 220 including a plurality of inboard bearing members 224, the bearing members between the inboard nonrotating electromagnetic coil driver 220 and the rotating machine member 47, preferably with the coil support bearing members 224 supporting the nonrotating coil driver 220 around the rotating machine member 47. Preferably the bearing members 224 include a plurality of inboard roller bearings between the first inboard electromagnetic coil 221 and the rotation axis 48. Preferably the electromagnetically actuated machine balancer 110 includes a rotation restraint 226, the rotation restraint 226 physically grounding the inboard nonrotating electromagnetic coil driver 220 to a nonrotating machine member 50, preferably a restraining yoke, preferably a movable rotation restraint antitorque tie rod 226 providing a level of decoupled motion between inboard nonrotating electromagnetic coil driver 220 and the nonrotating machine member 50, with a mechanical physical play yoke or motion accommodating mount, preferably with the antitorque tie rod restraint 226 providing electrical power and signals to the balancer and also carrying an axial mechanical load, preferably through the printed circuit board 229. Preferably the restraint includes snapon snapoff mating electrical disconnectable connectors 225,225' for connecting and disconnecting the electrical circuits of antitorque tie rod restraining circuit board 229 to nonrotating electrical wiring conduits mechanically grounded with nonrotating machine member 50. Preferably the restraint is a torque arm 228 with elastomeric mounting members 227, preferably with the torque arm 228 physically and electrically connecting to the coil driver 220. Preferably the balancer 110 includes a second counterweight heavy spot mass concentration rotating balancing rotor 111', the second counterweight heavy spot mass concentration balancing rotor 111' including a second plurality of holding stepping inboard magnets 112 and a second outboard heavy spot mass concentration, preferably with the rotor 111' movably disposed upon the machine and containing at least one magnet 112 for electromagnetically actuated rotational movement around the rotation axis 48 of the rotating machine member 47 for which the balancer is mounted, preferably with the outboard heavy spot mass concentration distal from the rotation axis 48 and the holding stepping inboard magnets 112 proximate the rotation axis 48. Preferably the inboard electromagnetic coil driver 220 including a second inboard electromagnetic coil 221' proximate the rotation axis 48, the second inboard electromagnetic coil 221' proximate the second inboard magnets 112 of the second counterweight balancing rotor 111', wherein the second inboard electromagnetic coil 221' generates an electromagnetic field to electromagnetically step the second inboard magnets 112 of the second counterweight balancing rotor 111' to electromagnetically actuate rotational movement of the second counterweight heavy spot mass concentration balancing rotor 111' around the rotation axis 48 and relative to the inboard nonrotating electromagnetic coil driver 220. Preferably the inboard magnets 112 are noncircular magnets 112, preferably longitudinally extending magnets 112, preferably longitudinally extending normal to the rotation axis 48, preferably the longitudinally extending magnets 112 extend and are elongated and aligned with radii extending out from the rotation axis 48. Preferably the balancer 110 includes a rotating center pole plate 231, the rotating center pole plate 231 disposed between the first counterweight heavy spot mass concentration rotating balancing rotor 111 and the second counterweight heavy spot mass concentration rotating balancing rotor 111', the rotating center pole plate 231 physically grounded to the rotating machine member 47 wherein the rotating center pole plate 231 rotates along with the rotating machine member 47 around the rotation axis 48 and provides a grounded rotating holding stepping reference point for the first counterweight heavy spot mass concentration rotating balancing rotor 111 and the second counterweight heavy spot mass concentration rotating balancing rotor 111' to rotate relative to around the rotation axis 48 preferably with an actuation push off point when the coil magnet fields are generated, and the rotors 111,111' are stepped relative to the pole plates 231, 232, 232' and then held at such position until the next activating balance need, preferably the rotors 111, 111' are intermittingly rotated relative to the rotating machine member 47 and rested and held at a balance position around the rotating machine 47 with the balance force vectors of the held/resting rotor resulting in a balancing vector cancelling an inbalance force vector of the rotating machine 47, preferably with the rotors 111, 111' not continually electromagnetically actuated and driven to rotate continuously relative to the rotating pole plates 231, 232, 232' and its grounding rotating machine member 47 and the rotating member, preferably inhibiting generating of a continuous circular rotating force vector. Preferably the balancer includes a first rotating outer pole plate 232 with a pattern 234 of poles, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231, with the rotating center pole plate 231 preferably having a first pole face side, the first pole face side facing the first rotating outer pole plate 232 with a pattern 233 of poles, preferably with the pattern 233 of poles preferably provided by a thinning of magnetic pole plate material, preferably with a magnetic metal pole plate with a pattern 233 of thinned metal depressions. Preferably the balancer 110 includes a second rotating outer pole plate 232', the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231, preferably the rotating center pole plate 231 preferably having a second pole face side, the second pole face side facing the second rotating outer pole plate 232' with a pattern 233' of poles, the second pole face side pattern 233' clockingly staggered relative to the first face side pattern 233, preferably with the pattern of poles preferably provided by a thinning of magnetic pole plate material, preferably a magnetic metal pole plate with pattern of thinned metal depressions. Preferably the rotating center pole plate 231 preferably having consistent offset staggered poles, one side pole pattern of depression thinned metal staggered relative to the opposite face side. Preferably the pole plate patterns 233,233' are formed from thin metal depressions, preferably not through cuts of metal material, preferably not through holes/notches all the way through the magnetic material. Preferably the first counterweight heavy spot mass concentration rotating balancing rotor 111 is rotationally supported by a first rotor outboard rotating bearing support assembly 116. Preferably the rotor 111 is contained in a rotating outer casing 230, the rotating outer casing 230 housing the rotor 111, with the outer casing 230 physically mechanically grounded mounted to the rotating machine member. Preferably the rotating outer casing 230 includes a plurality of rotating inboard pole plates 231, 232,232' for noncontactingly and magnetically receiving the rotor magnets 112.

Preferably the first counterweight heavy spot mass concentration rotating balancing rotor 111 is rotationally supported by a first rotor outboard rotating bearing support assembly 116 distal from the rotation axis 48, and the second counterweight heavy spot mass concentration rotating balancing rotor 111' is rotationally supported by a second rotor outboard rotating bearing support assembly 116 distal from the rotation axis 48, preferably with the first and second counterweight rotating balancing rotors 111,111' contained in a rotating outer casing 230, the rotating outer casing 230 housing the rotating balancing rotors, with the outer casing 230 physically mechanically grounded mounted to the rotating machine member 47. Preferably the rotating outer casing 230 includes a rotating inboard center pole plate 231, and a first rotating outer pole plate 232, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231, preferably the rotating outer casing 230 further includes a second rotating outer pole plate 232', the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231.

Preferably the first counterweight heavy spot mass concentration rotating balancing rotor 111 has an outside diameter FCWROD and the first inboard electromagnetic coil 221 has an outside diameter FEMCOD with FEMCOD<FCWROD. Preferably the first counterweight heavy spot mass concentration rotating balancing rotor 111 has an inside diameter FCWRID with FCWRID>FEMCOD. Preferably the second counterweight heavy spot mass concentration rotating balancing rotor 111' has an outside diameter SCWROD and an inside diameter SCWRID and the second inboard electromagnetic coil 221' has an outside diameter SEMCOD with SEMCOD<SCWROD, and SEMCOD<SCWRID.

Preferably the first counterweight rotating balancing rotor 111 is rotationally supported by a first rotor outboard rotating bearing support assembly 116 distal from the rotation axis 48, and the second counterweight rotating balancing rotor 111' is rotationally supported by a second rotor outboard rotating bearing support assembly 116 distal from the rotation axis 48 with the first and second counterweight rotating balancing rotors 111, 111' contained in a rotating outer casing 230, the rotating outer casing 230 housing the rotating balancing rotors 111, 111', with the outer casing 230 mechanically grounded to the rotating machine member 47 with the first rotor outboard rotating bearing support assembly 116 between the first counterweight rotating balancing rotor 111 and an outboard circumference of the outer casing 230, and with the second rotor outboard rotating bearing support assembly 116 between the second counterweight rotating balancing rotor 111' and the outboard circumference of the outer casing 230 (preferably the rotating outer casing 230 including a rotating inboard center pole plate 231, and a first rotating outer pole plate 232, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate, preferably the rotating outer casing 230 further includes a second rotating outer pole plate 232', the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231).

Preferably a liquid lubricant is sealed inside the rotating outer casing 230. Preferably the liquid lubricant fills the rotating outer casing 230 and fills air void spaces inside the casing 230 and bathes the rotors and the outboard rotating bearing support assemblies. Preferably the sealed in liquid lubricant comprises a liquid oil, preferably having a viscosity in the range from 5 to 20 cst, preferably a non-grease liquid lubricant.

In an embodiment the invention includes a method of making an electromagnetically actuated machine balancer 110 for mounting on a rotating machine member 47 and balancing the rotating machine member. The method of making an electromagnetically actuated machine balancer for mounting on a rotating machine member provides a preferred means for actively balancing aircraft rotating machine members. The method includes providing a first counterweight heavy spot mass concentration rotating balancing rotor 111, the first counterweight heavy spot mass concentration balancing rotor 111 including a first plurality of holding stepping inboard magnets 112, preferably the inboard magnets 112 are noncircular magnets 112, preferably longitudinally extending magnets 112, preferably longitudinally extending normal to the rotation axis 48, preferably the longitudinally extending magnets 112 extend and are elongated and aligned with radii extending out from the rotation axis 48 and first outboard heavy spot mass concentration outboard heavy spot mass concentration distal from the rotation axis 48 and the holding stepping inboard magnets 112 proximate the rotation axis 48. The method includes providing an inboard nonrotating electromagnetic coil driver 220, the inboard electromagnetic coil driver 220 including at least a first inboard electromagnetic coil 221 proximate the rotation axis 48. The method includes disposing the first inboard electromagnetic coil 221 proximate the first inboard magnets 112 of the counterweight balancing rotor 111, wherein the first inboard electromagnetic coil 221 generates a magnet field to electromagnetically step the first inboard magnets 112 of the at least first counterweight balancing rotor 111 to electromagnetically actuate rotational movement of the first counterweight heavy spot mass concentration balancing rotor 111 around the rotation axis 48 relative to the inboard nonrotating electromagnetic coil driver 220.

Preferably the inboard electromagnetic coil driver 220 includes a plurality of inboard bearing members 224, the bearing members for rotationally supporting the inboard nonrotating electromagnetic coil driver 220 around a rotating machine member 47, the coil support bearing members 224 supporting the nonrotating coil driver 220 around the rotating machine member.

Preferably the inboard bearing members 224 include a plurality of inboard roller bearings between the first inboard electromagnetic coil and a rotation axis 48 of the balancer.

Preferably the method includes providing a rotation restraint 226, and disposing the rotation restraint 226 proximate the inboard nonrotating electromagnetic coil driver 220 wherein the rotation restraint 226 physically grounds the inboard nonrotating electromagnetic coil driver 220 to a nonrotating machine member 50. Preferably the rotation restraint 226 is an anti-torque arm 228 restraining yoke, preferably a movable rotation restraint 226 providing a level of decoupled motion between inboard nonrotating electromagnetic coil driver 220 and the nonrotating machine member, mechanical physical play yoke or motion accommodating mount, preferably a torque arm 228 with elastomeric mounting members 227, preferably with the torque arm 228 physically and electrically connecting to the coil driver 220.

Preferably the method includes providing a second counterweight heavy spot mass concentration rotating balancing rotor 111', the second counterweight heavy spot mass concentration balancing rotor 111' including a second plurality of holding stepping inboard magnets 112 and a second outboard heavy spot mass concentration. Preferably the rotor 111' is movably disposed upon the machine 47 and containing at least one magnet 112 for electromagnetically actuated rotational movement around the rotation axis 48 of the rotating machine member 47 for which the balancer is mounted, with the outboard heavy spot mass concentration distal from the rotation axis 48 and the holding stepping inboard magnets 112 proximate the rotation axis 48.

Preferably the method includes providing a second inboard electromagnetic coil 221' proximate the rotation axis 48, disposing the second inboard electromagnetic coil 221' proximate the second inboard magnets 112 of the second counterweight balancing rotor 111', wherein the second inboard electromagnetic coil 221' generates a magnet field 222 to electromagnetically step the second inboard magnets 112 of the second counterweight balancing rotor to electromagnetically actuate rotational movement of the second counterweight heavy spot mass concentration balancing rotor around the rotation axis 48 and relative to the inboard nonrotating electromagnetic coil driver 220.

Preferably the method including providing a rotating center pole plate 231, disposing the rotating center pole plate 231 between the first counterweight heavy spot mass concentration rotating balancing rotor 111 and the second counterweight heavy spot mass concentration rotating balancing rotor 111', the rotating center pole plate 231 physically groundable to a rotating machine member 47 wherein the rotating center pole plate 231 rotates along with the rotating machine member 47 around a rotation axis 48 to provide a grounded rotating holding stepping reference point for the first counterweight heavy spot mass concentration rotating balancing rotor 111 and the second counterweight heavy spot mass concentration rotating balancing rotor 111' to rotate relative to around the rotation axis 48, with actuation push off points when the coil magnet fields 222 are generated, with the rotors 111, 111' stepped relative to the pole plate 231 and then held at such position until the next activating balance need, preferably rotors 111,111' are intermittingly rotated relative to the rotating machine member 47 and rested and held at a balance position around the rotating machine with the balance force vectors of the held/resting rotor resulting in a balancing vector cancelling an inbalance force vector of the rotating machine 47, preferably the rotors 111,111' are not continually electromagnetically actuated and driven to rotate continuously relative to the rotating pole plate 231 and its grounding rotating machine member and the rotating member 47, preferably inhibiting generating of a continuous circular rotating force vector. Preferably the first rotating outer pole plate 232 with a pattern 234 of poles, with the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231. Preferably the rotating center pole plate 231 preferably has a first pole face side, the first pole face side facing the first rotating outer pole plate 232 with a pattern 233 of poles, with the pattern 233 of poles preferably provided by a thinning of magnetic pole plate material, preferably magnetic metal pole plate 231 with a pattern 233 of thinned metal depressions. Preferably the second rotating outer pole plate 232' is disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231, and the rotating center pole plate 231 preferably having a second pole face side, the second pole face side facing the second rotating outer pole plate 232' with a pattern 232' of poles, the second pole face side pattern 232' clockingly staggered relative to the first face side pattern 232, with the pattern of poles 232' preferably provided by a thinning of magnetic pole plate material, preferably magnetic metal pole plate 231 with pattern of thinned metal depression. Preferably the rotating center pole plate 231 preferably having consistent offset staggered poles, one side pole pattern 232 of depression thinned metal staggered relative to the opposite face side pattern 232', preferably the pole plate patterns 232,232' formed from thin metal depressions, preferably not through cuts of metal material, preferably not through holes/notches all the way through the magnetic material.

The method preferably includes providing a first rotor outboard rotating bearing support assembly 116 wherein the first counterweight heavy spot mass concentration rotating balancing rotor 111 is rotationally supported by the first rotor outboard rotating bearing support assembly 116. Preferably with the rotor 111 contained in a rotating outer casing 230, the rotating outer casing 230 housing the rotor 111, with the outer casing 230 physically mechanically grounded mounted to the rotating machine member 47, preferably the rotating outer casing 230 including a plurality of rotating inboard pole plates 231, 232, 232' for noncontactingly and magnetically receiving the rotor magnets 112.

The method preferably including providing a first rotor outboard rotating bearing support assembly 116 wherein the first counterweight heavy spot mass concentration rotating balancing rotor 111 is rotationally supported by the first rotor outboard rotating bearing support assembly 116 distal from the rotation axis 48, and providing a second rotor outboard rotating bearing support assembly 116 wherein the second counterweight heavy spot mass concentration rotating balancing rotor 111' is rotationally supported by the second rotor outboard rotating bearing support assembly 116 distal from the rotation axis 48. Preferably the first and second counterweight rotating balancing rotors 111, 111' are contained in a rotating outer casing 230, the rotating outer casing 230 housing the rotating balancing rotors 111, 111', with the outer casing 230 physically mechanically grounded mounted to the rotating machine member 47. Preferably the rotating outer casing 230 including a rotating inboard center pole plate 231, and a first rotating outer pole plate 232, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231, preferably the rotating outer casing 230 further includes a second rotating outer pole plate 232', the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231.

Preferably the first counterweight heavy spot mass concentration rotating balancing rotor 111 has an outside diameter FCWROD and the first inboard electromagnetic coil 221 has an outside diameter FEMCOD with FEMCOD<FCWROD.

Preferably the first counterweight heavy spot mass concentration rotating balancing rotor 111 has an inside diameter FCWRID with FCWRID>FEMCOD.

Preferably the second counterweight heavy spot mass concentration rotating balancing rotor 111' has an outside diameter SCWROD and an inside diameter SCWRID and the second inboard electromagnetic coil 221' has an outside diameter SEMCOD with SEMCOD<SCWROD, and SEMCOD<SCWRID.

Preferably the first counterweight rotating balancing rotor 111 is rotationally supported by a first rotor outboard rotating bearing support assembly 116 distal from the rotation axis 48, and the second counterweight rotating balancing rotor 111' is rotationally supported by a second rotor outboard rotating bearing support assembly 116 distal from the rotation axis 48 with the first and second counterweight rotating balancing rotors 111, 111' contained in a rotating outer casing 230, the rotating outer casing 230 housing the rotating balancing rotors 111, 111', with the outer casing 230 mechanically grounded to the rotating machine member 47 with the first rotor outboard rotating bearing support assembly 116 between the first counterweight rotating balancing rotor 111 and an outboard circumference of the outer casing 230, and with the second rotor outboard rotating bearing support assembly 116 between the second counterweight rotating balancing rotor 111' and the outboard circumference of the outer casing 230. Preferably the rotating outer casing 230 including a rotating inboard center pole plate 231, and a first rotating outer pole plate 232, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231, preferably the rotating outer casing 230 further includes a second rotating outer pole plate 232', the second rotating outer pole plate 232'disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231.

Preferably a liquid lubricant is sealed inside the rotating outer casing 230. Preferably the liquid lubricant filling the rotating outer casing 230 and fluidly communicating air void spaces inside the casing 230 and bathes the rotors and the outboard rotating bearing support assemblies 116. Preferably the sealed in liquid lubricant comprises a liquid oil, preferably having a viscosity in the range from 5 to 20 cst, preferably a non-grease liquid lubricant.

Preferably the rotating outer casing 230 is comprised of a plurality of outer casing members 240, with the method including uniting the outer casing members 240, preferably by welding the outer casing members 240 together with a plurality of welds 241, preferably with energized beam welding, preferably with electron beam welding, preferably with vacuum electron beam welding, preferably with the plurality of outer casing members 240 having machine groove mating interface weld points, with the weldings 241 sealing the casing 230 proximate the mating interfaces of the outer casing members 240, preferably with the outer casing members 240 including the magnetic metal pole plates.

In an embodiment the invention includes a method of electromagnetically balancing an aircraft rotating machine member 47 which rotates about a rotation axis 48. The method preferably includes providing a first counterweight heavy spot mass concentration rotating balancing rotor 111, the first counterweight heavy spot mass concentration balancing rotor 111 including a first plurality of holding stepping inboard magnets 112, preferably the inboard magnets 112 are noncircular magnets 112, preferably longitudinally extending magnets 112, preferably longitudinally extending normal to the rotation axis 48, preferably the longitudinally extending magnets 112 extend and are elongated and aligned with radii extending out from the rotation axis 48 and a first outboard heavy spot mass concentration. Preferably the rotor 111 movably disposed upon the machine 47 and containing at least one magnet 112 for electromagnetically actuated rotational movement around the rotation axis 48 of the rotating machine member 47 for which the balancer 110 is mounted, the outboard heavy spot mass concentration distal from the rotation axis 48 and the holding stepping inboard magnets 112 proximate the rotation axis 48. The method preferably includes providing an inboard nonrotating electromagnetic coil driver 220, the inboard electromagnetic coil driver 220 including at least a first inboard electromagnetic coil 221 proximate the rotation axis 48. The method preferably includes disposing the inboard nonrotating electromagnetic coil driver 220 and the first counterweight balancing rotor 111 around the rotating machine member 47 with the first inboard electromagnetic coil 221 proximate the first inboard magnets 112 of the first counterweight balancing rotor, the inboard nonrotating electromagnetic coil driver 220 proximate the rotation axis 48 and the first counterweight balancing rotor 111 outboard of the inboard nonrotating electromagnetic coil driver 220 distal from axis 48 wherein the first inboard electromagnetic coil 221 generates a electromagnetic field 222 to electromagnetically step the first inboard magnets 112 of the at least first counterweight balancing rotor 111 to electromagnetically actuate rotational movement of the first counterweight heavy spot mass concentration balancing rotor 111 around the rotation axis 48 around the rotating machine member 47 and relative to the inboard nonrotating electromagnetic coil driver 220.

Preferably the inboard electromagnetic coil driver 220 includes a plurality of inboard bearing members 224, the inboard bearing members 224 rotationally supporting the inboard nonrotating electromagnetic coil driver 220 upon the rotating machine member 47, the coil support bearing members 224 supporting the nonrotating coil driver 220 around the rotating machine member 47.

Preferably the inboard bearing members 224 include a plurality of inboard roller bearings between the first inboard electromagnetic coil 221 and the rotation axis 48.

Preferably the method includes providing a rotation restraint 226, and disposing the rotation restraint 226 proximate the inboard nonrotating electromagnetic coil driver 220 wherein the rotation restraint 226 physically grounds the inboard nonrotating electromagnetic coil driver 220 to a nonrotating machine member 50, preferably an anti-torque arm 228 restraining yoke, preferably a movable rotation restraint 226 providing a level of decoupled motion between inboard nonrotating electromagnetic coil driver 220 and the nonrotating machine member, mechanical physical play yoke or motion accommodating mount, preferably a torque arm 228 with elastomeric mounting members, preferably with the torque arm 228 physically and electrically connecting to the coil driver 220.

Preferably the method includes providing a second counterweight heavy spot mass concentration rotating balancing rotor 111', the second counterweight heavy spot mass concentration balancing rotor 111' including a second plurality of holding stepping inboard magnets 112 and a second outboard heavy spot mass concentration, the rotor movably disposed upon the machine 47 and containing at least one magnet 112 for electromagnetically actuated rotational movement around the rotation axis 48 of the rotating machine member 47 for which the balancer is mounted, the outboard heavy spot mass concentration distal from the rotation axis 48 and the holding stepping inboard magnets 112 proximate the rotation axis 48.

Preferably the method includes providing a second inboard electromagnetic coil 221' proximate the rotation axis 48, disposing the second inboard electromagnetic coil 221' and second counterweight balancing rotor 111' proximate the first inboard electromagnetic coil 221 and the first counterweight balancing rotor 111, with the second inboard electromagnetic coil 111' proximate the second inboard magnets 112 of the second counterweight balancing rotor 111', wherein the second inboard electromagnetic coil 221' generates an electromagnetic field 222 to electromagnetically step the second inboard magnets 112 of the second counterweight balancing rotor 111' to electromagnetically actuate rotational movement of the second counterweight heavy spot mass concentration balancing rotor 111' around the rotation axis 48 and relative to the inboard nonrotating electromagnetic coil driver 220.

Preferably the method includes providing a rotating center pole plate 231, and disposing the rotating center pole plate 231 between the first counterweight heavy spot mass concentration rotating balancing rotor 111 and the second counterweight heavy spot mass concentration rotating balancing rotor 111', the rotating center pole plate 231 physically grounded to the rotating machine member 47 wherein the rotating center pole plate 231 rotates along with the rotating machine member 47 around the rotation axis 48 and provides a grounded rotating holding stepping reference point for the first counterweight heavy spot mass concentration rotating balancing rotor 111 and the second counterweight heavy spot mass concentration rotating balancing rotor 111' to rotate relative to around the rotation axis 48 with an actuation push off point when the EM coil magnet fields 222 are generated. Preferably the rotors 111,111' are stepped relative to the pole plates and then held at such position until the next activating balance need, preferably the rotors 111,111' are intermittingly rotated relative to the rotating machine member and rested and held at a balance position around the rotating machine with the balance force vectors of the held/resting rotor resulting in a balancing vector cancelling an inbalance force vector of the rotating machine, preferably with the rotors are not continually electromagnetically actuated and continually driven to rotate continuously relative to the rotating pole plate and its grounding rotating machine member and the rotating member, preferably inhibiting generating of a continuous circular rotating force vector. The casing 230 preferably includes a first rotating outer pole plate 232 with a pattern 234 of poles, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231, preferably with the rotating center pole plate 231 preferably having a first pole face side, the first pole face side facing the first rotating outer pole plate 232 with a pattern 233 of poles, the pattern 233 of poles preferably provided by a thinning of magnetic pole plate material, preferably a magnetic metal pole plate with a pattern 233 of thinned metal depressions. The casing 230 preferably includes a second rotating outer pole plate 232', the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231, the rotating center pole plate 231 preferably having a second pole face side, the second pole face side facing the second rotating outer pole plate 232' with a pattern 233' of poles, the second pole face side pattern 233' clockingly staggered relative to the first face side pattern 233, preferably a pattern of poles preferably provided by a thinning of magnetic pole plate material, preferably a magnetic metal pole plate with pattern of thinned metal depressions 233,233'. Preferably the rotating center pole plate 231 preferably having consistent offset staggered poles 233,233', one side pole pattern 233 of depression thinned metal staggered relative to the opposite face side 233', preferably pole plate patterns formed from thin metal depressions, preferably not through cuts of metal material (preferably not through holes/notches all the way through the magnetic material).

Preferably the method includes providing at least a first rotor outboard rotating bearing support assembly 116 wherein the first counterweight heavy spot mass concentration rotating balancing rotor 111 is rotationally supported by the first rotor outboard rotating bearing support assembly 116. Preferably the rotors 111,111' are contained in a rotating outer casing 230, the rotating outer casing 230 housing the rotors 111,111', with the outer casing 230 physically mechanically grounded mounted to the rotating shaft machine member rotating 47, preferably with the rotating outer casing 230 including a plurality of rotating inboard pole plates 231,232,232' proximate the rotation axis 48 for noncontactingly and magnetically receiving the rotor magnets 112, with the pole plates magnetic pattern receiving the magnetic pattern of the rotor's magnets 112, and channeling the electromagnetic field 222 of the proximate electromagnetic coil of the driver 220 to provide stepping actuation of the rotor and position holding of the rotor relative to the outer casing 230 physically mechanically grounded mounted rotating inboard pole plates.

Preferably the method includes providing a first rotor outboard rotating bearing support assembly 116 wherein the first counterweight heavy spot mass concentration rotating balancing rotor 111 is rotationally supported by the first rotor outboard rotating bearing support assembly distal 116 from the rotation axis 48, and providing a second rotor outboard rotating bearing support assembly 116 wherein the second counterweight heavy spot mass concentration rotating balancing rotor 111' is rotationally supported by the second rotor outboard rotating bearing support assembly 116 distal from the rotation axis 48. Preferably the first and second counterweight rotating balancing rotors 111,111' are contained in a rotating outer casing 230, the rotating outer casing 230 housing the rotating balancing rotors, with the outer casing 230 physically mechanically grounded mounted to the rotating machine member. Preferably the rotating outer casing 230 includes a rotating inboard center pole plate 231, and a first rotating outer pole plate 232, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231, preferably the rotating outer casing 230 further includes a second rotating outer pole plate 232', the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231.

Preferably the first counterweight heavy spot mass concentration rotating balancing rotor 111 has an outside diameter FCWROD and the first inboard electromagnetic coil 221 has an outside diameter FEMCOD with FEMCOD<FCWROD.

Preferably the first counterweight heavy spot mass concentration rotating balancing rotor 111 has an inside diameter FCWRID with FCWRID>FEMCOD.

Preferably the second counterweight heavy spot mass concentration rotating balancing rotor 111' has an outside diameter SCWROD and an inside diameter SCWRID and the second inboard electromagnetic coil 221' has an outside diameter SEMCOD with SEMCOD<SCWROD, and SEMCOD<SCWRID.

Preferably the first counterweight rotating balancing rotor 111 is rotationally supported by a first rotor outboard rotating bearing support assembly 116 distal from the rotation axis 48, and the second counterweight rotating balancing rotor 111' is rotationally supported by a second rotor outboard rotating bearing support assembly 116 distal from the rotation axis 48 with the first and second counterweight rotating balancing rotors 111,111' contained in a rotating outer casing 230, the rotating outer casing 230 housing the rotating balancing rotors 111,111', with the outer casing 230 mechanically grounded to the rotating machine member with the first rotor outboard rotating bearing support assembly 116 between the first counterweight rotating balancing rotor 111 and an outboard circumference of the outer casing 230, and with the second rotor outboard rotating bearing support assembly 116 between the second counterweight rotating balancing rotor 111' and the outboard circumference of the outer casing 230. Preferably the rotating outer casing 230 including a rotating inboard center pole plate 231, and a first rotating outer pole plate 232, the first rotating outer pole plate 232 disposed relative to the rotating center pole plate 231 wherein the first counterweight rotating balancing rotor first plurality of holding stepping inboard magnets 112 are noncontactingly received between the first rotating outer pole plate 232 and the rotating center pole plate 231, preferably the rotating outer casing 230 further includes a second rotating outer pole plate 232', the second rotating outer pole plate 232' disposed relative to the rotating center pole plate 231 wherein the second counterweight rotating balancing rotor second plurality of holding stepping inboard magnets 112 are noncontactingly received between the second rotating outer pole plate 232' and the rotating center pole plate 231.

Preferably a liquid lubricant is sealed inside the rotating outer casing 230. Preferably the liquid lubricant fills the rotating outer casing 230, preferably filling and displacing air void spaces inside the casing 230 and bathing the casing 230 interior volume and the rotors and the outboard rotating bearing support assemblies. Preferably the sealed in liquid lubricant comprises a liquid oil, preferably having a viscosity in the range from 5 to 20 cst, preferably a non-grease liquid lubricant.

Preferably the rotating outer casing 230 is comprised of a plurality of sealed welded outer casing members 240. Preferably the outer casing members 240 are welded together with a plurality of welds 241, preferably with energized beam welds, preferably electron beam welds, preferably vacuum electron beam welds, preferably with the plurality of outer casing members 240 having machine groove mating interface weld points, with the weldings 241 sealing the casing 230 proximate the machine groove mating interfaces of the casing members 240. Preferably the outer casing united welded members 240 including the magnetic metal pole plates.

Preferably the method includes monitoring over an extended period of time a plurality of first counterweight heavy spot mass concentration rotating balancing rotor 111 positions relative to the inboard nonrotating electromagnetic coil driver 220 to provide a health performance failure detection characteristic of the rotating machine member 47.

Preferably the method includes monitoring a plurality of first counterweight heavy spot mass concentration rotating balancing rotor 111 positions and second counterweight heavy spot mass concentration rotating balancing rotor 111' positions relative to the inboard nonrotating electromagnetic coil driver 220 to provide a monitored performance health failure detection characteristic of the rotating machine member 46,44.

Preferably the method includes monitoring a plurality of balancer sensor outputs from balancer sensors such as sensors 46,44 to provide a monitored performance health failure detection characteristic of the rotating machine member 47. Preferably the balancer sensor outputs are chosen from a sensor group including position sensors, temperature sensors, and vibration sensors.

In an embodiment the invention includes a method of inhibiting aircraft vibrations in an aircraft 1 with a plurality of aircraft vibrations such as shown in FIG. 11. Preferably the aircraft 1 has more than one propeller system 3', with the propeller system comprised of an engine and a propeller. Preferably the more than one propeller systems 3' of the aircraft are dynamically uncoupled. The method includes providing a first aircraft propeller system 3' with a first rotating machine propeller shaft member 47 which rotates around a first rotation axis 48. The method includes providing the first counterweight rotating balancing rotor 111, the first counterweight balancing rotor including the holding stepping inboard magnets 112 and first outboard mass concentration 113. The method includes providing the second counterweight rotating balancing rotor 111', the second counterweight rotating balancing rotor including the holding stepping inboard magnets 112 and second outboard mass concentration 113. The method includes providing inboard electromagnetic coil driver 220, the inboard electromagnetic coil driver including the first inboard electromagnetic coil 221, and the second inboard electromagnetic coil 221'. The method includes disposing the inboard electromagnetic coil driver and the first counterweight balancing rotor and the second counterweight balancing rotor around the rotating machine propeller shaft member with the first inboard electromagnetic coil proximate the first inboard magnets of the first counterweight balancing rotor, the inboard electromagnetic coil driver proximate the rotation axis and the first counterweight balancing rotor outboard of the inboard electromagnetic coil, and the second inboard electromagnetic coil proximate the second counterweight balancing rotor, with the second inboard electromagnetic coil proximate the second inboard magnets of the second counterweight balancing rotor. The method includes providing a first control system controller 20' and disposing the first control system controller 20' proximate the inboard electromagnetic coil driver 220 wherein the first control system controller 20' controls the inboard electromagnetic coil driver 220 with the first inboard electromagnetic coil 221 generating the electromagnetic field to electromagnetically step the first inboard magnets 112 of the at least first counterweight balancing rotor 111 to electromagnetically actuate rotational movement of the first counterweight balancing rotor 111 around the rotating machine member 47 and relative to the inboard electromagnetic coil driver 220, and the first control system controller controls 20' the inboard electromagnetic coil driver 220 with the second inboard electromagnetic coil 221' generating the electromagnetic field to electromagnetically step the second inboard magnets 112 of the second counterweight balancing rotor 111' to electromagnetically actuate rotational movement of the second counterweight balancing rotor 111' around the rotation axis 48 and relative to the inboard electromagnetic coil driver. Preferably with the first control system controller 20' receiving first counterweight rotating balancing rotor position signals from rotor position sensor 46 and second counterweight rotating balancing rotor position signals from rotor position sensor 46, and first vibration signals from first vibration sensor 44 proximate the controller 20' wherein the first control system controller 20' positions the first and second counterweight balancing rotors 111,111' to inhibit the aircraft vibrations. Preferably the method includes providing second aircraft propeller system 3' with second rotating machine propeller shaft member 47 which rotates around second rotation axis 48 and which is dynamically uncoupled from the first propeller system 3'. Preferably the method includes providing a third counterweight rotating balancing rotor 111, the third counterweight balancing rotor including the holding stepping inboard magnets 112 and third outboard mass concentration 113, and a fourth counterweight rotating balancing rotor 111', the fourth counterweight balancing rotor including fourth plurality of holding stepping inboard magnets 112 and fourth outboard mass concentration 113. Preferably the method includes providing second inboard electromagnetic coil driver 220, the second inboard electromagnetic coil driver 220 including third inboard electromagnetic coil 221, and fourth inboard electromagnetic coil 221'. Preferably the method includes disposing the second inboard electromagnetic coil driver 220 and the third counterweight balancing rotor 111 and the fourth counterweight balancing rotor 111' around the second rotating machine propeller shaft member 47 with the third inboard electromagnetic coil 221 proximate the third inboard magnets of the third counterweight balancing rotor 111, with the third counterweight balancing rotor 111 outboard of the third inboard electromagnetic coil 221, and the fourth inboard electromagnetic coil 221' proximate the fourth counterweight balancing rotor 111', with the fourth inboard electromagnetic coil 221' proximate the fourth inboard magnets 112 of the fourth counterweight balancing rotor 111'. Preferably the method includes providing a second control system controller 20" and disposing the second control system controller 20" proximate the second inboard electromagnetic coil driver 220 and with the propeller system 3' wherein the second control system controller 20" controls the second inboard electromagnetic coil driver 220 with the third inboard electromagnetic coil 221 generating an electromagnetic field to electromagnetically step the third inboard magnets of the third counterweight balancing rotor 111 to electromagnetically actuate rotational movement of the third counterweight balancing rotor 111 around the second rotating machine member 47 and relative to the second inboard electromagnetic coil driver 220, and the second control system controller 20" controls the second inboard electromagnetic coil driver 220 with the fourth inboard electromagnetic coil 221' generating an electromagnetic field to electromagnetically step the fourth inboard magnets of the fourth counterweight balancing rotor 111' to electromagnetically actuate rotational movement of the fourth counterweight balancing rotor 111' around the second rotation axis 48 and relative to the second inboard electromagnetic coil driver 220. Preferably the second control system controller 20" receives third counterweight rotating balancing rotor position signals from second control system balancing rotor position sensor 46 and fourth counterweight rotating balancing rotor position signals from balancing rotor position sensor 46, and second control system vibration signals from second control system vibration sensor 44 proximate the controller 20" wherein the second control system controller 20" positions the third and fourth counterweight balancing rotors 111, 111' to inhibit the aircraft vibrations. Preferably the method includes providing a third aircraft propeller system 3' with a third rotating machine propeller shaft member 47 which rotates around a third rotation axis 48 and is dynamically uncoupled from the first and second propeller systems 3'. Preferably the method includes providing a fifth counterweight rotating balancing rotor 111, the fifth counterweight balancing rotor 111 including a fifth plurality of holding stepping inboard magnets 112 and a fifth outboard mass concentration 113, and a sixth counterweight rotating balancing rotor 111', the sixth counterweight balancing rotor 111' including a sixth holding stepping inboard magnets 112 and sixth outboard mass concentration 113. Preferably the method includes providing a third inboard electromagnetic coil driver 220, the third inboard electromagnetic coil driver 220 including a fifth inboard electromagnetic coil 221, and a sixth inboard electromagnetic coil 221'. Preferably the method includes disposing the third inboard electromagnetic coil driver 220 and the fifth counterweight balancing rotor 111 and the sixth counterweight balancing rotor 111' around the third rotating machine propeller shaft member 47 with the fifth inboard electromagnetic coil 221 proximate the fifth inboard magnets 112 of the fifth counterweight balancing rotor 111, with the third inboard electromagnetic coil driver 220 proximate the third rotation axis 48 and the fifth counterweight balancing rotor 111 outboard of the fifth inboard electromagnetic coil 221, and the sixth inboard electromagnetic coil 221' proximate the sixth counterweight balancing rotor 111', with the sixth inboard electromagnetic coil 221' proximate the sixth inboard magnets 112 of the sixth counterweight balancing rotor 111'. Preferably the method includes providing a third control system controller 20'" and disposing the third control system controller 20'" proximate the third inboard electromagnetic coil driver 220 wherein the third control system controller 20'" controls the third inboard electromagnetic coil driver 220 with the fifth inboard electromagnetic coil 221 generating a electromagnetic field to electromagnetically step the fifth inboard magnets 112 of the fifth counterweight balancing rotor 111 to electromagnetically actuate rotational movement of the fifth counterweight balancing rotor 111 around the third rotating machine member 47 and relative to the third inboard electromagnetic coil driver 220, and the third control system controller 20'" controls the third inboard electromagnetic coil driver 220 with the sixth inboard electromagnetic coil 221' generating an electromagnetic field to electromagnetically step the sixth inboard magnets 112 of the sixth counterweight balancing rotor 111' to electromagnetically actuate rotational movement of the sixth counterweight balancing rotor 111' around the third rotation axis 48 and relative to the third inboard electromagnetic coil driver 220. Preferably the third control system controller 20'" receiving fifth counterweight rotating balancing rotor position signals from a control system balancing rotor position sensor 46 and sixth counterweight rotating balancing rotor position signals from a balancing rotor position sensor 46, and third control system vibration signals from a control system vibration sensor 44 wherein the third control system controller 20'" positions the fifth and sixth counterweight balancing rotors 111,111' to inhibit the aircraft vibrations. Preferably the method includes providing a fourth aircraft propeller system 3' with a fourth rotating machine propeller shaft member 47 which rotates around a fourth rotation axis 48 and which is dynamically uncoupled from the first and second, third propeller systems 3'. Preferably the method includes providing a seventh counterweight rotating balancing rotor 111, the seventh counterweight balancing rotor 111 including a seventh plurality of holding stepping inboard magnets 112 and a seventh outboard mass concentration 113, and an eighth counterweight rotating balancing rotor 111', the eighth counterweight balancing rotor 111' including a eighth plurality of holding stepping inboard magnets 112 and a eighth outboard mass concentration 113. Preferably the method includes providing a fourth inboard electromagnetic coil driver 220, the fourth inboard electromagnetic coil driver 220 including a seventh inboard electromagnetic coil 221, and a eighth inboard electromagnetic coil 221'. Preferably the method includes disposing the fourth inboard electromagnetic coil driver 220 and the seventh counterweight balancing rotor 111 and the eighth counterweight balancing rotor 111' around the fourth rotating machine propeller shaft member 47 with the seventh inboard electromagnetic coil 221 proximate the seventh inboard magnets 112 of the seventh counterweight balancing rotor 111, the fourth inboard electromagnetic coil driver 220 proximate the fourth rotation axis 48 and the seventh counterweight balancing rotor 111 outboard of the seventh inboard electromagnetic coil 221, and the eighth inboard electromagnetic coil 221' proximate the eighth counterweight balancing rotor 111', with the eighth inboard electromagnetic coil 221' proximate the eighth inboard magnets 112 of the eighth counterweight balancing rotor 111'. Preferably the method includes providing a fourth control system controller 20"" and disposing the fourth control system controller 20"" proximate the fourth inboard electromagnetic coil driver 220 wherein the fourth control system controller 20"" controls the fourth inboard electromagnetic coil driver 220 with the seventh inboard electromagnetic coil 221 generating a electromagnetic field to electromagnetically step the seventh inboard magnets of the seventh counterweight balancing rotor 111 to electromagnetically actuate rotational movement of the seventh counterweight balancing rotor 111 around the fourth rotating machine member 47 and relative to the fourth inboard electromagnetic coil driver 220, and the fourth control system controller 20'''' controls the fourth inboard electromagnetic coil driver 220 with the eighth inboard electromagnetic coil 221' generating an electromagnetic field to electromagnetically step the eighth inboard magnets of the eighth counterweight balancing rotor 111' to electromagnetically actuate rotational movement of the eighth counterweight balancing rotor 111' around the fourth rotation axis 48 and relative to the fourth inboard electromagnetic coil driver 220. Preferably the method includes the fourth control system controller 20'''' receiving seventh counterweight rotating balancing rotor position signals from a control system balancing rotor position sensor 46 and eighth counterweight rotating balancing rotor position signals from the sensor 46, and fourth control system vibration signals from a control system vibration sensor 44 wherein the fourth control system controller 20'''' positions the seventh and eighth counterweight balancing rotors 111,111' to inhibit the aircraft vibrations.

In embodiments the invention includes the method of balancing aircraft propeller systems. Preferably the aircraft propeller systems 3' are comprised of engine driven propellers 12, preferably with shaft member 47 connecting the engine and propeller. Preferably the aircraft 1 has more than one propeller system 3', with the propeller systems 3' dynamically uncoupled from each other. Preferably the method includes providing aircraft 1 with at least a first propeller system 3' with a first rotation axis 48 and at least a second propeller system 3' with a second rotation axis 48, preferably with the first propeller system 3' dynamically uncoupled from the second propeller system 3'. Preferably the method includes providing first counterweight rotating balancing rotor 111, the first counterweight balancing rotor 111 including holding stepping inboard magnets 112 and first outboard mass concentration 113, and a second counterweight rotating balancing rotor 111', the second counterweight balancing rotor 111' including holding stepping inboard magnets 112 and second outboard mass concentration 113. Preferably the method includes providing first inboard electromagnetic coil driver 220, the inboard electromagnetic coil driver 220 including first inboard electromagnetic coil 221, and second inboard electromagnetic coil 221'. Preferably the method includes disposing the first inboard electromagnetic coil driver 220 and the first counterweight balancing rotor 111 and the second counterweight balancing rotor 111' around the first propeller system 3' with the first inboard electromagnetic coil 221 proximate the first inboard magnets 112 of the first counterweight balancing rotor 111, the inboard electromagnetic coil driver 220 proximate the first rotation axis 48 and the first counterweight balancing rotor 111 outboard of the inboard electromagnetic coil 221, and the second inboard electromagnetic coil 221' proximate the second counterweight balancing rotor 111', with the second inboard electromagnetic coil 221' proximate the second inboard magnets 112 of the second counterweight balancing rotor 111'. Preferably the method includes providing first control system controller 20' and disposing the first control system controller 20' proximate the first propeller system 3' wherein the first control system controller 20' controls the inboard electromagnetic coil driver 220 with the first inboard electromagnetic coil 221 generating a electromagnetic field to electromagnetically step the first inboard magnets 112 of the at least first counterweight balancing rotor 111 to electromagnetically actuate rotational movement of the first counterweight balancing rotor 111 around the first propeller system 3' and relative to the inboard electromagnetic coil driver 220, and the first control system controller 20' controls the inboard electromagnetic coil driver 220 with the second inboard electromagnetic coil 221' generating an electromagnetic field to electromagnetically step the second inboard magnets 112 of the second counterweight balancing rotor 111' to electromagnetically actuate rotational movement of the second counterweight balancing rotor 111' around the first rotation axis 48 and relative to the inboard electromagnetic coil driver 220. Preferably the method includes providing third counterweight rotating balancing rotor 111, the third counterweight balancing rotor 111 including holding stepping inboard magnets 112 and third outboard mass concentration 113, and fourth counterweight rotating balancing rotor 111', the fourth counterweight balancing rotor 111' including the fourth plurality of holding stepping inboard magnets 112 and fourth outboard mass concentration 113. Preferably the method includes providing second inboard electromagnetic coil driver 220, the second inboard electromagnetic coil driver 220 including third inboard electromagnetic coil 221, and fourth inboard electromagnetic coil 221'. Preferably the method includes disposing the second inboard electromagnetic coil driver 220 and the third counterweight balancing rotor 111 and the fourth counterweight balancing rotor 111' around the second propeller system 3' with the third inboard electromagnetic coil 111 proximate the third inboard magnets 112 of the third counterweight balancing rotor 111, the second inboard electromagnetic coil driver 220 proximate the second rotation axis 48 and the third counterweight balancing rotor 111 outboard of the third inboard electromagnetic coil 221, and the fourth inboard electromagnetic coil 221' proximate the fourth counterweight balancing rotor 111', with the fourth inboard electromagnetic coil 221' proximate the fourth inboard magnets 112 of the fourth counterweight balancing rotor 111'. Preferably the method includes providing second control system controller 20'' and disposing the second control system controller 20'' proximate the second propeller system 3' wherein the second control system controller 20'' controls the second inboard electromagnetic coil driver 220 with the third inboard electromagnetic coil 221 generating an electromagnetic field to electromagnetically step the third inboard magnets 112 of the third counterweight balancing rotor 111 to electromagnetically actuate rotational movement of the third counterweight balancing rotor 111 around the second propeller system 3' and relative to the second inboard electromagnetic coil driver 220, and the second control system controller 20'' controls the second inboard electromagnetic coil driver 220 with the fourth inboard electromagnetic coil 221' generating an electromagnetic field to electromagnetically step the fourth inboard magnets 112 of the fourth counterweight balancing rotor 111' to electromagnetically actuate rotational movement of the fourth counterweight balancing rotor 111' around the second rotation axis 48 and relative to the second inboard electromagnetic coil driver 220. Preferably the method includes the first control system controller 20' receiving first counterweight rotating balancing rotor position signals and second counterweight rotating balancing rotor position signals from balancing rotor position sensors 46, and first propeller system vibration signals from first vibration sensor 44 sensing first propeller system vibrations proximate the first control system controller 20' wherein the first control system controller 20' positions the first and second counterweight balancing rotors 111,111' to minimize the first propeller system vibrations. Preferably the method includes the second control system controller 20'' receiving third counterweight rotating balancing rotor position signals and fourth counterweight rotating balancing rotor position signals from second control system balancing rotor position sensors 46, and second propeller system vibration signals from a second vibration sensor 44 sensing second propeller system vibrations proximate the second control system controller 20" wherein the second control system controller 20" positions the third and fourth counterweight balancing rotors 111,111' to minimize the second propeller system vibrations. Preferably the method includes providing a third aircraft propeller system 3' with a third rotation axis 48' with the aircraft propeller system 3' dynamically uncoupled from the first and second aircraft propeller system 3'. Preferably the method includes providing a fifth counterweight rotating balancing rotor 111, the fifth counterweight balancing rotor 111 including a fifth plurality of holding stepping inboard magnets 112 and a fifth outboard mass concentration 113, and a sixth counterweight rotating balancing rotor 111', the sixth counterweight balancing rotor 111' including sixth plurality of holding stepping inboard magnets 112 and sixth outboard mass concentration 113. Preferably the method includes providing third inboard electromagnetic coil driver 220, the third inboard electromagnetic coil driver 220 including fifth inboard electromagnetic coil 221, and sixth inboard electromagnetic coil 221'. Preferably the method includes disposing the third inboard electromagnetic coil driver 220 and the fifth counterweight balancing rotor 111 and the sixth counterweight balancing rotor 111' around the third aircraft propeller system 3' with the fifth inboard electromagnetic coil 221 proximate the fifth inboard magnets 112 of the fifth counterweight balancing rotor 111, the third inboard electromagnetic coil driver 220 proximate the third rotation axis 48 and the fifth counterweight balancing rotor 111 outboard of the fifth inboard electromagnetic coil 221, and the sixth inboard electromagnetic coil 221' proximate the sixth counterweight balancing rotor 111', with the sixth inboard electromagnetic coil 221' proximate the sixth inboard magnets 112 of the sixth counterweight balancing rotor 111'. Preferably the method includes providing a third control system controller 20''' and disposing the third control system controller 20''' proximate the third aircraft propeller system 3' wherein the third control system controller 20''' controls the third inboard electromagnetic coil driver 220 with the fifth inboard electromagnetic coil 221 generating an electromagnetic field to electromagnetically step the fifth inboard magnets 112 of the fifth counterweight balancing rotor 111 to electromagnetically actuate rotational movement of the fifth counterweight balancing rotor 111 around the third aircraft propeller system 3' and relative to the third inboard electromagnetic coil driver 220, and the third control system controller 20''' controls the third inboard electromagnetic coil driver 220 with the sixth inboard electromagnetic coil 221' generating an electromagnetic field to electromagnetically step the sixth inboard magnets 112 of the sixth counterweight balancing rotor 111' to electromagnetically actuate rotational movement of the sixth counterweight balancing rotor 111' around the third rotation axis 48 and relative to the third inboard electromagnetic coil driver 220. Preferably the method includes the third control system controller 20''' receiving fifth counterweight rotating balancing rotor position signals and sixth counterweight rotating balancing rotor position signals from control system balancing rotor position sensors 46, and third propeller system vibration signals from a third vibration sensor 44 sensing third propeller system vibrations proximate the third control system controller 20''' wherein the third control system controller 20''' positions the third and fourth counterweight balancing rotors 111,111' to minimize the third propeller system vibrations. Preferably the method includes providing a fourth aircraft propeller system 3' with a fourth rotation axis 48 with the fourth aircraft propeller system 3' dynamically uncoupled from the first, second, and third aircraft propeller systems 3'. Preferably the method includes providing a seventh counterweight rotating balancing rotor 111, the seventh counterweight balancing rotor 111 including the seventh plurality of holding stepping inboard magnets 112 and seventh outboard mass concentration 113, and an eighth counterweight rotating balancing rotor 111', the eighth counterweight balancing rotor 111' including eighth plurality of holding stepping inboard magnets 112 and eighth outboard mass concentration 113. Preferably the method includes providing a fourth inboard electromagnetic coil driver 220, the fourth inboard electromagnetic coil driver 220 including a seventh inboard electromagnetic coil 221, and a eighth inboard electromagnetic coil 221'. Preferably the method includes disposing the fourth inboard electromagnetic coil driver 220 and the seventh counterweight balancing rotor 111 and the eighth counterweight balancing rotor 111' around the fourth propeller system 3' with the seventh inboard electromagnetic coil 221 proximate the seventh inboard magnets 112 of the seventh counterweight balancing rotor 111, the fourth inboard electromagnetic coil driver 220 proximate the fourth rotation axis 48 and the seventh counterweight balancing rotor 111 outboard of the seventh inboard electromagnetic coil 221, and the eighth inboard electromagnetic coil 221' proximate the eighth counterweight balancing rotor 111', with the eighth inboard electromagnetic coil 221' proximate the eighth inboard magnets 112 of the eighth counterweight balancing rotor 111'. Preferably the method includes providing a fourth control system controller 20'''' and disposing the fourth control system controller 20'''' proximate the fourth propeller system 3' wherein the fourth control system controller 20'''' controls the fourth inboard electromagnetic coil driver 220 with the seventh inboard electromagnetic coil 221 generating a electromagnetic field to electromagnetically step the seventh inboard magnets 112 of the seventh counterweight balancing rotor 111 to electromagnetically actuate rotational movement of the seventh counterweight balancing rotor 111 around the fourth propeller system 3' and relative to the fourth inboard electromagnetic coil driver 220, and the fourth control system controller 20'''' controls the fourth inboard electromagnetic coil driver 220 with the eighth inboard electromagnetic coil 221' generating an electromagnetic field to electromagnetically step the eighth inboard magnets 112 of the eighth counterweight balancing rotor 111' to electromagnetically actuate rotational movement of the eighth counterweight balancing rotor 111' around the fourth rotation axis 48 and relative to the fourth inboard electromagnetic coil driver 220. Preferably the method includes the fourth control system controller 20'''' receiving seventh counterweight rotating balancing rotor position signals and eighth counterweight rotating balancing rotor position signals from control system balancing rotor position sensors 46, and fourth propeller system vibration signals from a fourth vibration sensor 44 sensing fourth propeller system vibrations proximate the fourth control system controller 20'''' wherein the fourth control system controller 20'''' positions the seventh and eighth counterweight balancing rotors 111,111' to minimize the fourth propeller system vibrations.

In an embodiment the invention includes aircraft 1 with at least a first propeller system 3' with first rotation axis 48 and at least a second propeller system 3' with second rotation axis 48, preferably the first propeller system 3' is dynamically uncoupled from the second propeller system 3'. The aircraft 1 includes first counterweight rotating balancing rotor 111, the first counterweight balancing rotor 111 including first plurality of holding stepping inboard magnets 112 and first outboard mass concentration 113, and second counterweight rotating balancing rotor 111', the second counterweight balancing rotor 111' including second plurality of holding stepping inboard magnets 112 and second outboard mass concentration 113. The aircraft 1 includes first inboard electromagnetic coil driver 220, the inboard electromagnetic coil driver 220 including first inboard electromagnetic coil 221, and second inboard electromagnetic coil 221'. The first inboard electromagnetic coil driver 220 and the first counterweight balancing rotor 111 and the second counterweight balancing rotor 111' disposed around the first propeller system 3' with the first inboard electromagnetic coil 221 proximate the first inboard magnets 112 of the first counterweight balancing rotor 111, the inboard electromagnetic coil driver 220 proximate the first rotation axis 48 and the first counterweight balancing rotor 111 outboard of the inboard electromagnetic coil 221, and the second inboard electromagnetic coil 221' proximate the second counterweight balancing rotor 111', with the second inboard electromagnetic coil 221' proximate the second inboard magnets 112 of the second counterweight balancing rotor 111'. The aircraft 1 includes first control system controller 20', the first control system controller 20' disposed proximate the first propeller system 3' wherein the first control system controller 20' controls the inboard electromagnetic coil driver 220 with the first inboard electromagnetic coil 221 generating a electromagnetic field to electromagnetically step the first inboard magnets 112 of the at least first counterweight balancing rotor 111 to electromagnetically actuate rotational movement of the first counterweight balancing rotor 111 around the first propeller system 3' and relative to the inboard electromagnetic coil driver 220, and the first control system controller 20' controls the inboard electromagnetic coil driver 220 with the second inboard electromagnetic coil 221' generating an electromagnetic field to electromagnetically step the second inboard magnets 112 of the second counterweight balancing rotor 111' to electromagnetically actuate rotational movement of the second counterweight balancing rotor 111' around the first rotation axis 48 and relative to the inboard electromagnetic coil driver 220. The aircraft 1 includes third counterweight rotating balancing rotor 111, the third counterweight balancing rotor 111 including third plurality of holding stepping inboard magnets 112 and a third outboard mass concentration 113, and fourth counterweight rotating balancing rotor 111', the fourth counterweight balancing rotor 111' including fourth plurality of holding stepping inboard magnets 112 and fourth outboard mass concentration 113. The aircraft 1 includes second inboard electromagnetic coil driver 220, the second inboard electromagnetic coil driver including third inboard electromagnetic coil 221, and fourth inboard electromagnetic coil 221', the second inboard electromagnetic coil driver 220 and the third counterweight balancing rotor 111 and the fourth counterweight balancing rotor 111' disposed around the second propeller system 3' with the third inboard electromagnetic coil 221 proximate the third inboard magnets 112 of the third counterweight balancing rotor 111, the second inboard electromagnetic coil driver 220 proximate the second rotation axis 48 and the third counterweight balancing rotor 111 outboard of the third inboard electromagnetic coil 221, and the fourth inboard electromagnetic coil 221' proximate the fourth counterweight balancing rotor 111', with the fourth inboard electromagnetic coil 221' proximate the fourth inboard magnets 112 of the fourth counterweight balancing rotor 111'. The aircraft 1 includes second control system controller 20", the second control system controller 20" disposed proximate the second propeller system 3' wherein the second control system controller 20" controls the second inboard electromagnetic coil driver 220 with the third inboard electromagnetic coil 221 generating an electromagnetic field to electromagnetically step the third inboard magnets 112 of the third counterweight balancing rotor 111 to electromagnetically actuate rotational movement of the third counterweight balancing rotor 111 around the second propeller system 3' and relative to the second inboard electromagnetic coil driver 220, and the second control system controller 20' controls the second inboard electromagnetic coil driver 220 with the fourth inboard electromagnetic coil 221' generating an electromagnetic field to electromagnetically step the fourth inboard magnets 112 of the fourth counterweight balancing rotor 111' to electromagnetically actuate rotational movement of the fourth counterweight balancing rotor 111' around the second rotation axis 48 and relative to the second inboard electromagnetic coil driver 221. Preferably the first control system controller 20' receives first counterweight rotating balancing rotor position signals and second counterweight rotating balancing rotor position signals from first balancing rotor position sensors 46, and first propeller system vibration signals from a first vibration sensor 44 sensing first propeller system vibrations proximate the first control system controller 20' wherein the first control system controller 20' positions the first and second counterweight balancing rotors 111, 111' to minimize the first propeller system vibrations. Preferably the second control system controller 20" receives third counterweight rotating balancing rotor position signals and fourth counterweight rotating balancing rotor position signals from second control system balancing rotor position sensors 46, and second propeller system vibration signals from a second vibration sensor 44 sensing second propeller system vibrations proximate the second control system controller 20" wherein the second control system controller 20" positions the third and fourth counterweight balancing rotors 111, 111' to minimize the second propeller system vibrations. Preferably the aircraft 1 includes a third aircraft propeller system 3' with a third rotation axis 48, the third aircraft propeller system 3' dynamically uncoupled from the first and second aircraft propeller systems 3'. Preferably the aircraft 1 includes a fifth counterweight rotating balancing rotor 111, the fifth counterweight balancing rotor 111 including fifth plurality of holding stepping inboard magnets 112 and fifth outboard mass concentration 113, and a sixth counterweight rotating balancing rotor 111', the sixth counterweight balancing rotor 111' including sixth plurality of holding stepping inboard magnets 112 and sixth outboard mass concentration 113. Preferably the aircraft 1 includes a third inboard electromagnetic coil driver 220, the third inboard electromagnetic coil driver 220 including fifth inboard electromagnetic coil 221, and sixth inboard electromagnetic coil 221', the third inboard electromagnetic coil driver 220 and the fifth counterweight balancing rotor 111 and the sixth counterweight balancing rotor 111' disposed around the third aircraft propeller system 3' with the fifth inboard electromagnetic coil 221 proximate the fifth inboard magnets of the fifth counterweight balancing rotor 111, the third inboard electromagnetic coil driver 220 proximate the third rotation axis 48 and the fifth counterweight balancing rotor 111 outboard of the fifth inboard electromagnetic coil 221, and the sixth inboard electromagnetic coil 221' proximate the sixth counterweight balancing rotor 111', with the sixth inboard electromagnetic coil 221' proximate the sixth inboard magnets 112 of the sixth counterweight balancing rotor 111'. Preferably the aircraft 1 includes third control system controller 20''', the third control system controller 20' disposed proximate the third aircraft propeller system 3' wherein the third control system controller 20''' controls the third inboard electromagnetic coil driver 220 with the fifth inboard electromagnetic coil 221 generating an electromagnetic field to electromagnetically step the fifth inboard magnets 112 of the fifth counterweight balancing rotor 111 to electromagnetically actuate rotational movement of the fifth counterweight balancing rotor 111 around the third aircraft propeller system 3' and relative to the third inboard electromagnetic coil driver 220, and the third control system controller 20''' controls the third inboard electromagnetic coil driver 220 with the sixth inboard electromagnetic coil 221' generating an electromagnetic field to electromagnetically step the sixth inboard magnets 112 of the sixth counterweight balancing rotor 111' to electromagnetically actuate rotational movement of the sixth counterweight balancing rotor 111' around the third rotation axis 48 and relative to the third inboard electromagnetic coil driver 220. Preferably the aircraft 1 includes the third control system controller 20''' receiving fifth counterweight rotating balancing rotor position signals and sixth counterweight rotating balancing rotor position signals from control system balancing rotor position sensors 46, and third propeller system vibration signals from a third vibration sensor 44 sensing third propeller system vibrations proximate the third control system controller 20''' wherein the third control system controller 20''' positions the third and fourth counterweight balancing rotors 111,111' to minimize the third propeller system vibrations. Preferably the aircraft 1 includes fourth aircraft propeller system 3' with a fourth rotation axis 48, with the fourth aircraft propeller system 3' dynamically uncoupled from the first and second, third aircraft propeller systems 3'. Preferably the aircraft 1 includes seventh counterweight rotating balancing rotor 111, the seventh counterweight balancing rotor 111 including seventh plurality of holding stepping inboard magnets 112 and seventh outboard mass concentration 113, and eighth counterweight rotating balancing rotor 111', the eighth counterweight balancing rotor 111' including eighth plurality of holding stepping inboard magnets 112 and eighth outboard mass concentration 113. Preferably the aircraft 1 includes fourth inboard electromagnetic coil driver 220, the fourth inboard electromagnetic coil driver 220 including seventh inboard electromagnetic coil 221, and eighth inboard electromagnetic coil 221', the fourth inboard electromagnetic coil driver 220 and the seventh counterweight balancing rotor 111 and the eighth counterweight balancing rotor 111' disposed around the fourth propeller system 3' with the seventh inboard electromagnetic coil 221 proximate the seventh inboard magnets 112 of the seventh counterweight balancing rotor 111, the fourth inboard electromagnetic coil driver 220 proximate the fourth rotation axis 48 and the seventh counterweight balancing rotor 111 outboard of the seventh inboard electromagnetic coil 221, and the eighth inboard electromagnetic coil 221' proximate the eighth counterweight balancing rotor 111', with the eighth inboard electromagnetic coil 221' proximate the eighth inboard magnets 112 of the eighth counterweight balancing rotor 111'. Preferably the aircraft 1 includes fourth control system controller 20'', the fourth control system controller 20'''' disposed proximate the fourth propeller system 3' wherein the fourth control system controller 20'''' controls the fourth inboard electromagnetic coil driver 220 with the seventh inboard electromagnetic coil 221 generating a electromagnetic field to electromagnetically step the seventh inboard magnets 112 of the seventh counterweight balancing rotor 111 to electromagnetically actuate rotational movement of the seventh counterweight balancing rotor 111 around the fourth propeller system 3' and relative to the fourth inboard electromagnetic coil driver 220, and the fourth control system controller 20'''' controls the fourth inboard electromagnetic coil driver 221' with the eighth inboard electromagnetic coil 221' generating an electromagnetic field to electromagnetically step the eighth inboard magnets 112 of the eighth counterweight balancing rotor 111' to electromagnetically actuate rotational movement of the eighth counterweight balancing rotor 111' around the fourth rotation axis 48 and relative to the fourth inboard electromagnetic coil driver 220. Preferably the aircraft 1 includes the fourth control system controller 20'''' receiving seventh counterweight rotating balancing rotor position signals and eighth counterweight rotating balancing rotor position signals from fourth position sensor 46, and fourth propeller system vibration signals from a fourth vibration sensor 44 sensing fourth propeller system vibrations proximate the fourth control system controller 20'''' wherein the fourth control system controller 20'''' positions the seventh and eighth counterweight balancing rotors 111, 111' to minimize the fourth propeller system vibrations.

In an embodiment the invention includes a method of balancing aircraft propeller systems 3'. Preferably the aircraft 1 has more than one propeller system 3', with the propeller systems 3' of the aircraft dynamically uncoupled. The method includes providing an aircraft 1 with at least a first propeller system 3' with a first rotation axis 48 and at least a second propeller system 3' with a second rotation axis 48, preferably with the first propeller system 3' dynamically uncoupled from the second propeller system 3'. The method includes providing a first means 520' for actively balancing the first propeller system during aircraft flight. The method includes providing a first control system controller 20' and disposing the first control system controller 20' proximate the first propeller system 3' wherein the first control system controller 20' controls the first means 520' for actively balancing the first propeller system during aircraft flight. The method includes providing a second means 520'' for actively balancing the second propeller system 3' during aircraft flight. The method includes providing a second control system controller 20'' and disposing the second control system controller 20'' proximate the second propeller system 3' wherein the second control system controller 20'' controls the second means 520'' for actively balancing the second propeller system during aircraft flight. The method preferably includes the first control system controller receiving first counterweight rotating balancing rotor position signals and second counterweight rotating balancing rotor position signals, and first propeller system vibration signals from a first vibration sensor sensing first propeller system vibrations proximate the first control system controller wherein the first control system controller positions a first and a second counterweight balancing rotor to minimize the first propeller system vibrations. The method preferably includes the second control system controller receiving third counterweight rotating balancing rotor position signals and fourth counterweight rotating balancing rotor position signals, and second propeller system vibration signals from a second vibration sensor sensing second propeller system vibrations proximate the second control system controller wherein the second control system controller positions a third and a fourth counterweight balancing rotor to minimize the second propeller system vibrations. The method preferably includes providing a third aircraft propeller system 3' with a third rotation axis 48 and dynamically uncoupled from the first and second aircraft propeller system. The method preferably includes providing a third means 520''' for actively balancing the third propeller system 3' during aircraft flight. The method preferably includes providing a third control system controller 20''' and disposing the third control system controller proximate the third aircraft propeller system 3' wherein the third control system controller controls the third means 520''' for actively balancing the third propeller system.

The method preferably includes the third control system controller receiving fifth counterweight rotating balancing rotor position signals and sixth counterweight rotating balancing rotor position signals, and third propeller system vibration signals from a third vibration sensor sensing third propeller system vibrations proximate the third control system controller wherein the third control system controller positions a third and a fourth counterweight balancing rotor to minimize the third propeller system vibrations. The method preferably includes providing a fourth aircraft propeller system 3' with a fourth rotation axis 48. The method preferably includes providing a fourth means 520"" for actively balancing the fourth propeller system during aircraft flight. The method preferably includes providing a fourth control system controller 20"" and disposing the fourth control system controller 20"" proximate the fourth propeller system 3' wherein the fourth control system controller controls the fourth means 520" for actively balancing the fourth propeller system during aircraft flight. The method preferably includes the fourth control system controller receiving seventh counterweight rotating balancing rotor position signals and eighth counterweight rotating balancing rotor position signals, and fourth propeller system vibration signals from a fourth vibration sensor sensing fourth propeller system vibrations proximate the fourth control system controller wherein the fourth control system controller positions a seventh and an eighth counterweight balancing rotor to minimize the fourth propeller system vibrations.

In an embodiment the invention includes aircraft 1 with at least first propeller system 3' with first rotation axis 48 and at least second propeller system 3' with second rotation axis 48, preferably with the first propeller system 3' dynamically uncoupled from the second propeller system 3'. The aircraft 1 includes a first means 520' for actively balancing the first propeller system 3' during aircraft flight with a first control system controller 20', the first control system controller 20' disposed proximate the first propeller system 3' wherein the first control system controller 20' controls the first means 520' for actively balancing the first propeller system 3'. The aircraft 1 includes a second means 520" for actively balancing the second propeller system 3' during aircraft flight with a second control system controller 20", the second control system controller 20" disposed proximate the second propeller system 3' wherein the second control system controller 20" controls the second means 520" for actively balancing the second propeller system 3'. Preferably the first control system controller 20' receiving first counterweight rotating balancing rotor position signals and second counterweight rotating balancing rotor position signals from sensors 46, and first propeller system vibration signals from a first vibration sensor 44 sensing first propeller system vibrations proximate the first control system controller 20' wherein the first control system controller 20' positions first and second counterweight balancing rotors 111,111' to minimize the first propeller system vibrations. Preferably the second control system controller 20" receiving third counterweight rotating balancing rotor position signals and fourth counterweight rotating balancing rotor position signals from sensors 46, and second propeller system vibration signals from a second vibration sensor 44 sensing second propeller system vibrations proximate the second control system controller 20" wherein the second control system controller 20" positions third and a fourth counterweight balancing rotors 111,111' to minimize the second propeller system vibrations. Preferably the aircraft 1 includes third aircraft propeller system 3' with third rotation axis 48, with the third aircraft propeller system 3' dynamically uncoupled from the first and second aircraft propeller systems 3' with a third means 520'" for actively balancing the third propeller system 3'. Preferably the aircraft 1 includes fifth counterweight rotating balancing rotor 111, the fifth counterweight balancing rotor 111 including fifth plurality of holding stepping inboard magnets 112 and fifth outboard mass concentration 113, and sixth counterweight rotating balancing rotor 111', the sixth counterweight balancing rotor 111' including sixth plurality of holding stepping inboard magnets 112 and sixth outboard mass concentration 113. Preferably the aircraft includes third inboard electromagnetic coil driver 220, the third inboard electromagnetic coil driver including fifth inboard electromagnetic coil 221, and sixth inboard electromagnetic coil 221', the third inboard electromagnetic coil driver 220 and the fifth counterweight balancing rotor 111 and the sixth counterweight balancing rotor 111' disposed around the third aircraft propeller system 3' with the fifth inboard electromagnetic coil 221 proximate the fifth inboard magnets 112 of the fifth counterweight balancing rotor 111, the third inboard electromagnetic coil driver 220 proximate the third rotation axis 48 and the fifth counterweight balancing rotor 111 outboard of the fifth inboard electromagnetic coil 221, and the sixth inboard electromagnetic coil 221' proximate the sixth counterweight balancing rotor 111', with the sixth inboard electromagnetic coil 221' proximate the sixth inboard magnets 112 of the sixth counterweight balancing rotor 111'. Preferably the aircraft 1 includes third control system controller 20'", the third control system controller 20'" disposed proximate the third aircraft propeller system 3' wherein the third control system controller 20'" controls the third inboard electromagnetic coil driver 220 with the fifth inboard electromagnetic coil 221 generating an electromagnetic field to electromagnetically step the fifth inboard magnets 112 of the fifth counterweight balancing rotor 111 to electromagnetically actuate rotational movement of the fifth counterweight balancing rotor 111 around the third aircraft propeller system 3' and relative to the third inboard electromagnetic coil driver 220, and the third control system controller 20'" controls the third inboard electromagnetic coil driver 220 with the sixth inboard electromagnetic coil 221' generating an electromagnetic field to electromagnetically step the sixth inboard magnets 112 of the sixth counterweight balancing rotor 111' to electromagnetically actuate rotational movement of the sixth counterweight balancing rotor 111' around the third rotation axis 48 and relative to the third inboard electromagnetic coil driver 220. Preferably the aircraft 1 includes the third control system controller 20'" receiving fifth counterweight rotating balancing rotor position signals and sixth counterweight rotating balancing rotor position signals, and third propeller system vibration signals from a third vibration sensor 44 sensing third propeller system vibrations proximate the third control system controller 20'" wherein the third control system controller 20'" positions the fifth and sixth counterweight balancing rotors 111,111' to minimize the third propeller system vibrations. Preferably the aircraft 1 includes a fourth aircraft propeller system 3' with a fourth rotation axis 48, with the fourth aircraft propeller system 3' dynamically uncoupled from the first and second, third aircraft propeller systems 3', with the fourth propeller system including a fourth means 520"" for actively balancing the fourth propeller system 3'. Preferably the aircraft 1 includes a seventh counterweight rotating balancing rotor 111, the seventh counterweight balancing rotor 111 including a seventh plurality of holding stepping inboard magnets 112 and a seventh outboard mass concentration 113, and an eighth counterweight rotating balancing rotor 111', the eighth counterweight balancing rotor 111' including a eighth plurality of holding stepping inboard magnets 112 and a eighth outboard mass concentration 113. Preferably the aircraft 1 includes a fourth inboard electromagnetic coil driver 220, the fourth inboard electromagnetic coil driver including a seventh inboard electromagnetic coil 221, and a eighth inboard electromagnetic coil 221', the fourth inboard electromagnetic coil driver 220 and the seventh counterweight balancing rotor 111 and the eighth counterweight balancing rotor 111' disposed around the fourth propeller system 3' with the seventh inboard electromagnetic coil 221 proximate the seventh inboard magnets of the seventh counterweight balancing rotor 111, the fourth inboard electromagnetic coil driver 220 proximate the fourth rotation axis 48 and the seventh counterweight balancing rotor 111 outboard of the seventh inboard electromagnetic coil, and the eighth inboard electromagnetic coil 221' proximate the eighth counterweight balancing rotor 111', with the eighth inboard electromagnetic coil 221' proximate the eighth inboard magnets 112 of the eighth counterweight balancing rotor 111'. Preferably the aircraft 1 includes a fourth control system controller 20"", the fourth control system controller 20"" disposed proximate the fourth propeller system 3' wherein the fourth control system controller 20"" controls the fourth inboard electromagnetic coil driver 220 with the seventh inboard electromagnetic coil generating a electromagnetic field to electromagnetically step the seventh inboard magnets of the seventh counterweight balancing rotor 111 to electromagnetically actuate rotational movement of the seventh counterweight balancing rotor 111 around the fourth propeller system 3' and relative to the fourth inboard electromagnetic coil driver 220, and the fourth control system controller 20"" controls the fourth inboard electromagnetic coil driver 220 with the eighth inboard electromagnetic coil generating an electromagnetic field to electromagnetically step the eighth inboard magnets of the eighth counterweight balancing rotor 111' to electromagnetically actuate rotational movement of the eighth counterweight balancing rotor 111' around the fourth rotation axis 48 and relative to the fourth inboard electromagnetic coil driver. Preferably the aircraft 1 includes the fourth control system controller 20"" receiving seventh counterweight rotating balancing rotor position signals and eighth counterweight rotating balancing rotor position signals, and fourth propeller system vibration signals from a fourth vibration sensor sensing fourth propeller system vibrations proximate the fourth control system controller 20"" wherein the fourth control system controller 20"" positions the seventh and eighth counterweight balancing rotors 111,111' to minimize the fourth propeller system vibrations.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

The invention claimed is:

1. A method of balancing aircraft propeller systems, said method comprising:
   providing an aircraft with at least a first propeller system with a first rotation axis and at least a second propeller system with a second rotation axis,
   providing a first means for actively balancing said first propeller system during aircraft flight,
   providing a first control system controller and disposing said first control system controller proximate said first propeller system wherein said first control system controller controls said first means for actively balancing said first propeller system during aircraft flight,
   providing a second means for actively balancing said second propeller system during aircraft flight,
   providing a second control system controller and disposing said second control system controller proximate said second propeller system wherein said second control system controller controls said second means for actively balancing said second propeller system during aircraft flight,
   wherein providing a first means for actively balancing said first propeller system during aircraft flight, further includes:
      providing a first counterweight rotating balancing rotor with a first rotor bearing support flange arc oriented with a first mass concentration and
      providing a second counterweight rotating balancing rotor with a second rotor bearing support flange arc oriented with a second mass concentration, with said first rotor bearing support flange arc retaining a first rotor outboard rotating bearing support assembly wherein said first counterweight rotating balancing rotor is rotationally supported by said first rotor outboard rotating bearing support assembly, and with said second rotor bearing support flange arc retaining a second rotor outboard rotating bearing support assembly wherein said second counterweight rotating balancing rotor is rotationally supported by said second rotor outboard rotating bearing support assembly.

2. A method as claimed in claim 1 wherein said first means includes:
   said first control system controller receiving a first counterweight rotating balancing rotor position signal and a second counterweight rotating balancing rotor position signal, and
   said first control system controller receiving a first propeller system vibration signal from a first vibration sensor sensing first propeller system vibrations proximate said first control system controller wherein said first control system controller positions a first and a second counterweight rotating balancing rotor to minimize said first propeller system vibrations.

3. A method as claimed in claim 2 wherein said second means includes:
   said second control system controller receiving a third counterweight rotating balancing rotor position signal and a fourth counterweight rotating balancing rotor position signal, and
   said second control system controller receiving a second propeller system vibration signal from a second vibration sensor sensing second propeller system vibrations proximate said second control system controller wherein said second control system controller positions a third and a fourth counterweight rotating balancing rotor to minimize said second propeller system vibrations.

4. A method as claimed in claim 3, including:
   providing a third aircraft propeller system with a third rotation axis,
   providing a third means for actively balancing said third propeller system during aircraft flight,
   providing a third control system controller and disposing said third control system controller proximate said third aircraft propeller system wherein said third control system controller controls said third means for actively balancing said third propeller system.

5. A method as claimed in claim 4 wherein said third means includes:
said third control system controller receiving a fifth counterweight rotating balancing rotor position signal and a sixth counterweight rotating balancing rotor position signal, and
said third control system controller receiving a third propeller system vibration signal from a third vibration sensor sensing third propeller system vibrations proximate said third control system controller wherein said third control system controller positions a third and a fourth counterweight rotating balancing rotor to minimize said third propeller system vibrations.

6. A method as claimed in claim 5, including:
providing a fourth aircraft propeller system with a fourth rotation axis,
providing a fourth means for actively balancing said fourth propeller system during aircraft flight,
providing a fourth control system controller and disposing said fourth control system controller proximate said fourth propeller system wherein said fourth control system controller controls said fourth means for actively balancing said fourth propeller system during aircraft flight.

7. A method as claimed in claim 6 wherein said fourth means includes:
said fourth control system controller receiving a seventh counterweight rotating balancing rotor position signal and an eighth counterweight rotating balancing rotor position signal, and
said fourth control system controller receiving a fourth propeller system vibration signal from a fourth vibration sensor sensing fourth propeller system vibrations proximate said fourth control system controller wherein said fourth control system controller positions a seventh and an eighth counterweight rotating balancing rotor to minimize said fourth propeller system vibrations.

8. A method as claimed in claim 1 wherein providing a first means for actively balancing said first propeller system during aircraft flight includes providing a rotating outer casing with a decoupling void.

9. A method as claimed in claim 1 wherein providing a first means for actively balancing said first propeller system during aircraft flight includes providing a rotation restraint, said rotation restraint including a circuit board mechanically restraining an inboard nonrotating electromagnetic coil driver and conducting electricity.

10. A method as claimed in claim 9 wherein said rotation restraint includes a rotation restraint electrical connector for coupling and decoupling with a mating electrical connector on a nonrotating machine member.

11. A method of balancing aircraft propeller systems, said method comprising:
providing an aircraft with at least a first propeller system with a first rotation axis and at least a second propeller system with a second rotation axis,
providing a first means for actively balancing said first propeller system during aircraft flight,
providing a first control system controller and disposing said first control system controller proximate said first propeller system wherein said first control system controller controls said first means for actively balancing said first propeller system during aircraft flight, wherein providing said first means for actively balancing said first propeller system during aircraft flight includes providing a rotation restraint, said rotation restraint including a circuit board mechanically restraining an inboard nonrotating electromagnetic coil driver and conducting electricity,
providing a second means for actively balancing said second propeller system during aircraft flight,
providing a second control system controller and disposing said second control system controller proximate said second propeller system wherein said second control system controller controls said second means for actively balancing said second propeller system during aircraft flight.

12. A method as claimed in claim 11 wherein said first means includes:
said first control system controller receiving a first counterweight rotating balancing rotor position signal and a second counterweight rotating balancing rotor position signal, and
said first control system controller receiving a first propeller system vibration signal from a first vibration sensor sensing first propeller system vibrations proximate said first control system controller wherein said first control system controller positions a first and a second counterweight rotating balancing rotor to minimize said first propeller system vibrations.

13. A method as claimed in claim 12 wherein said second means includes:
said second control system controller receiving a third counterweight rotating balancing rotor position signal and a fourth counterweight rotating balancing rotor position signal, and
said second control system controller receiving a second propeller system vibration signal from a second vibration sensor sensing second propeller system vibrations proximate said second control system controller wherein said second control system controller positions a third and a fourth counterweight rotating balancing rotor to minimize said second propeller system vibrations.

14. A method as claimed in claim 13, including:
providing a third aircraft propeller system with a third rotation axis,
providing a third means for actively balancing said third propeller system during aircraft flight,
providing a third control system controller and disposing said third control system controller proximate said third aircraft propeller system wherein said third control system controller controls said third means for actively balancing said third propeller system.

15. A method as claimed in claim 14 wherein said third means includes:
said third control system controller receiving a fifth counterweight rotating balancing rotor position signal and a sixth counterweight rotating balancing rotor position signal, and
said third control system controller receiving a third propeller system vibration signal from a third vibration sensor sensing third propeller system vibrations proximate said third control system controller wherein said third control system controller positions a third and a fourth counterweight rotating balancing rotor to minimize said third propeller system vibrations.

16. A method as claimed in claim 15, including:
providing a fourth aircraft propeller system with a fourth rotation axis,
providing a fourth means for actively balancing said fourth propeller system during aircraft flight, providing a fourth control system controller and disposing said fourth control system controller proximate said fourth propeller system wherein said fourth control system controller controls said fourth means for actively balancing said fourth propeller system during aircraft flight.

17. A method as claimed in claim 16 wherein said fourth means includes:
    said fourth control system controller receiving a seventh counterweight rotating balancing rotor position signal and an eighth counterweight rotating balancing rotor position signal, and
    said fourth control system controller receiving a fourth propeller system vibration signal from a fourth vibration sensor sensing fourth propeller system vibrations proximate said fourth control system controller wherein said fourth control system controller positions a seventh and an eighth counterweight rotating balancing rotor to minimize said fourth propeller system vibrations.

18. A method as claimed in claim 11 wherein providing a first means for actively balancing said first propeller system during aircraft flight, includes:
    providing a first counterweight rotating balancing rotor with a first rotor bearing support flange arc oriented with a first mass concentration and
    providing a second counterweight rotating balancing rotor with a second rotor bearing support flange arc oriented with a second mass concentration, with said first rotor bearing support flange arc retaining a first rotor outboard rotating bearing support assembly wherein said first counterweight rotating balancing rotor is rotationally supported by said first rotor outboard rotating bearing support assembly, and with said second rotor bearing support flange arc retaining a second rotor outboard rotating bearing support assembly wherein said second counterweight rotating balancing rotor is rotationally supported by said second rotor outboard rotating bearing support assembly.

19. A method as claimed in claim 11 wherein providing a first means for actively balancing said first propeller system during aircraft flight includes providing a rotating outer casing with a decoupling void.

20. A method as claimed in claim 11 wherein said rotation restraint includes a rotation restraint electrical connector for coupling and decoupling with a mating electrical connector on a nonrotating machine member.

* * * * *